United States Patent [19]
Engelberger et al.

[11] 4,163,183
[45] Jul. 31, 1979

[54] PROGRAMMABLE AUTOMATIC ASSEMBLY SYSTEM

[75] Inventors: Joseph F. Engelberger, Newtown; Torsten H. Lindbom, Brookfield; Maurice J. Dunne, Newtown; William Perzley, Weston; Wilbur N. Roberts, Newtown; Horace L. Gardner, Ridgefield, all of Conn.

[73] Assignee: Unimation, Inc., Danbury, Conn.

[21] Appl. No.: 625,932

[22] Filed: Oct. 28, 1975

[51] Int. Cl.² ............................................. G05B 19/42
[52] U.S. Cl. .................................... 318/568; 318/569
[58] Field of Search .............. 318/567, 568, 569, 162, 318/562; 214/1 CM; 364/107, 478

[56] References Cited
U.S. PATENT DOCUMENTS

| | | | |
|---|---|---|---|
| 3,624,371 | 11/1971 | Neal et al. | 318/568 |
| 3,701,888 | 10/1972 | McDaniel | 318/562 UX |
| 3,909,600 | 9/1975 | Hohn | 214/1 CM |
| 3,920,972 | 11/1975 | Corwin, Jr. et al. | 364/107 |
| 4,011,437 | 3/1977 | Hohn | 318/568 |

Primary Examiner—J. V. Truhe
Assistant Examiner—Eugene S. Indyk
Attorney, Agent, or Firm—Mason, Kolehmainen, Rathburn & Wyss

[57] ABSTRACT

A programmable automatic assembly system is provided which may be employed to assemble small parts. Each assembly station includes cooperating manipulator arms which are programmable to assemble parts on a centrally located work table. Improved facilities are provided for teaching the manipulator arms at each station, these facilities including a computer which assists the teaching operator in setting up the programs required for assembly of small parts to close tolerances. Each manipulator arm includes closed loop teach facilities for maintaining the arm at a previously located position during the teaching mode of operation. The computer is employed as a teach assist facility in performing a number of tasks during the teaching operation which are extremely difficult for the operator to perform manually. All of the assembly stations may be controlled during playback from a common disc storage facility so that the control circuitry and memory storage facilities at each manipulator are minimized.

78 Claims, 77 Drawing Figures

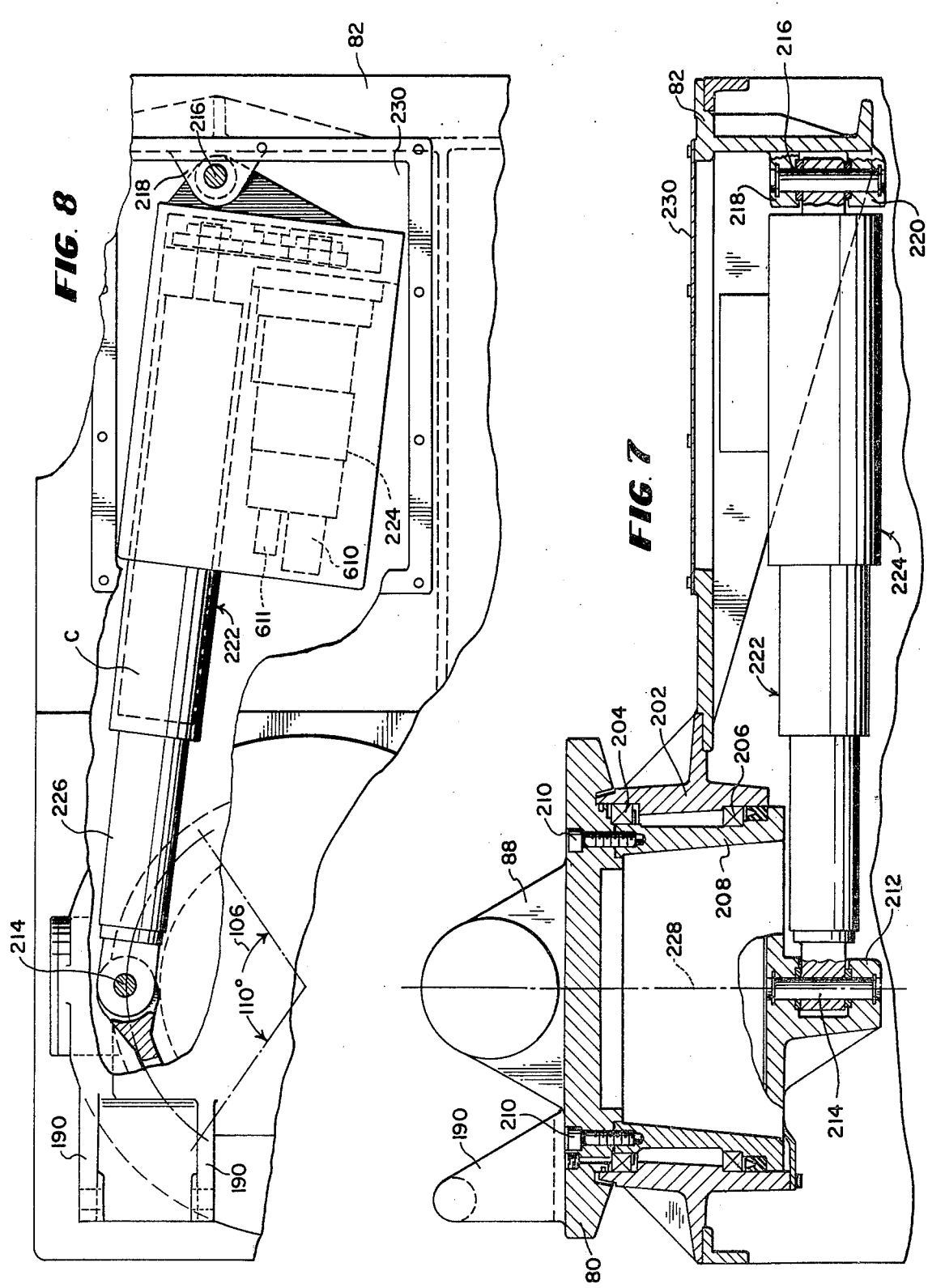

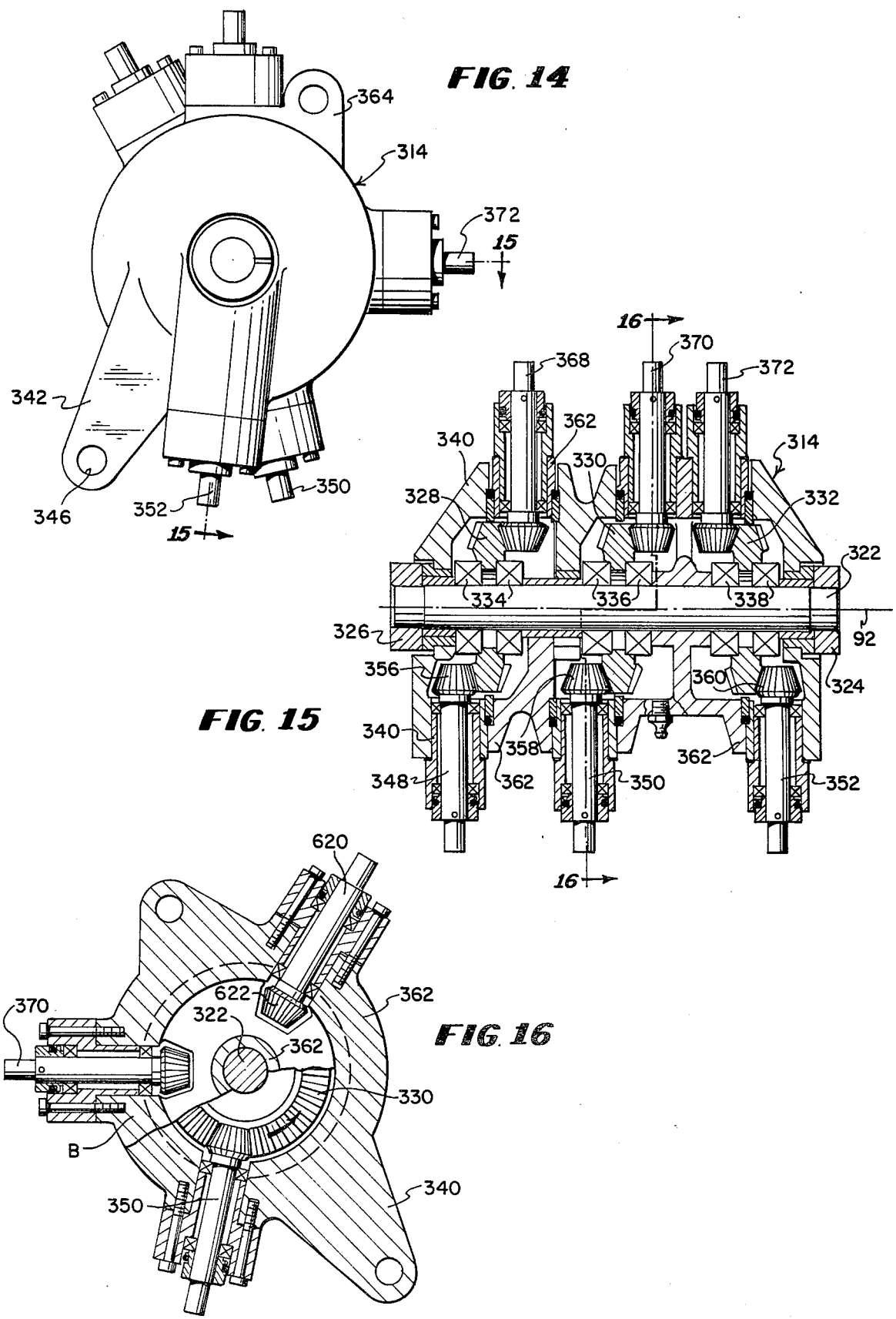

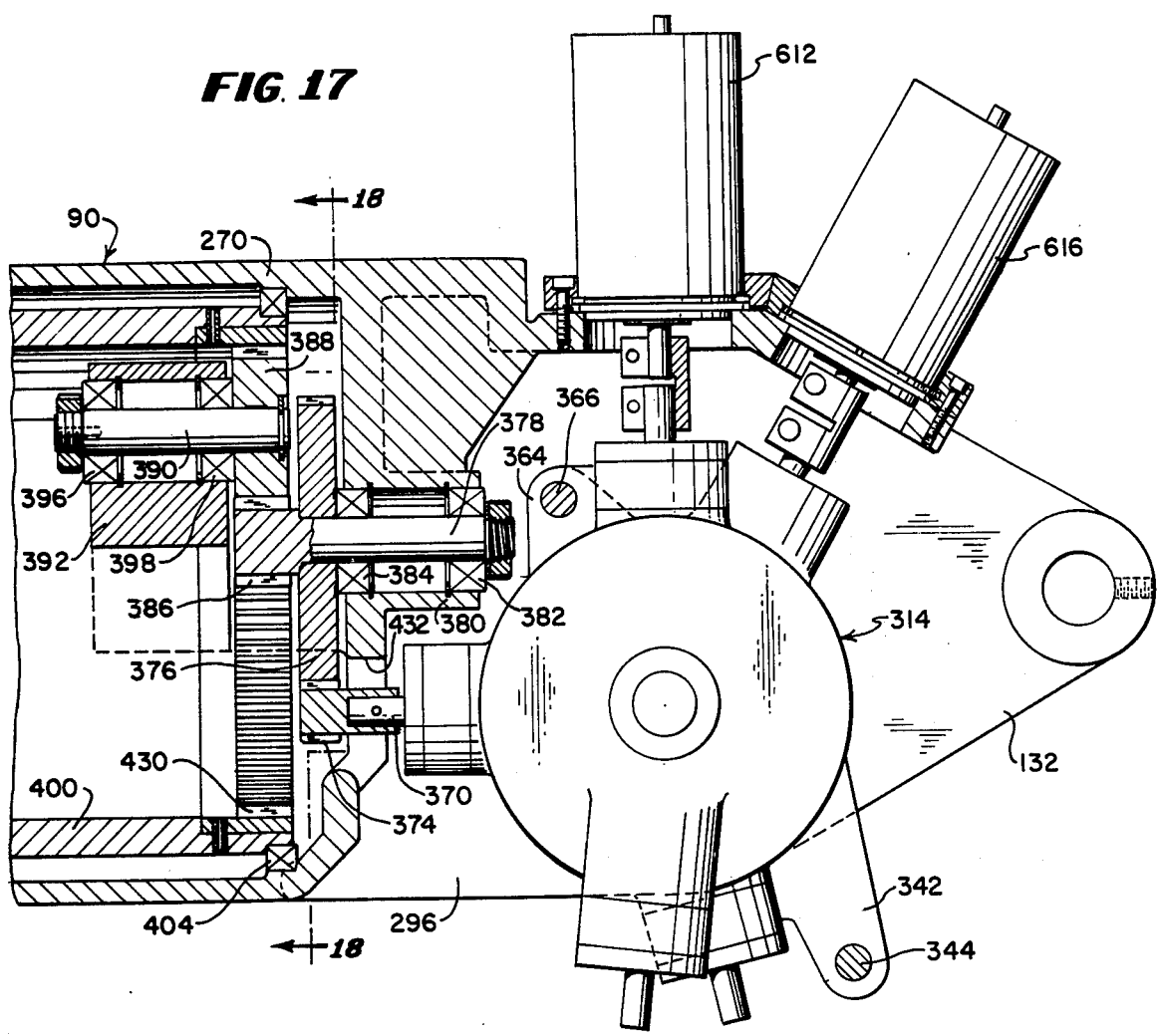
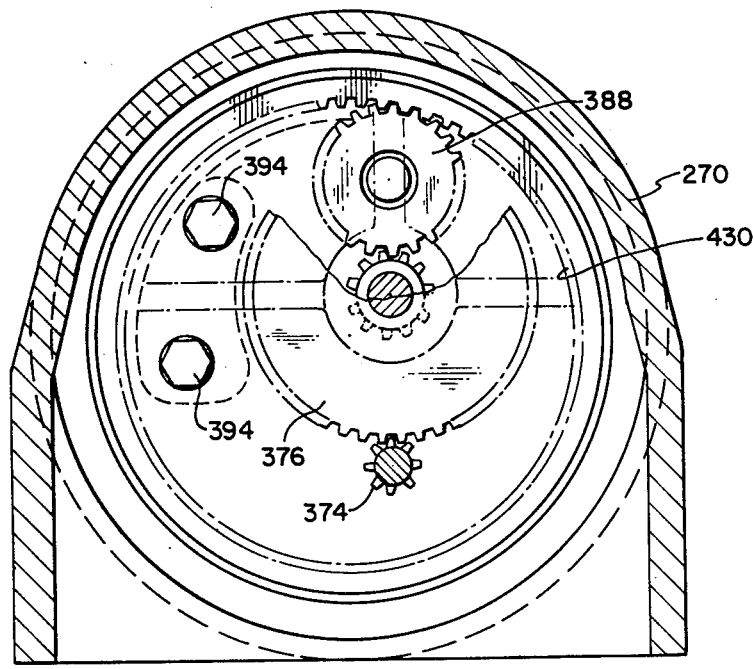

ARM POSITION DEFINED BY

PT. ③ = $\underset{\sim}{a_1} + \underset{\sim}{a_3} + \underset{\sim}{a_2}$

PT. ⑤ = $\underset{\sim}{a_1} + \underset{\sim}{a_3} + \underset{\sim}{a_2} + \underset{\sim}{b}$ PT. ⑥ = $\underset{\sim}{a_1} + \underset{\sim}{a_3} + \underset{\sim}{a_2} + \underset{\sim}{b} + \underset{\sim}{c}$

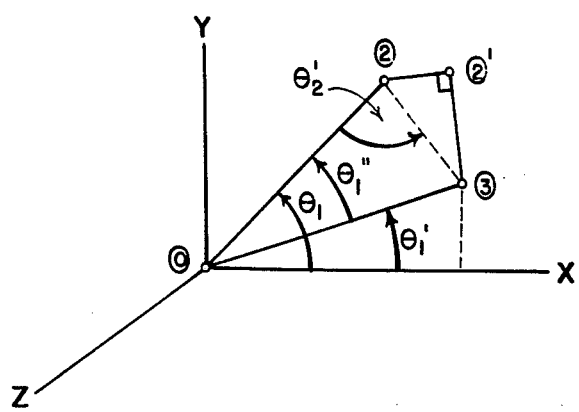
FIG. 32a
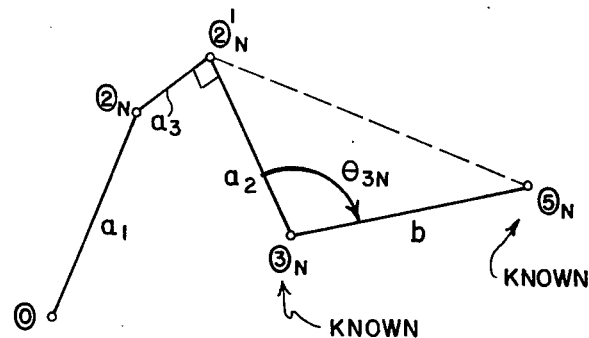
FIG. 33a
FIG. 50
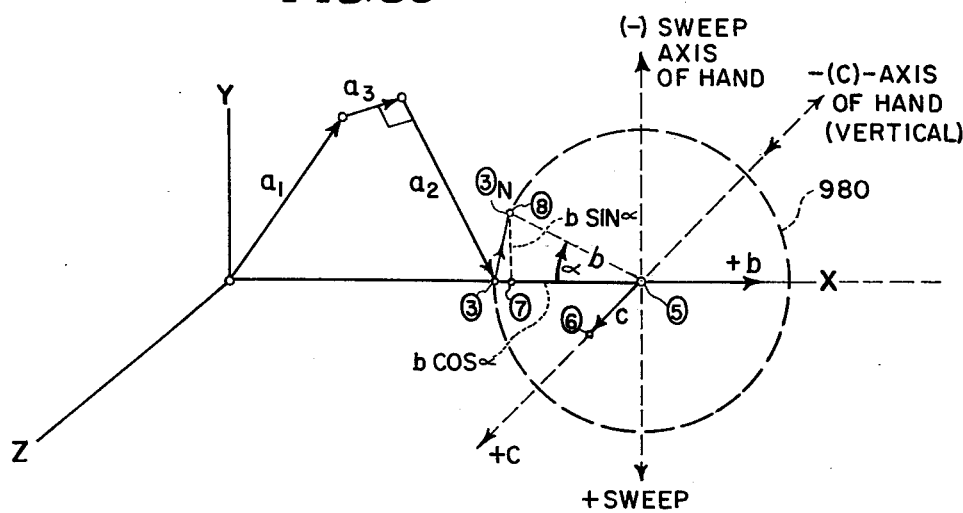

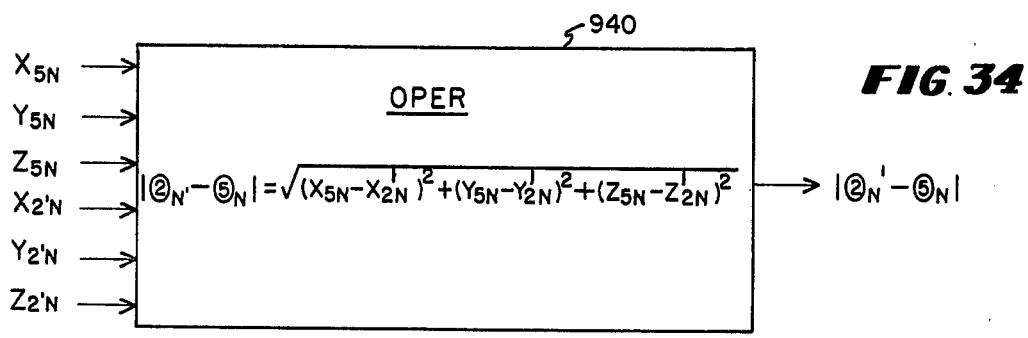
FIG. 34
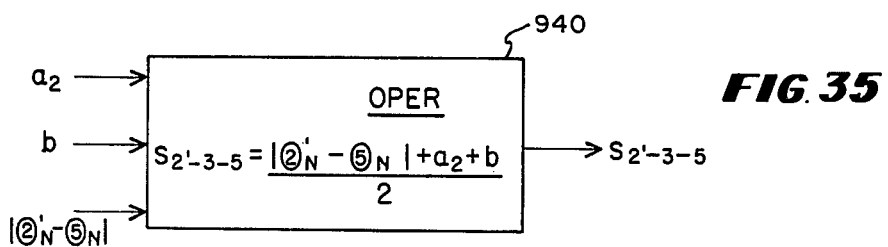
FIG. 35
FIG. 36
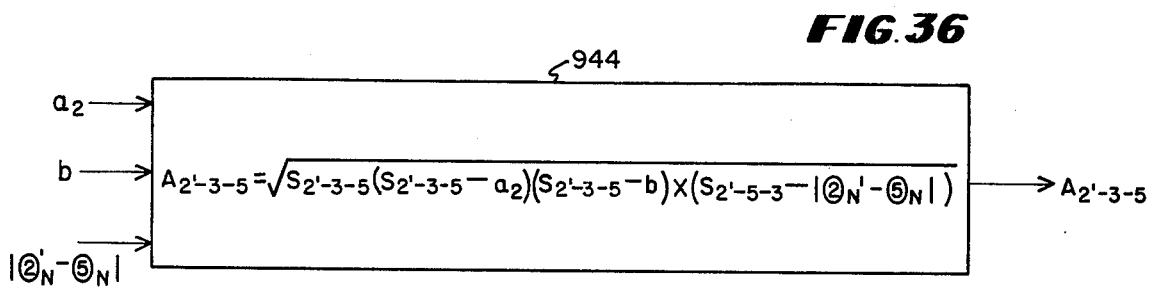
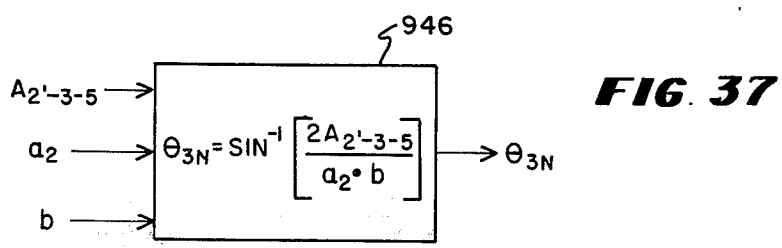
FIG. 37

ALTITUDE = $a_5 = b \cdot \cos(180-\theta_3)$
RADIUS = $r_c = b \cdot \sin(180-\theta_3)$

FIG.51
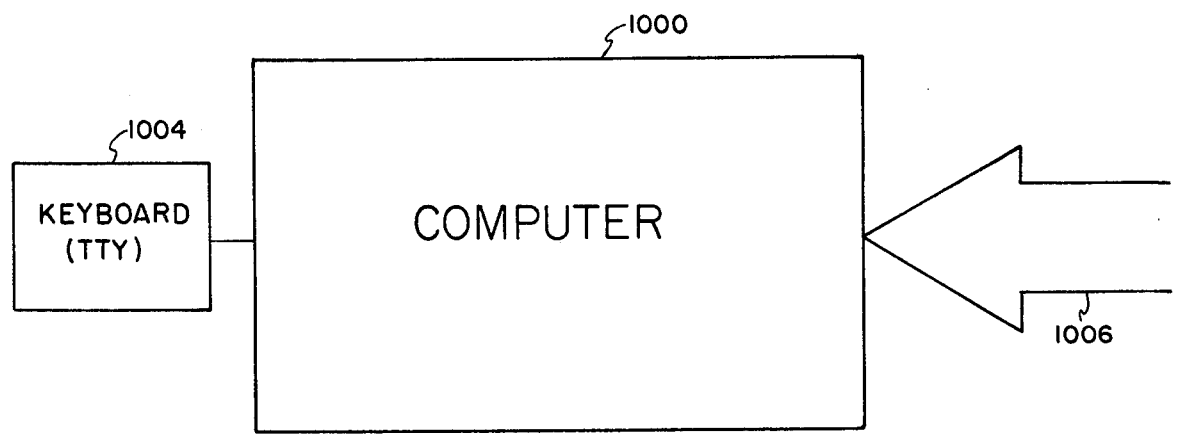
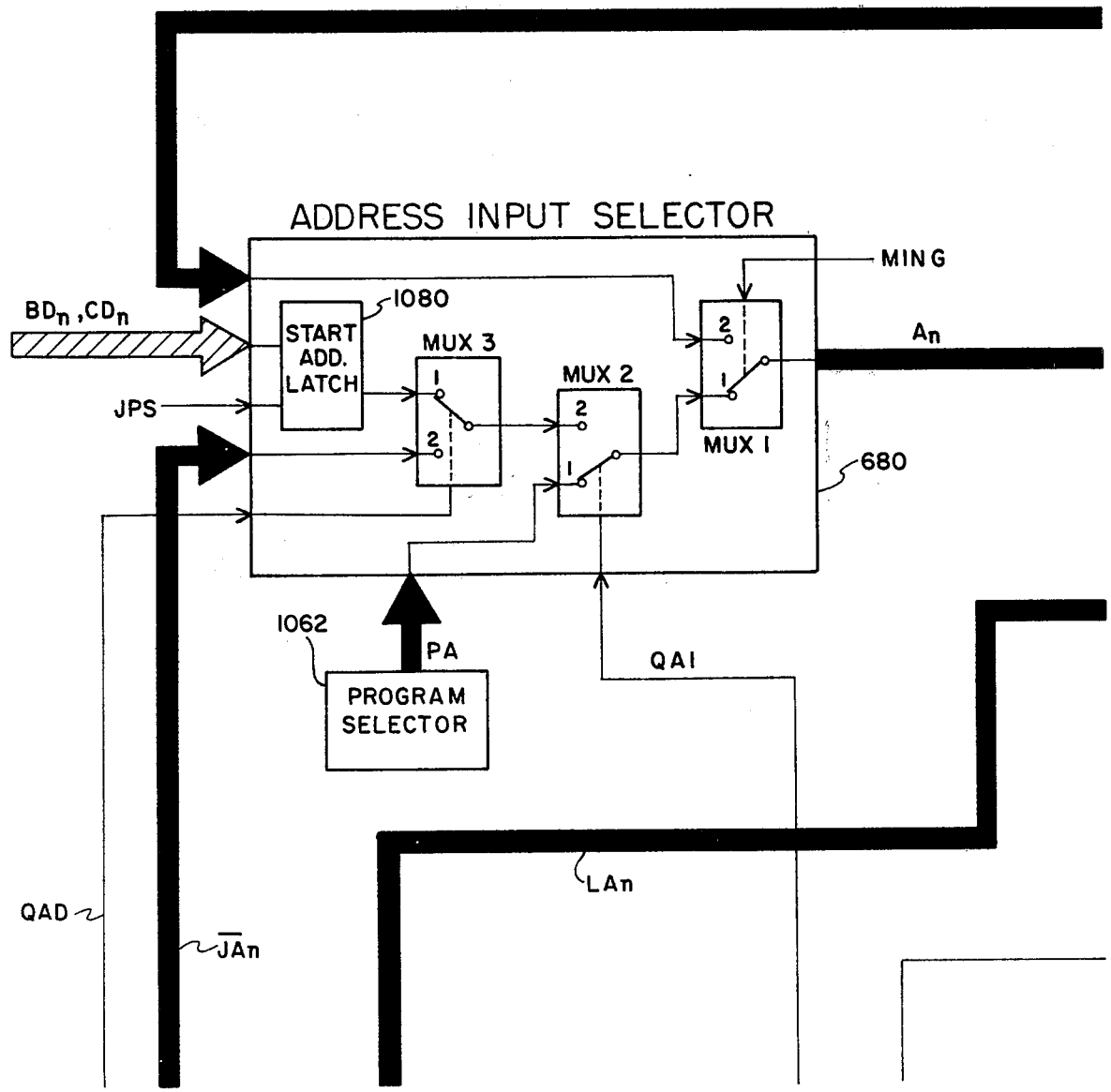

| | GI MULTIPLEX PERIOD | | | | | | | | | | | | | | | PARITY |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | |
| SWITCHES 1026 | -o╲o o- | -o╲o o- | -o╲o o- | -o╲o o- | -o╲o o- | -o╲o o- | -o╲o o- | -o╲o o- | -o╲o o- | -o╲o o- | -o╲o o- | -o╲o o- | -o╲o o- | -o╲o o- | -o╲o o- | X |
| PTP MODE | ACC 2 | ACC 3 | SLOW SPEED | E/P | OX-1 | OX-2 | OX-3 | OX-4 | OX-5 | 0 | 0 | WX-2 | K1 | K2 | WX-1 | X |
| CP MODE | $N_1$ | $N_2$ | $N_3$ | E/P | OX-1 | OX-2 | OX-3 | OX-4 | OX-5 | 0 | 1 | WX-2 | K1 | K2 | WX-1 | X |
| | ←─ NO OF INTERPOLATION INTERVALS ─→ | | | ←──────────── START ADDRESS OF SUB. LIST ────────────→ | | | | | | | | | ←── SUB # 1-7 ──→ | | | |
| JMS MODE | $2^0$ | $2^1$ | $2^2$ | $2^3$ | $2^4$ | $2^5$ | $2^6$ | $2^7$ | $2^8$ | 1 | 0 | START ADD. SUB. LIST $2^9$ | $2^0$ | $2^1$ | $2^2$ | X |
| | ←──────────── START ADDRESS OF JUMP TO ────────────→ | | | | | | | | | | | | | | | |
| JMP OR JMP-R MODES | $2^0$ | $2^1$ | $2^2$ | $2^3$ | $2^4$ | $2^5$ | $2^6$ | $2^7$ | $2^8$ | 1 | 1 | START ADD. JUMP TO $2^9$ | "1" IF RETURN TO N+1 / 0 | 0 | 0 | X |
| COMPUTER BIT NO. | 15 | 14 | 13 | 12 | 11 | 10 | 9 | 8 | 7 | 6 | 5 | 4 | 3 | 2 | 1 | 0 |

| G2 MULTIPLEX PERIOD | | | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 PARITY | |
| SWITCHES 1026 | -o/ oo | -o/ oo | -o/ oo | -o/ oo | -o/ oo | -o/ oo | -o/ oo | -o/ oo | -o/ oo | -o/ oo | -o/ oo | -o/ oo | -o/ oo | -o/ oo | -o/ oo | X |
| PTP MODE | | O | O | O | O | O | O | O | O | OX-6 | T/D | WX-6 | WX-3 | WX-4 | WX-5 OR END/SUB. | X |
| CP MODE | $R_1$ | $R_2$ | $R_3$ | $R_4$ | $R_5$ | $R_6$ | $R_7$ | $R_8$ | $R_9$ | OX-6 | TD | WX-6 | WX-3 | WX-4 | WX-5 OR END/SUB. | X |
| JMS MODE | $(2^0)W$ | $(2^1)W$ | $(2^2)W$ | O | O | O | O | O | O | O | O | O | O | O | O | X |
| JMP OR JMP-R MODES | O | O | O | O | O | O | O | O | O | O | O | O | O | O | O | X |
| COMPUTER BIT NO. | 15 | 14 | 13 | 12 | 11 | 10 | 9 | 8 | 7 | 6 | 5 | 4 | 3 | 2 | 1 | 0 |

CP MODE annotations: CONTROL OF COUNTER 672 (R1–R6); NO. OF DIVIDER STAGES-744 (R7–R9)

JMS MODE annotation: NO. OF STEPS IN JMS SEQUENCE

Note on bit 15 (PARITY column arrow): IN JMS AND JMP-R MODES; "1" MEANS LAST STEP OF SUB.

PROGRAMMABLE AUTOMATIC ASSEMBLY SYSTEM

The present invention relates to programmable manipulator apparatus, and, more particularly, to a programmable automatic assembly system which is capable of assembling small parts by virtue of the programmed coordinated movement between two manipulator arms, the article gripping hands of which are arranged to cooperate in assembling small parts at a centrally located work station.

Programmable manipulators have been employed in various industries for some time to transport articles from one location to another and to perform certain patterned operations such as welding, paint spraying or the like. Such programmable manipulators are shown, for example, in Devol U.S. Pat. Nos. 3,306,471 dated Feb. 28, 1967; Devol 3,543,947 dated Dec. 1, 1970; Dunne et al 3,661,051 dated May 9, 1972; Engelberger et al 3,744,032 dated July 3, 1973; Engelberger et al 3,885,295 dated May 27, 1975; Devol et al 3,890,522 dated June 17, 1975 and British Pat. No. 781,465. While these programmable manipulators are generally suitable for their intended purpose, they have not generally been employed in assembly line operations where numerous small parts must be assembled into larger subassemblies and the packing density of labor is highest. For example, in the automotive industry we see personnal shoulder to shoulder assembling heating and air conditioning units, dashboards, carburetros, brakes, power steering, pumps, windshield wipers, etc.

One reason why programmable manipulators or industrial robots have not been employed in assembly line operations is that heretofore it has been considered necessary to provide some sort of robot eye, in the form of a television monitoring camera or the like, and to provide suitable hand-to-eye coordination so that the robot can interpret the visual scene and provide the correct hand orientation to pick up the article and assemble it to another part. Most, if not all of these arrangements have considered that the robot eye is essential. However, hand-to-eye coordination is extremely difficult and expensive to achieve even in the simplest of assembly operations.

A further reason why programmable manipulators have not heretofore been employed in assembly line operations lies in the basic concept of assembly line production which is to reduce individual acts to the simplest acts practical, on the theory that if the job is simple a worker can be trained quickly and can be made highly adept at a simple task. Further his skill is not a bargaining asset and management is little distressed by personnel turnover. This assembly line concept is carried over into transfer machine automation wherein each station on the line performs only one peculiar function. According to this line of thinking replacement of each of the multitude of workers on an assembly line by an expensive programmable robot is not economically justifiable. Furthermore, in industries outside the automotive industry where relatively low volumes of assembly are required, special purpose assembly machines cannot be economically justified on any basis. In addition, the existing programmable manipulators have not been able to provide the necessary speed and accuracy of positioning which would be required to replace the assembly of parts by human beings. For example, simply to place two mating parts together and assembly them with screws requires a high degree of coordination and cooperation between different manipulator arms if they are to accomplish this operation automatically.

Another reason why existing programmable manipulators have not been employed to perform parts assembly on an assembly line basis is that the teaching or initial programming of each of the manipulators to perform a series of intricate tasks, many of which involve movement in oblique angles and planes, is very laborious and time consuming particularly when it is realized that assembly of parts may be required to a high degree of precision and accuracy. This is particularly true in those situations where the manipulator arm must have at least six independent degrees of freedom in order to permit the article gripping member, i.e. the hand of the manipulator, to have the range of movement necessary to accomplish small part assembly operations. In such instances the requirement for simultaneous movement in a number of different axes during the teaching operation, in order to effect desired movement of the manipulator hand along a particular line, becomes almost impossible for a human operator to perform. For example, if it is required that a pin be inserted into an opening in another part, it is extremely difficult for a human operator to choose just the right velocity components in all axes in which movement is required to give the desired resultant straight line motion along the axis of said opening, particularly where the axis of the opening is not aligned with any axis of movement of the manipulator arm.

The task of initially programming or teaching the manipulator is further complicated by the fact that facilities must be provided for supplying large numbers of unassembled parts to the assembly station where they can be picked up by the manipulator during the assembly operation. Some small parts may be supplied to a fixed pickup point by vibrator bowls or similar apparatus. However, many parts, due to their size, shape, or weight, cannot be fed to a given pickup point but instead are supplied to the assembly station on pallets, each pallet containing a fixed number of parts at different locations on the pallet. The manipulator arm then has to be programmed or taught the position of each part on the pallet so that during successive assembly operations the same type of part will be picked up from different locations on the pallet. Accordingly, the teaching of the manipulator apparatus is further complicated when palletized parts are employed during the assembly operation.

It is also important in situations where small parts are being assembled by means of two cooperating manipulator arms, as for example, when an arm inserts a spring in an opening and holds the spring down while a keeper is placed over the spring by the other arm, that the position of one arm does not move while the other arm is being programmed or taught its desired movement. In prior art arrangements, the manipulator arm may be moved to a desired position during the teaching operation and this position recorded as a program in memory storage for use on playback, but no facilities were provided for ensuring that the arm would remain fixedly at that position for any length of time. Accordingly, the arm could be moved accidentally by the operator in adjusting a part in the area of the manipulator hand. Also, the arm would droop, due to leakage in the controlling hydraulic valves if the arm were left in a particular position for an extended period of time.

It is, therefore, a primary object of the present invention to provide a programmable automatic assembly system wherein one or more of the above-mentioned disadvantages of prior art arrangements is eliminated.

It is another object of the present invention to provide a new and improved programmable automatic assembly system whereby the assembly of small parts is achieved by programmed coordinated movement between two cooperating manipulator arms.

It is a further object of the present invention to provide a new and improved programmable automatic assembly system wherein coordination between two closely-spaced programmable manipulators is employed to assemble parts on a centrally located work table and improved facilities are provided for initially teaching the two manipulators to perform the desired assembly operations.

It is another object of the present invention to provide a new and improved programmable manipulator which is particularly adapted by virtue of its speed and accuracy of positioning to be employed in the assembly of small parts at a work station adjacent to the manipulator.

It is a further object of the present invention to provide a new and improved programmable manipulator arrangement wherein facilities are provided for assisting the teaching or programming of the manipulator arm so that the article gripping hand may be moved in a particular direction and to a desired end point along that line automatically.

It is a still further object of the present invention to provide a new and improved programmable manipulator arrangement wherein a computer is employed during the initial teaching or programming of the manipulator arm to calculate the points along a desired straight line path and record these points as program steps in the manipulator memory, these steps on playback causing the manipulator hand to move along the desired straight line.

It is another object of the present invention to provide a new and improved programmable manipulator arrangement in which a computer may be used during the initial teaching or programming of the manipulator arm to perform various tasks and calculations and facilities are provided for storing the data generated by the computer at the correct program step in the manipulator memory, thereby to control movement of the manipulator arm on playback in accordance with data generated by the computer during the teaching operation.

It is another object of the present invention to provide a new and improved programmable manipulator arrangement for removing parts from or placing parts on predetermined locations on a pallet wherein a computer is employed during the initial teaching or programming of the manipulator arm to calculate from data fed into the computer regarding certain locations where the manipulator arm picks up or places parts on the pallet, the program steps necessary to move that manipulator arm to all other locations of parts on the pallet during successive playback cycles, and to record these program steps in the manipulator memory automatically.

It is still another object of the present invention to provide a new and improved programmable automatic assembly station wherein two programmable manipulator arms cooperate with a centrally located work table to assemble a plurality of parts on the table while occupying a minimum of floor space for the overall assembly station.

It is a further object of the present invention to provide a new and improved programmable automatic assembly system wherein a number of assembly stations each employing a pair of cooperating manipulator arms are employed and facilities are provided for operating these assembly stations in out of phase relationship so that a single human operator can perform certain manual tasks at each assembly station in sequence.

It is another object of the present invention to provide a new and improved programmable automatic assembly station wherein two programmable manipulator arms cooperate with a centrally located work table to assemble a plurality of parts on the table and facilities are provided during the initial teaching or programming of each manipulator arm for holding either arm in its most recently taught position while the other arm is moved to its next desired position.

It is still another object of the present invention to provide a new and improved programmable manipulator arrangement, wherein facilities are provided during the initial teaching operation for temporarily recording the position of the manipulator arm and employing each temporarily recorded position to control the position of the arm during the teaching operation until the arm is moved to a different position.

It is a further object of the present invention to provide a new and improved programmable automatic assembly system wherein a plurality of automatic assembly stations are provided each having a pair of programmable manipulator arms which cooperate in the assembly of a desired group of parts, computer storage facilities common to said stations are employed for storing a series of program steps suitable for moving each of the manipulator arms at a particular station in accordance with a desired series of movements, and control means are provided for supplying the stored program steps to the manipulator arms in each of the assembly stations as required to permit the simultaneous assembly of groups of parts at said stations.

Briefly, in accordance with one aspect of the invention, a series of programmable automatic assembly stations are provided, each of these stations including a pair of small, highly maneuverable articulated manipulator arms which can cooperate in the assembly of small parts at a centrally located work table between the manipulator arms. All of the necessary parts to complete a given assembly are positioned in predetermined locations at each assembly station and in such position that they may be grasped by one of the manipulator arms and assembled to or with other parts.

Furthermore, each assembly station includes a number of interchangeable manipulator hands so that grippers of different types, screwdrivers and other tools may be selectively connected to either manipulator arm so that a wide variety of assembly tasks can be performed at each station. Also, each of the manipulator arms at each assembly station is capable of being moved at relatively high speed and with a high degree of accuracy so that the assembly of small parts to precise tolerances can be accomplished in a minimum amount of time.

With such an assembly station concept a large number of assembly operations are performed at each assembly station which requires only a small amount of floor space as compared to a conventional assembly line in which a larger number of personnel are employed, one for each assembly operation. Furthermore, since the assembly of parts is being performed simultaneously at different assembly stations, if a breakdown occurs at one assembly station, the entire production is not halted, but instead, only the production at a particular assembly station is lost. For example, in an assembly system employing twenty assembly stations, if a downtime incident occurs every twenty hours there would be a loss of production of only one-twentieth the amount if a common conveyor system were employed for the same amount of downtime.

In accordance with a further aspect of the invention, the manipulator arms at one of the assembly stations can be taught or programmed in any desired sequence of steps and the taught series of program steps may be stored in a mass memory, such as a disc file of large capacity, which is common to all of the assembly stations. If the assembly of parts is not critical in positioning of the manipulator arms, the taught series of program steps may be employed to control the manipulator arms at the other assembly stations so that identical groups of parts may be simultaneously assembled at each station. This may be accomplished by providing only storage facilities for one or two program steps at each assembly station and sequentially transferring the common stored program steps to each assembly station to effect the desired series of assembly steps at each station. Such an arrangement eliminates the requirement of large capacity, separate program storage facilities in connection with each programmed manipulator arm, as was required in past arrangements. Even if the assembly tolerances are such that the manipulator arms at each assembly station have to be separately programmed, due to manufacturing tolerances and other differences between individual manipulator arms, the provision of a large capacity central storage facility for the program steps required by each assembly station is generally more economical than providing separate storage facilities for each manipulatorm arm, as has been done in the past.

In accordance with a further aspect of the invention a teaching assist arrangement is provided wherein a computer may be interfaced with the control circuitry of a particular manipulator arm and may be employed to calculate the successive positions required to move the manipulator arm in a desired direction. The complex interrelated movements in the various axes of the manipulator arm to produce resultant movement in a desired direction require extensive calculations which are quite time consuming even for the computer to accomplish. However, by performing these calculations during the teaching operation, which is usually accomplished by moving the manipulator arm quite slowly to a desired position, and then recording the positions which have been calculated, sufficient time is provided for the computer to perform its calculations. Once these calculations have been made and the computed positions stored as program steps in the memory, they may be used as command signals during playback without requiring the assistance of the computer. This is particularly important because the computer would not be capable of carrying out these complex calculations during each playback or repeat cycle and move the manipulator arm at a sufficiently high rate of speed to be useful in assembling parts on a mass production basis.

With the specific arrangement of the present invention, the manipulator hand can be aimed in any desired direction and a desired distance along that direction may be designated by the teaching operator. The computer than performs all of the necessary calculations to accomplish straight line motion of the hand in that particular direction and to the desired distance so that insertion of one part within another, taking parts from a pallet, and other complex teaching jobs are substantially simplified. In accordance with another aspect of the invention, the calculations performed by the computer are substantially simplified by making the assumption that the outer three axes of the manipulator arm, which control orientation of the manipulator hand, all move in parallel straight line motion in the particular desired direction. This assumption introduces only very slight errors if movement from one program point to the next is kept quite small, and the time required for the computer to perform the necessary calculations is substantially reduced by making this assumption.

In accordance with another phase of the invention, the computer may be employed during the teaching operation to assist the teaching operator in recording a series of program steps which are required when the manipulator arm picks up parts from, or places parts on, a pallet. Specifically the operator may move the manipulator arm to three points on the pallet at which parts are to be picked up, such as the parts at three corners of the pallet, and data regarding these three positions are fed into the computer along with data as to the number and spacing of parts on the pallet. The computer than calculates the required position of the manipulator arm to pick up all other parts on the pallet and record the calculated positions as program steps which will be used on playback to pick up successive parts from the pallet during successive playback cycles.

In accordance with another aspect of the invention, facilities are provided for moving the manipulator hand in a straight line path between two programmed end points. This arrangement substantially reduces the number of program steps which must be recorded to accomplish a desired series of movements, particularly when these movements involve complex curved paths, and the like. To effect such straight line motion, the distance to be moved in each axis is divided into a number of equal increments and artificial command signals are generated at equally spaced intervals which are employed to move the manipulator arm at a constant velocity in each axis proportional to the distance to be moved in that axis. During the teaching operation a computer may be employed to calculate the number of increments and the rate of generation of said increments necessary to provide a predetermined velocity on playback and these calculations are stored at the appropriate program step in the manipulator memory for use during playback.

In accordance with a further aspect of the invention facilities are provided for the inclusion of one or more manually performed assembly steps at each assembly station in timed relationship so that a single human operator can perform the same manual assembly steps at all of the assembly stations. For example, if a limp O-ring is to be inserted at a particular point in an assembly operation, this operation being performed more readily by hand than by the programmed manipulator, the assembly operations at each assembly station are coordinated so as to permit a human operator to perform the manual assembly step at a particular assembly station and then move on to the next assembly station and perform the same manual step at that station. As a result, a single human operator may serve a large number of assembly stations each of which is simultaneously assembling a group of parts.

The invention, both as to its organization and method of operation, together with further objects and advantages thereof, will best be understood by reference to the following specification taken in connection with the accompanying drawings in which:

FIGS. 1 to 3, inclusive, are perspective views of the programmable automatic assembly station of the present invention;

FIG. 7 is a fragmentary view similar to FIG. 6 and showing the base drive portion of the manipulator of FIG. 6;

FIG. 8 is a fragmentary, plan view of the manipulator base portion of FIG. 7;

FIG. 14 is a rear view of the gear drive portion of FIG. 11 taken on a somewhat larger scale;

FIG. 15 is a sectional view taken along the line 15—15 of FIG. 14;

FIG. 16 is a sectional view taken along the line 16—16 of FIG. 15;

FIG. 17 is a fragmentary side elevational view similar to FIG. 11 but taken on a somewhat larger scale;

FIG. 18 is a sectional view taken along the line 18—18 of FIG. 17;

FIGS. 31 to 37 are logic block diagrams illustrating the manner in which new angular values for three controlled axes of the manipulator of FIG. 6 are calculated;

FIG. 32a is a simplified diagrammatic perspective representation similar to FIG. 29 and employed in describing the logic block diagram of FIG. 32;

FIG. 33a is a simplified diagrammatic perspective representation similar to FIG. 29 and employed in describing the logic block diagrams of FIGS. 33 to 37;

FIG. 50 is a diagrammatic perspective representation similar to FIG. 29 but showing the manipulator arm in a different position and is employed in describing how new angular values are computed when rotation about one of the controlled axes is desired;

Figure 6:
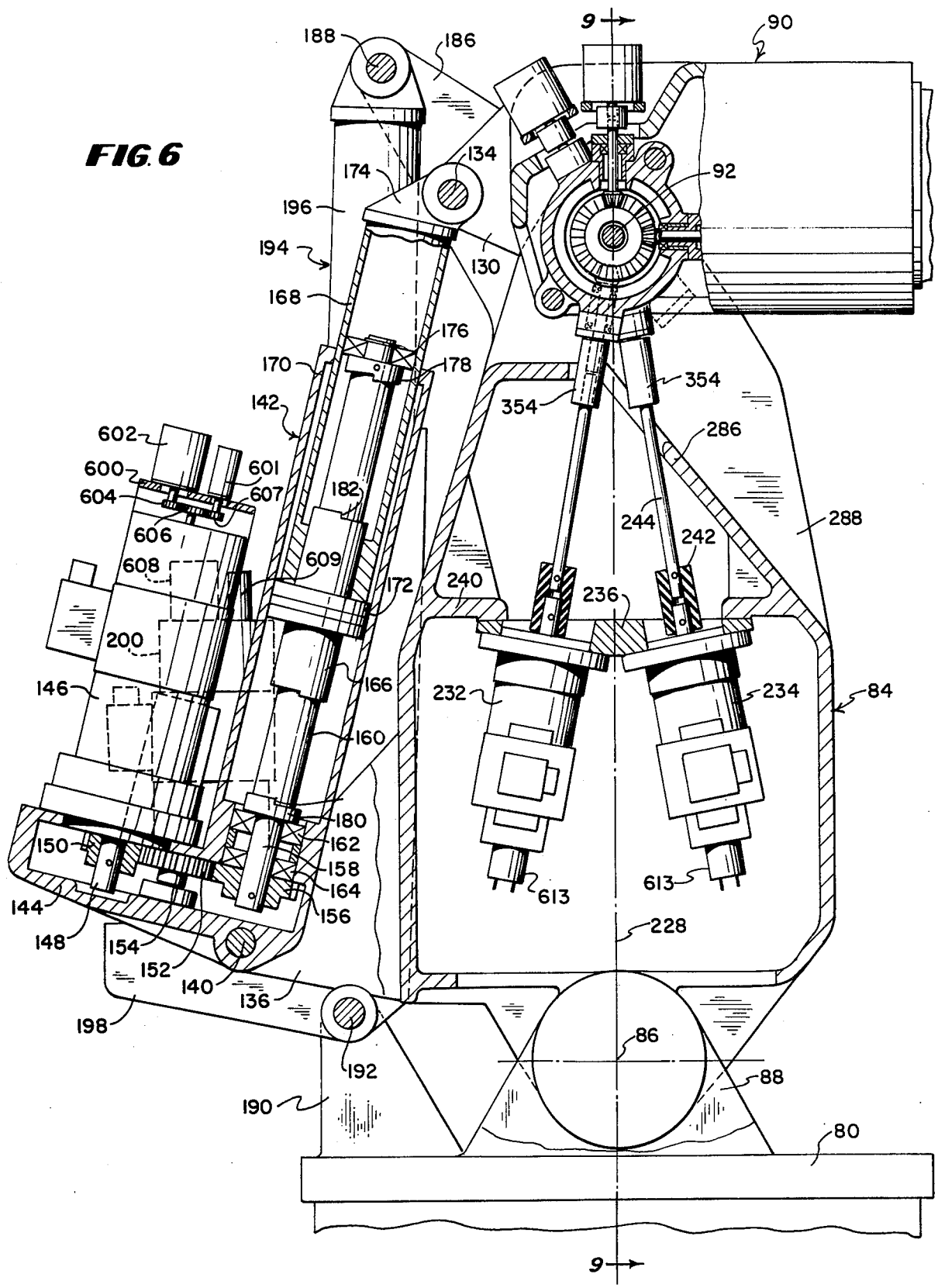
FIG. 6 is a fragmentary, front elevational view, partly in section, of one of the manipulators of the assembly station of FIG. 1.
Figure 9:
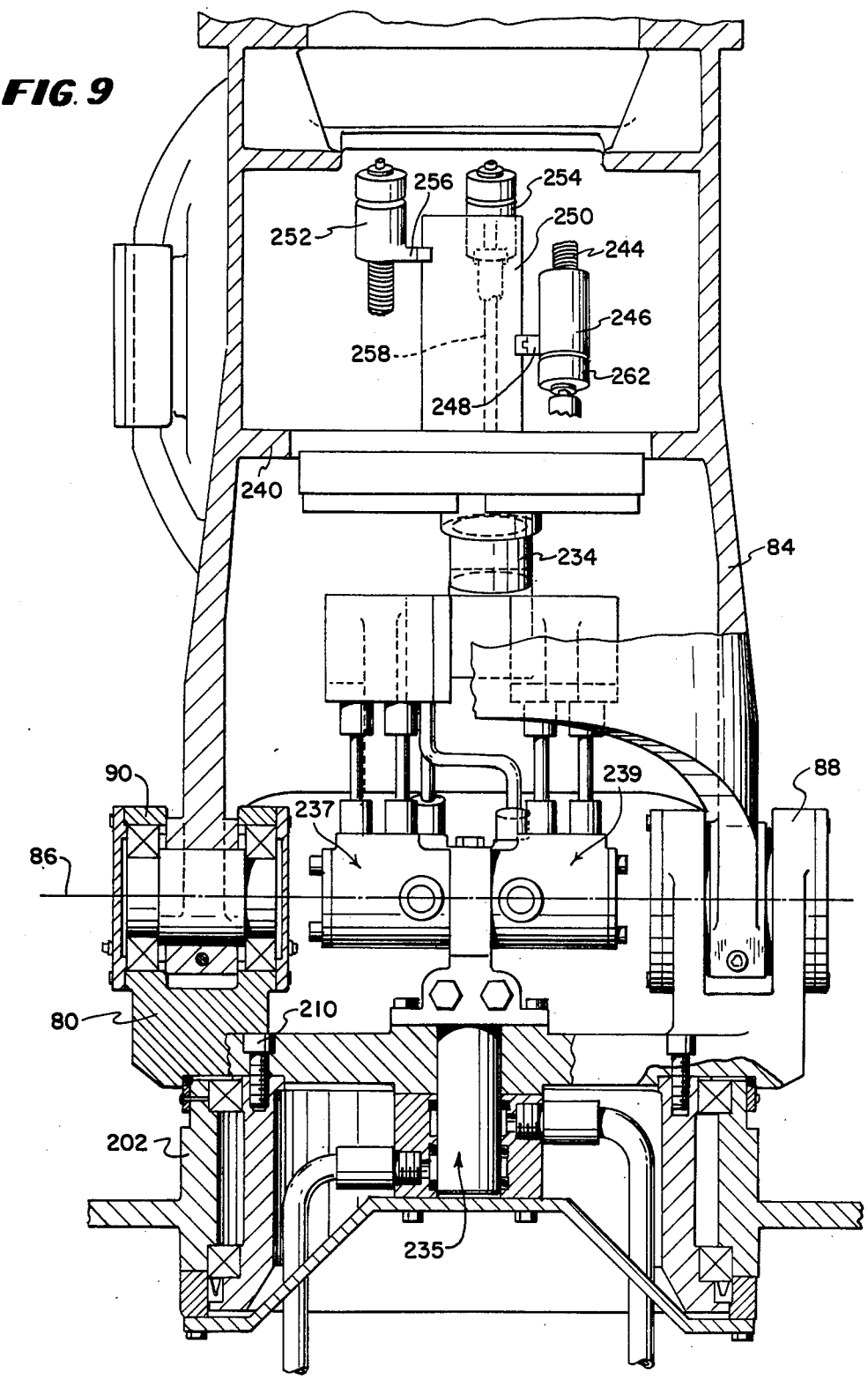
FIG. 9 is a fragmentary sectional view taken along line 9—9 of FIG. 6.
Figure 10:
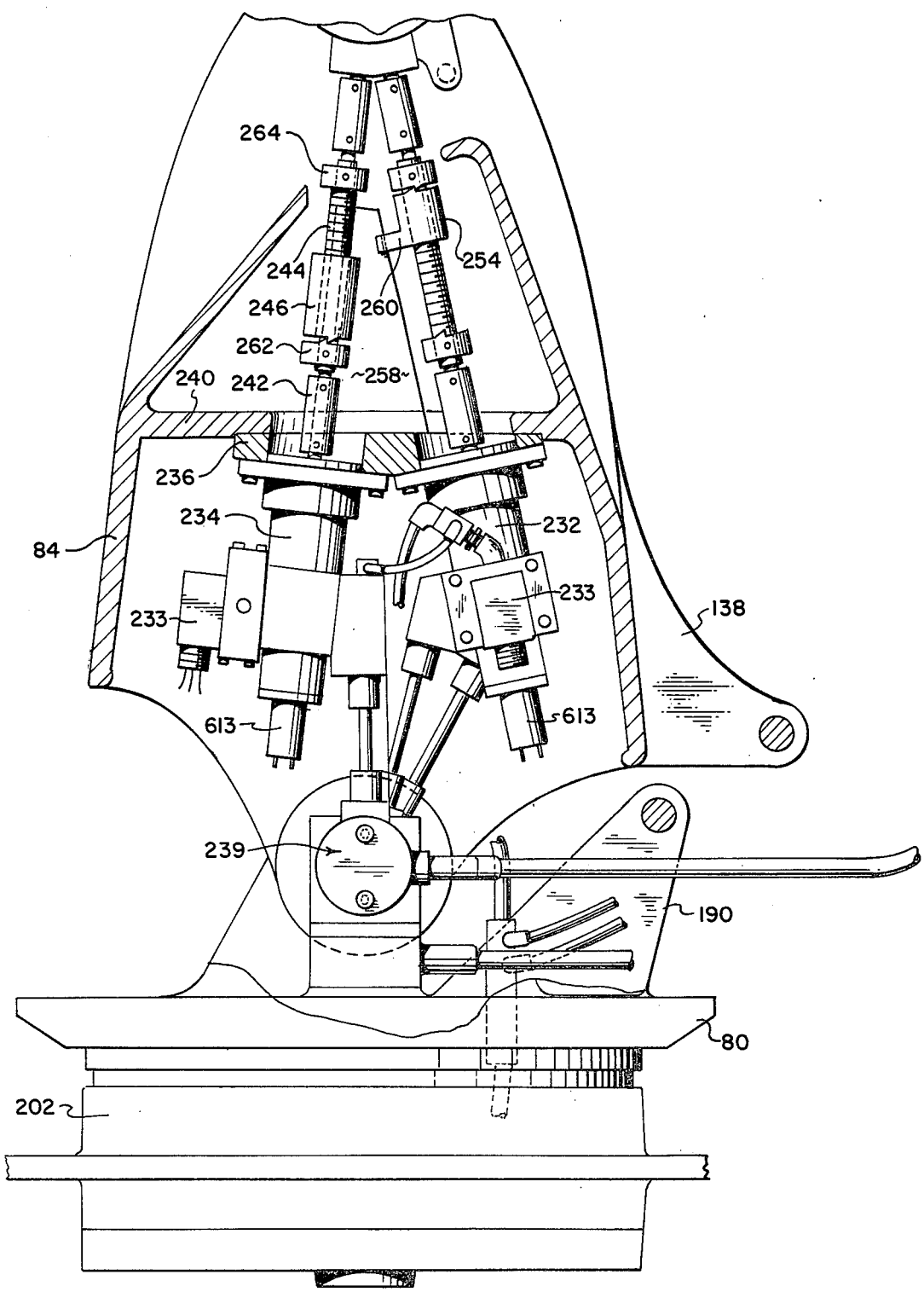
FIG. 10 is a fragmentary rear view of the manipulator of FIG. 6.
Figures 58, 58A:
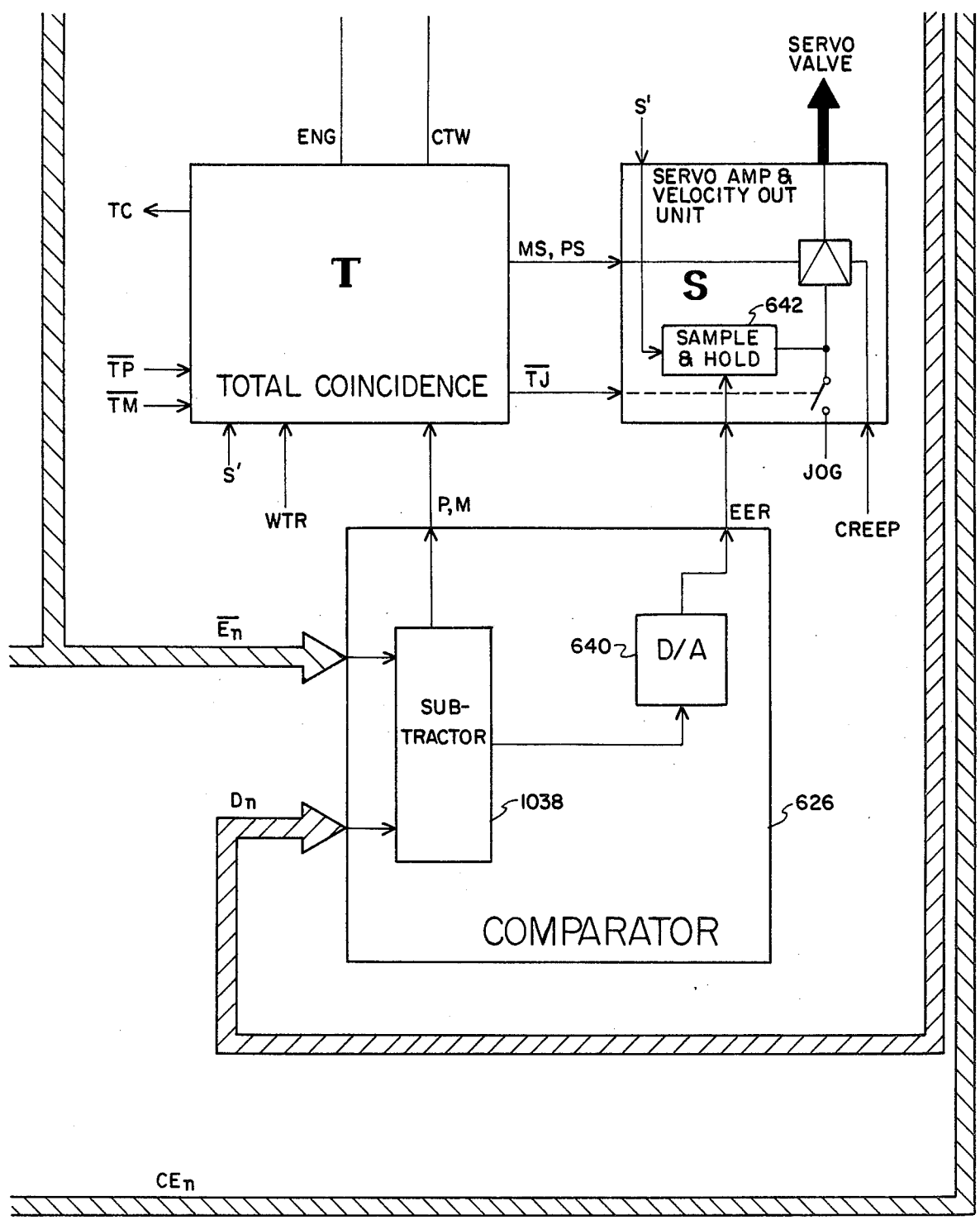
Figure 59:
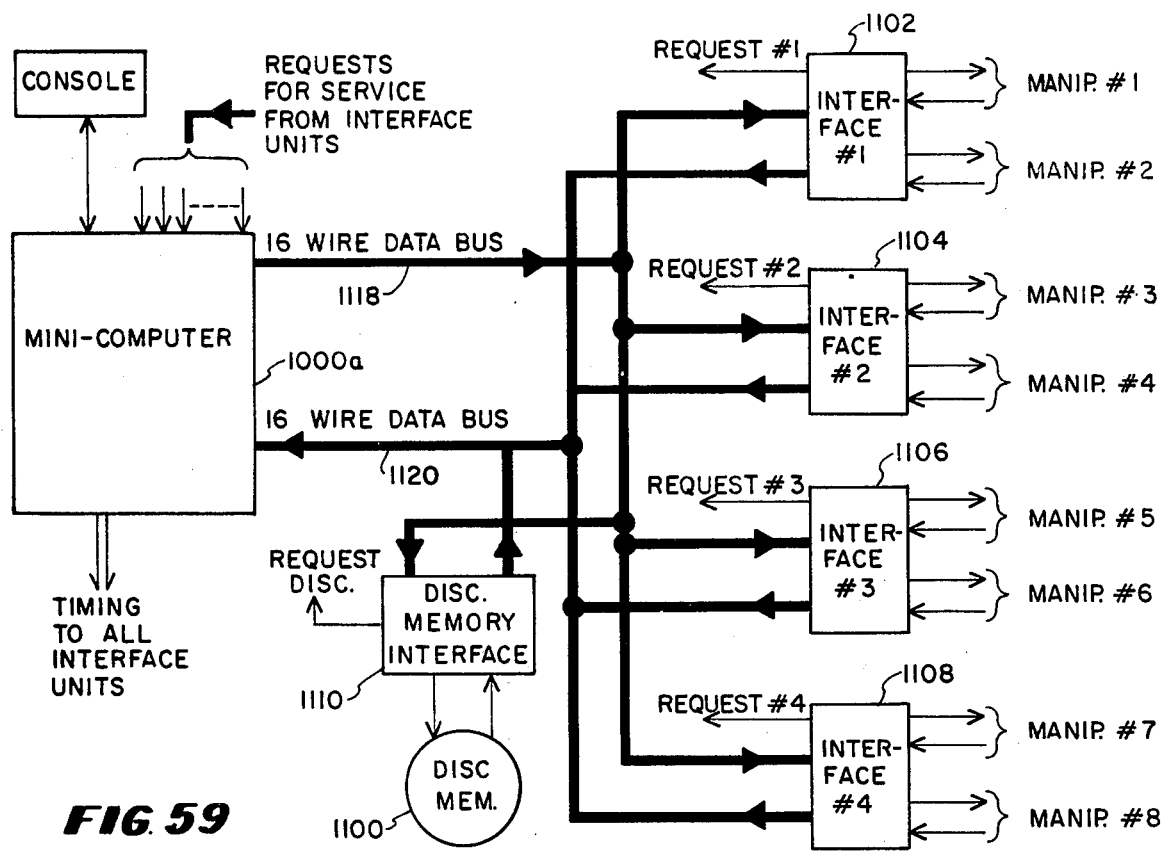
Figure 60:
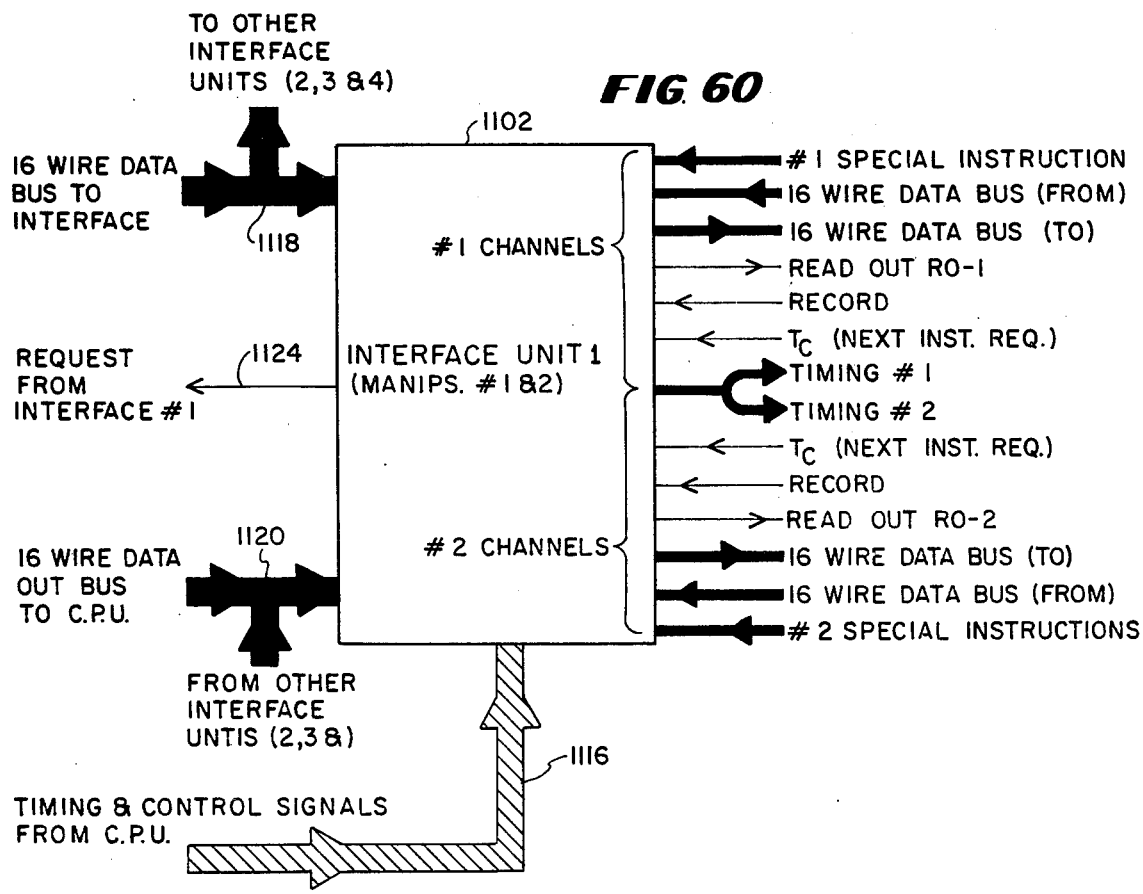
Figure 61:
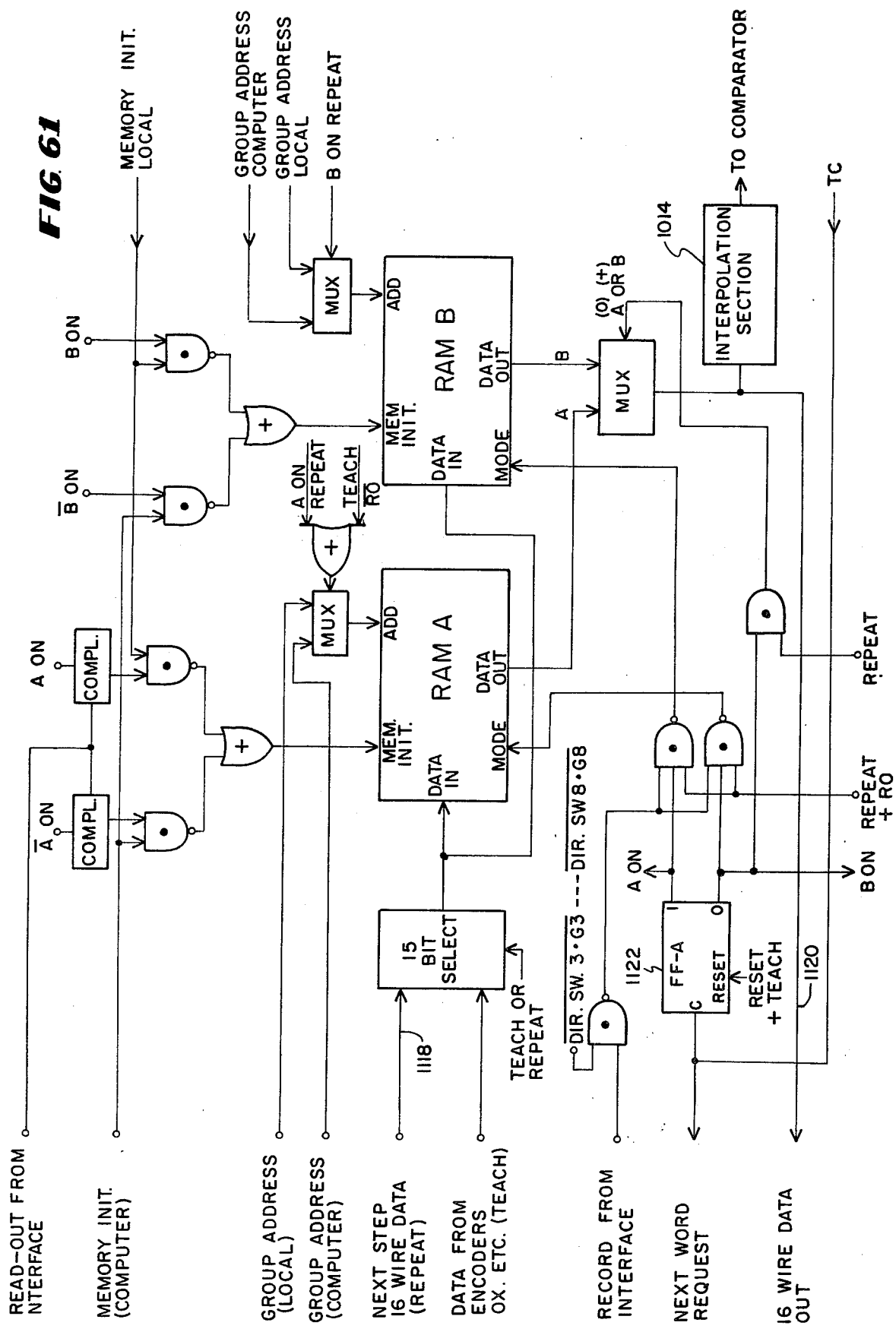

FIGS. 51 to 58, when arranged in the manner shown in FIG. 58A, comprise a block diagram of the electronic control circuitry of the manipulator of FIG. 6 and illustrates how a computer may be employed as a teach-assist facility during the teaching mode of the manipulator;

FIG. 59 is a block diagram of a group of assembly stations controlled by common computer and memory facilities;

FIG. 60 is a diagram of one of the interface units of FIG. 59;

FIG. 61 is a block diagram of the control and storage facilities provided at one of the manipulators in the system of FIG. 59; and FIGS. 62 and 63 are diagrams illustrating the preferred arrangement of auxiliary control signal bits for two multiplex periods in the system of FIGS. 51 to 58.

Figure 1:
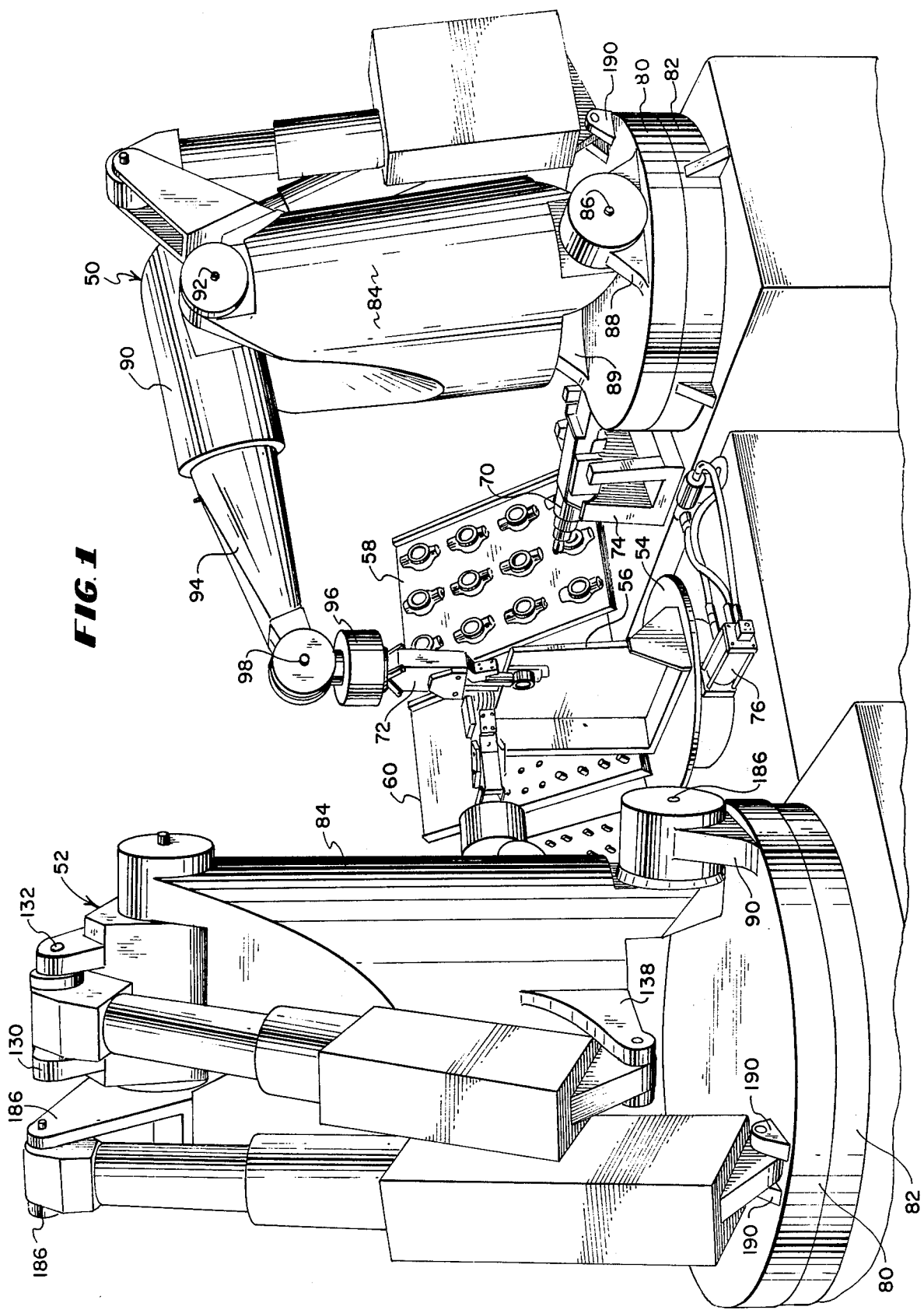
Figure 2:
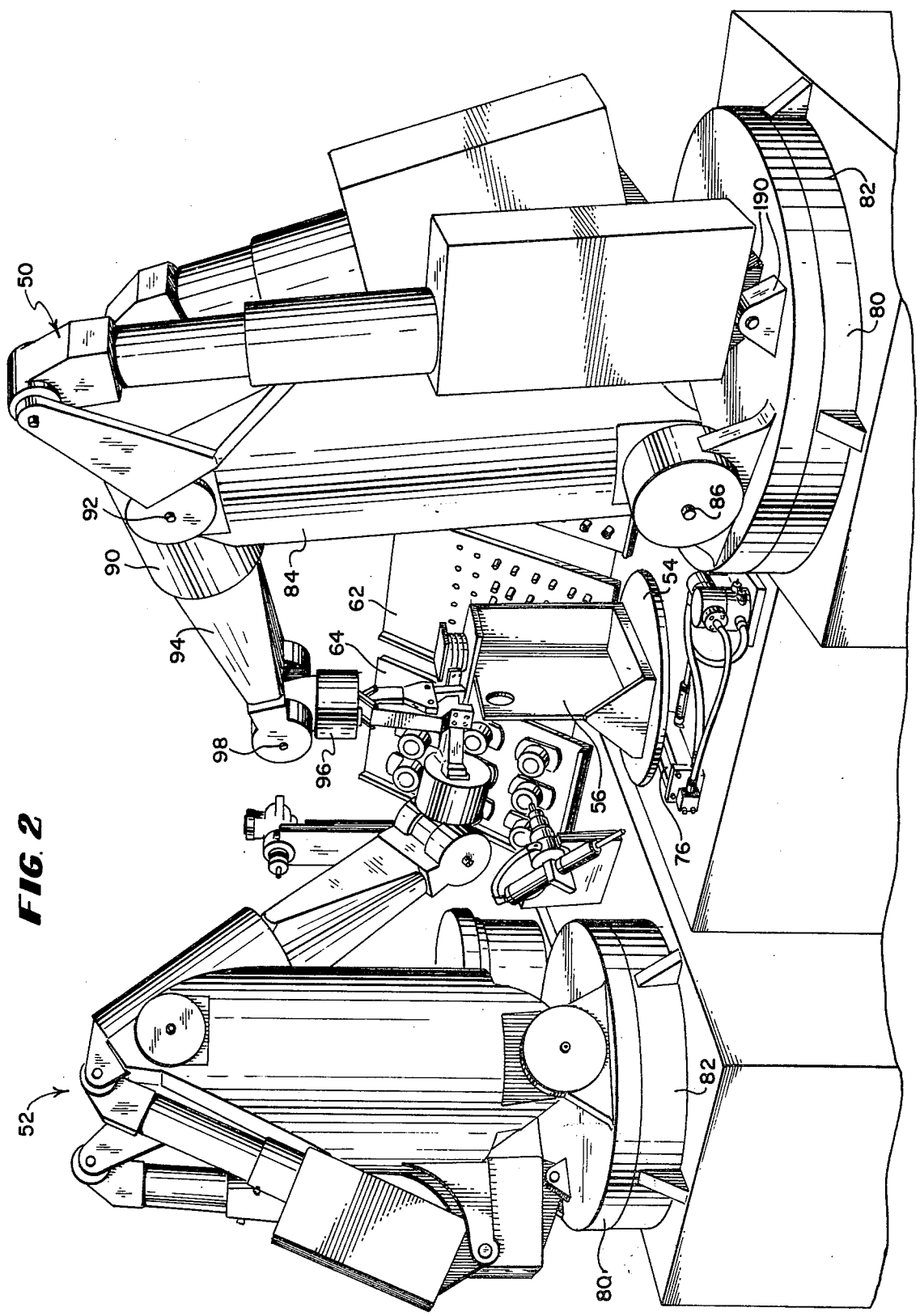
Figure 3:
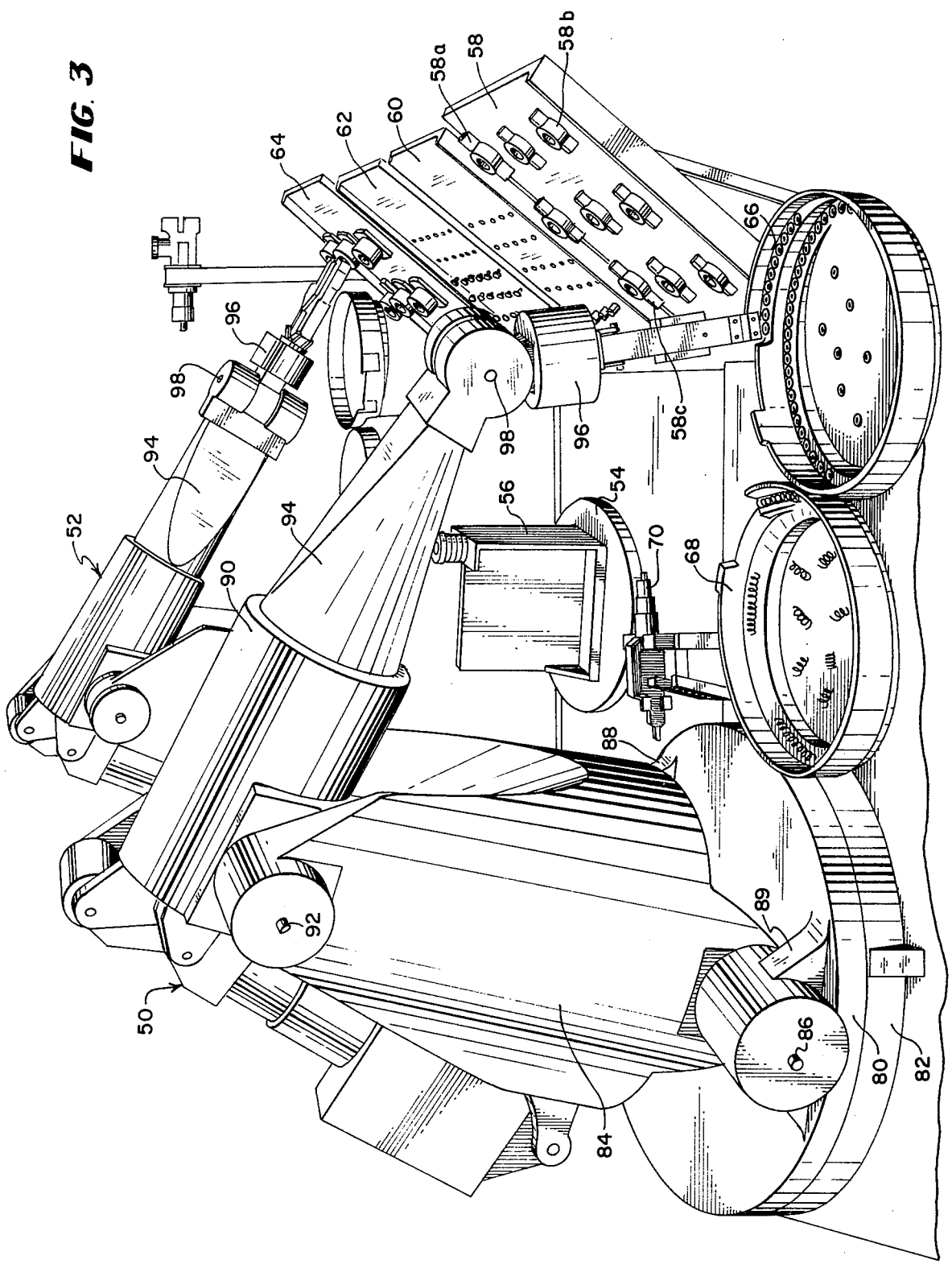

Referring now to the drawings, and more particularly to FIGS. 1 to 21, inclusive thereof, the programmable assembly system of the present invention comprises a plurality of automatic assembly stations one of which is shown in FIGS. 1, 2 and 3, it being understood that a number of similar automatic assembly stations are provided in the overall system and are arranged to be controlled by a common computer arrangement or common storage facilities as will be described in more detail hereinafter.

Each of the automatic assembly stations shown in FIGS. 1 to 3, inclusive, includes a pair of programmable manipulator arms, indicated generally at 50 and 52 which are positioned on opposite sides of a centrally located rotatable work table. The table 54 includes a vertically extending work plate 56 on which parts may be positioned for assembly with other parts thereon to provide a completed subassembly of parts.

In accordance with an important aspect of the invention, the manipulator arms 50 and 52 are capable of moving at high speed and may be positioned with a high degree of accuracy so that the assembly of small parts to precise tolerances can be achieved. Furthermore, each of the manipulator arms 50, 52 is provided with six degrees of angular motion and is comparable in its flexibility and versatility to the human arm so that individual parts which are positioned in predetermined locations on work pallets 58, 60, 62 and 64 may be grasped by the article gripping hand of one of the manipulator arms, removed from the pallet and assembled on the work plate 56 in the desired sequence to effect a particular assembly of parts on the work table 54. Also nested around the working area of the manipulator arms 50, 52 are a series of vibrator bowls 66, 68, which may contain various small parts such as springs, washers, and the like, and are positioned so that the article gripping manipulator hand may grasp one of these items at a predetermined location and insert it in the desired sequence during the assembly operation.

In order that a wide variety of parts may be grasped and assembled with other parts, each of the manipulator arms 50, 52 is provided with a series of interchangeable manipulator hand, such as the manipulator hands 70 and 72 associated with the manipulator arm 50, the hands 70 and 72 being held in a bracket 74 when not in use in such position that they may be automatically inserted into a cooperating socket in the end of the manipulator arm.

Also, to facilitate the insertion of one part within another at tolerances which are more precise than the positioning accuracy of the manipulator arms 50, 52, the work table 54 is arranged to be vibrated by a vibrator 76 which is mechanically connected to the base of the work table 54. In addition, the work table may be rotated to different indexed positions to facilitate the insertion of parts on the work plate 56 by the arms 50, 52.

Considering now the mechanical arrangement of the manipulator arms 50, 52 which permits the rapid assembly of parts at high accuracies, each of the manipulator arms, such as the manipulator arm 50, includes a rotary platform 80 which is movable about a vertical axis and is supported by the main base member 82 of the manipulator 50. A shoulder arm portion 84 is pivotally mounted on a horizontal shoulder joint or axis 86 by means of a pair of upstanding ear portions 88 and 89 on the platform 80. An elbow arm portion 90 is pivotally mounted on the upper end of the shoulder arm portion 84 and is connected to the arm portion 84 by means of a horizontal elbow joint or axis 92. A forearm portion 94 which is coaxial with the elbow arm portion 90 is rotatable about the axis of the elbow arm portion 90 to effect a so-called forearm twist motion. The outer end of the manipulator hand 96 is provided with a socket adapted to receive one of the manipulator hands 70, 72 and may be rotated about a wrist bend axis 98 at the end of the forearm portion 94. The outer end portion 96 of the manipulator hand may also be rotated in a wrist swivel axis which is perpendicular to and intersects the wrist bend axis 98.

Figure 4:
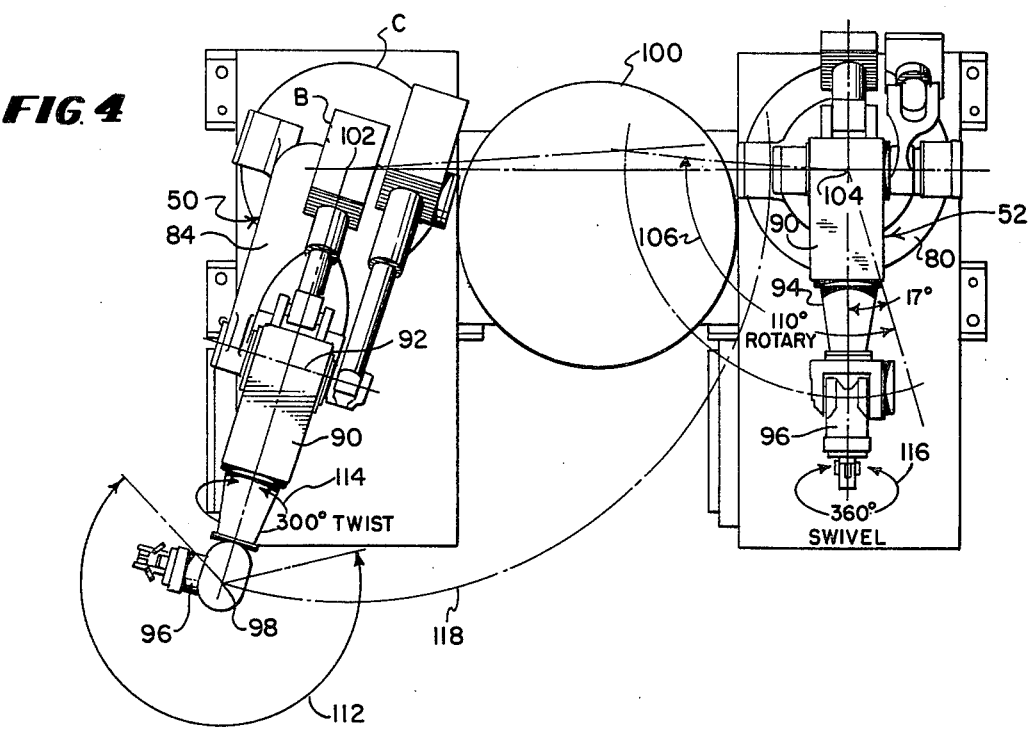
FIG. 4 is a diagrammatic plan view of the assembly station of FIG. 1 showing the motions in various axes thereof.

In accordance with an important aspect of the invention, movement of each of the manipulator arms 50, 52 in the above described six different axes is arranged so that the different manipulator hands attached to the end of each manipulator arm may be employed to accomplish a wide variety of assembly operations with respect to the centrally located work area. Thus, referring to FIGS. 4 and 5, the area of the rotatable work table 54, indicated generally by the circle 100 in FIG. 4, is positioned somewhat ahead of and spaced between the two waist or rotary motion axes 102 and 104 of the manipulator arms 50 and 52, respectively. Furthermore, the rotary motion of each manipulator arm in the waist axes 102, 104 is limited to 110 degrees as indicated by the arc 106 for the manipulator arm 52, a similar but mirror image motion being provided for the manipulator arm 50. Motion about the shoulder axis 86 (FIG. 5) is limited to 80 degrees, as indicated by the arc 108 in FIG. 5. Movement in the elbow axis 92 may be approximately 130 degrees, as indicated by the arc 110 in FIG. 5. Movement in the major axes, i.e. the waist, shoulder and elbow axes, is limited in the manner described above so that motor driven precision ball-screw linear actuators may be employed to drive the indicated arm portions over these limited ranges of movement and position the same with a high degree of accuracy while moving these relatively heavy portions of the manipulator at a high rate of speed, as will be described in more detail hereinafter.

In order to provide drive means for the outer three axes, i.e. the forearm twist, the wrist bend and wrist swivel axes, which will permit more extensive movement of the outer end of the manipulator arm, while avoiding rotational inertia effects which become increasingly important at high speeds, the drive means for these three outer axes are all located within the shoulder arm portion 84 of each manipulator arm and each drive means is directly connected by gearing to the outer end of the manipulator arm through coaxially arranged beveled gear drive systems arranged along the elbow axis 92, as will be described in more detail hereinafter. Accordingly, the manipulator hand portion 96 can be moved in the wrist bend axis 98 through an arc of approximately 240 degrees as shown by the arrow 112 in FIG. 4. The forearm twist portion 94 of each manipulator arm may be rotated through an arc of approximately 300 degrees as indicated by the arrow 114 in FIG. 4 and the manipulator hand portion 96 may be rotated continuously through 360 degrees in the wrist swivel axis as indicated by the arrow 116 in FIG. 4. As a result, each of the manipulator arms 50, 52 may be moved so that its wrist bend axis follows the center line indicated at 118 in FIG. 4 for the manipulator 50, with respect to the waist axis 102. The wrist bend axis 98 is also movable along the center line indicated at 120 in FIG. 5 as the elbow arm portion 90 is moved about the elbow axis 92 from the position shown in full lines to the position shown in dotted lines in FIG. 5 and as the shoulder portion 84 is moved from the position shown in full lines to the position shown in dotted lines in FIG. 5 the axis 98 is movable along the center line 121. It will thus be seen that complete coverage of the work area around the work table 54 is provided by the cooperating manipulator arms 50, 52 while at the same time providing an arrangement whereby each manipulator hand may be moved at a high rate of speed and accurately positioned to accomplish the desired assembly operations in a minimum amount of time.

Considering now the manner in which each manipulator arm is moved in the three major axes, i.e. the waist, shoulder and elbow axes, consideration will first be given to the manner in which the elbow arm portion 90 is moved about the elbow axis 92. Thus, referring to FIGS. 6, 11 and 13 the elbow arm portion 90 is provided with a pair of rearwardly extending ear portions 130 and 132 which support a pivot pin 134 therebetween and the shoulder arm portion 84 is provided with a pair of rearwardly extending flange portions 136 and 138 which support a pin 140 therebetween. A motor driven precision ball screw linear actuator indicated generally at 142, is positioned between the pins 134 and 140 so that when the actuator 142 is extended or retracted, the elbow arm 90 is pivoted around the elbow axis 92 with respect to the shoulder arm portion 84 of the manipulator. More particularly, a main housing 144 is pivotally mounted on the pin 140 and supports an hydraulic drive motor 146 the output shaft 148 of which carries a gear 150. The gear 150 is in mesh with an idler gear 152 which is mounted on the stub shaft 154 carried by the housing 144 and the idler gear 152 in turn meshes with a gear 156 on the end of the shaft portion 158 of a ball screw 160, the shaft portion 158 being mounted in the bearings 162 and 164 in the housing 144. Preferably, the idler gear 152 is offset from the gears 150 and 156 and is movable so that it can be adjusted for zero backlash.

Figure 5:
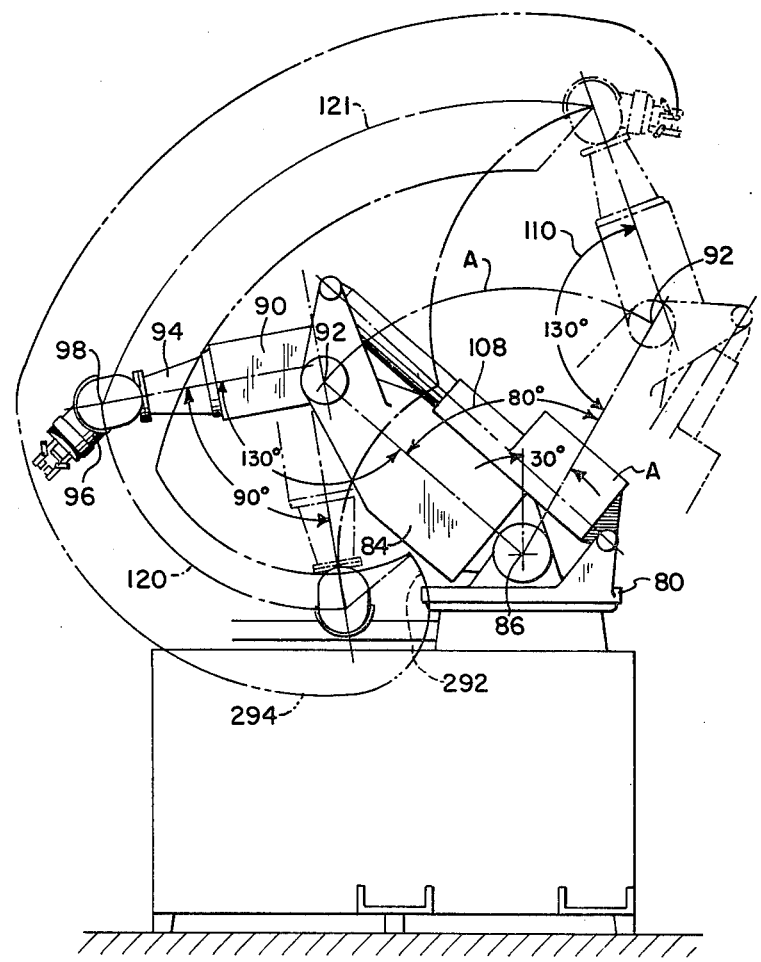
FIG. 5 is a diagrammatic right side view of the assembly station of FIG. 4.

A ball nut 166 is mounted on the ball screw 160 so that it will be advanced along the length of the screw 160 as this screw is rotated in response to energization of the motor 146, it being understood that suitable balls are provided between the threads of the ball screw 160 and internal races within the ball nut 166 so that the ball nut 166 is advanced as the screw 160 is rotated. An actuator sleeve 168 is slidably mounted within an outer sleeve portion 170 of the housing 144, the inner end of the sleeve 168 being secured to a portion 172 of the ball nut 166 which rides on the inner surface of the housing sleeve 170, and the upper end of the actuator sleeve 168 is provided with a cap portion 174 which is pivotally mounted on the pin 134. The upper end of the ball screw 160 is rotatably mounted within the actuator sleeve 168 by means of the bearing 176 and a pair of stop collars 178 and 180 are provided at the opposite ends of the ball screw 160 which cooperate with shoulders 182 and 184, respectively, on the ball nut 166 to limit travel of the ball nut 166 in either direction. When either of the shoulders 182 or 184 is engaged by the respective one of collars 178 or 180 the hydraulic motor 146 ceases to rotate the elbow arm portion 90, thereby defining the limits of the arcuate movement 110 (FIG. 5).

In order to pivot the shoulder arm portion 84 about the horizontal shoulder axis 86, the upper end of the shoulder arm portion 84 is provided with the upwardly and rearwardly extending ear portions 186 (FIG. 6) which support a pivot pin 188 therebetween and the rotary platform 80 is provided with a pair of upstanding ear portions 190 which support a pivot pin 192 therebetween. A motor driven precision ball screw linear actuator indicated generally at 194 (FIG. 6) is positioned between the pivot pin 188 on the shoulder portion 84 and the pivot pin 192 on the platform 80 so that as the actuator sleeve portion 196 of the actuator unit 194 is extended the shoulder arm portion 84 is tilted through an arc about the vertical axis as indicated at 108 in FIG. 5. The linear actuator 194 includes a main housing 198 which mounts an hydraulic motor 200, similar to the motor 146. In other respects the linear actuator 194 is substantially identical to the linear actuator 142 described in detail heretofore. Accordingly, it will be understood that when the motor 200 is energized the actuator sleeve 196 is extended or retracted so as to pivot the shoulder arm portion 84 about the axis 86.

Considering now the manner in which the rotary platform 80 is moved about the vertical waist axis, the main base member 82 of the manipulator arm is employed as a support for an annular casting 202 which is provided with upper and lower tapered bearings 204 and 206 which in turn mounts an internal sleeve casting 208 which is secured to the rotary platform 80 by means of the cap screws 210. The member 208 is provided with a downwardly depending offset ear portion 212 and a pivot pin 214 is mounted in this offset portion of the member 208, another pivot pin 216 being mounted in a pair of spaced ear portions 218 and 220 formed in the base member 82 at the end thereof remote from the platform 80. A motor driven precision ball screw linear actuator unit indicated generally at 222 is mounted between the pivot pins 214 and 216, this actuator unit 222 including a hydraulic motor 224 and being in other respects similar to the actuator unit 142 described in detail heretofore. Accordingly, when the actuator sleeve 226 of the unit 222 is extended and retracted the platform 80 is rotated about the waist axis 228 through a range of 110 degrees, as shown in FIGS. 4 and 8. A removable cover 230 is provided for the base member 82 in the vicinity of the actuator unit 222 so as to permit service and repair on this unit. In this connection it will be noted that by limiting movement in the waist or rotary axis to 110 degrees, the safety of personnel working near the assembly station is enhanced since the manipulator arm cannot be moved outside this arc. However, this arc of rotary motion may be adjusted as desired relative to the base of the manipulator, by adjustment of the platform 80 before it is clamped to the member 208.

Considering now the drive means provided for the three outer axes, i.e. the forearm twist axis, and the wrist bend and wrist swivel axes, three hydraulic motors, two of which are shown in FIG. 6 at 232 and 234 are mounted within the shoulder arm portion 84. More specifically, these hydraulic motors are mounted on a plate 236 which is secured to the underside of a transverse partition 240 provided intermediate the height of the shoulder arm 84, these three hydraulic motors being mounted so that their axes intersect the elbow axis 92 at spaced points along this axis. These motors are controlled by the servo valves 233 (FIG. 10) and are supplied with hydraulic fluid through the main rotary joint 235, which permits rotary movement of the platform 80, and the pressure line rotating joint 237 and returns line rotary joint 239, which permit movement about the shoulder axis 86, the three hydraulic motors being connected to different sections of the joints 237 and 239.

In order to limit movement of the manipulator hand in the twist, bend and swivel axes while providing an arrangement whereby each of the motors 232, 234 is directly connected to control a particular axis of movement of the hand, each motor, such as the motor 234 is provided with a flexible coupling 242 connected to the end of the motor, this flexible coupling being connected to a screw 244 (FIG. 10) along which rides a stop nut 246, the stop nut 246 being restrained from rotation by means of a transversely extending lug portion 248 (FIG. 9) having a bifurcated end portion which rides in the edge of a plate 250 mounted within the shoulder arm portion 84. Similar stop nuts 252 and 254 are provided for the other two axes, the stop nut 252 having a lug portion 256 which engages the other edge of the plate 250 and the stop nut 254 having a similar lug portion 260 which engages a transversely extending plate 258 which is secured to the plate 250 intermediate its edges. A pair of stop collars, such as the stop collars 262 and 264, (FIG. 10), are secured to each of the three screws 244, these stop collars being provided with shoulders which engage cooperating shoulders on each stop nut, such as stop nut 246 shown in FIG. 10 to limit rotation in each axis to the amount of angular movement required in each axis, as described in detail heretofore in connection with FIGS. 4 and 5.

Considering now the manner in which the elbow arm portion 90 is pivotally mounted on the upper end of the shoulder arm 84 for pivotal movement about the elbow axis 92 and also the arrangement whereby suitable gearing is provided along the axis 92 for interconnection of the hydraulic motors 232, 234 etc. to the respective control axes for the manipulator hand portion 96, the elbow arm portion 90 includes a cylindrical outer housing 270 (FIG. 11) which is mounted between a pair of spaced ear portions 272 and 274 (FIG. 12) provided at the upper end of the shoulder arm portion 84. The forward wall 276 of the shoulder portion 84 is shaped to define a cylindrical trough portion 288 (FIG. 6) which permits the housing 270 to be tilted about the axis 92 to the position shown in dotted lines at 290 in FIG. 11. With such an arrangement, when the elbow arm 90 is lowered and the shoulder arm portion 84 is tilted forwardly the manipulator hand portion 96 may be moved relatively close to the rotary platform 80 of the manipulator, as shown by the portion 292 of the trajectory 294 shown in FIG. 5 which represents movement of the outer end of the article gripper attached to the hand portion 96. In order to permit such movement of the housing 270 around the axis 92, the bottom portion thereof is open in the area shown at 296 in FIG. 11 so as to provide clearance for the gearing associated with the rotatable shafts 244 which extend upwardly through an opening 298 in the shoulder arm portion 84.

The housing 270 is provided with a pair of sidewardly extending stub shafts 300 and 302 (FIG. 12) which are secured to the housing 270 at either side thereof by means of the bolts 304, the stub shafts 300 and 302 being mounted in the bearings 306 and 308 provided in ear portions 272 and 274, respectively, so that the housing 274 is pivotally mounted for movement along the elbow axis 92 at the upper end of the shoulder arm portion 84. The stub shafts 300 and 302 are also provided with inwardly opening recesses 310 and 312 (FIG. 12) which act as support bearings for the independently movable gearing indicated generally at 314, which is associated with the shafts 244 extending upwardly through the opening 298 in the shoulder arm portion 84, the gearing 315 being shown in more detail in FIGS. 14 to 16, inclusive. A retaining nut 316 is provided for each of the stub shafts 300 and 302, and end caps 318, which cover the ends of the stub shafts 300 and 302, are secured to the ear portions 272 and 274 by means of the bolts 320. Accordingly, the housing 270 is accurately mounted for pivotal movement about the elbow axis 92 while permitting independent movement of the gearing 314 about the axis 92 so that movement for the three outer axes may be transmitted through this gearing and through the housing 270 to the forearm twist portion 94 and the manipulator hand 96.

Considering now in more detail the gearing 314, a shaft 322 (FIG. 15) is provided with end rings 324 and 326 which are positioned within the recess 310 and 312 of the stub shafts 300 and 302 (FIG. 12) and a series of three beveled ring gears 328, 330 and 332, having teeth on both sides thereof, are rotatably mounted on the shaft 322 by means of the bearings 334, 336 and 338. A first casting member 340 is provided with a downwardly and rearwardly extending ear portion 342 which is fixed to the upper end of the shoulder arm portion 84 by means of a pin 344 (FIG. 12) which passes through an opening 346 (FIG. 14) in the ear portion 342 so that the casting 340 is fixed to and moves with the shoulder arm portion 84. The casting 340 acts as a support for a plurality of rotatable input shafts 348, 350 and 352 which are connected to the upper ends of the screw shafts 244 by means of the universal couplings 354 (FIG. 6). The input shaft 348, 350 and 352 carry input beveled pinions 356, 358 and 360 which are in engagement with the beveled teeth on one side of the ring gears 328, 330 and 332. A second casting 362 is also rotatably mounted on the shaft 322 and is provided with an ear portion 364 which is secured to the elbow housing 270 by means of a pin 366 (FIG. 12) so that the casting 362 is fixed to and moves with the housing 270 as this housing is pivoted around the elbow axis 92. The casting 362 acts as a support for a plurality of rotatable output shafts 368, 370 and 372 which carry beveled gears in engagement with the teeth on the opposite side of the beveled ring gears 328, 330 and 332. Accordingly, when any one of the input shafts 348, 350 or 352 is rotated, the corresponding output shaft 368, 370 or 372 is rotated through the intermediate double-sided beveled ring gear 328, 330 or 332, while at the same time the output shafts may be rotated on the shaft 322 with respect to the input shafts as the housing 270 is pivoted around the elbow axis 92.

Considering now the manner in which the input shaft 350 is employed to rotate the forearm portion 94 about the axis of the elbow arm portion 90 to effect the so-called forearm twist motion referred to previously, the output shaft 370, which is interconnected with the input shaft 350 through the ring gear 330, carries a drive pinion 374 (FIG. 17) which is in mesh with a gear 376 which is carried by a shaft 378 which is rotatably mounted in a boss portion 380 of the housing 270 by means of the bearings 382 and 384. The shaft 378 has formed in the end thereof another pinion gear 386 which is in mesh with an idler gear 388 secured to the end of a shaft 390 which is rotatably mounted in a member 392 which is secured to the housing 270 by means of the bolts 394 (FIG. 18), the shaft 390 being mounted within the member 392 by means of the bearings 396 and 398. The forearm portion 94 comprises a generally cylindrical hollow portion 400 (FIG. 11) which is rotatably mounted within the housing 270 by means of the bearings 402 and 404, the forearm portion 94 including a tapered outer portion 406 which terminates in a transverse end plate 408 to which the hand gearing mechanism indicated generally at 410 is secured. The elbow arm housing 270 includes an end ring 412 which is secured to the end of the housing 270 by means of the bolts 414, the ring 412 defining an air passageway 416 (FIG. 11) between the ring 412 and the forearm portion 94, a pair of O rings 418 and 420 being employed to provide an airtight fit between the ring 412 and the forearm housing 400, 406 so that the forearm housing may be rotated with respect to the ring 412 while maintaining an airtight seal. Compressed air may then be supplied through the fitting 422 (FIG. 13) to the ring 412 and is supplied through a passageway 424 in the conical portion 406 of the forearm housing 94 to an air fitting 426 secured to the exterior of this housing. Compressed air for actuating the gripper members in the manipulator hand is thus conducted through the rotatable forearm portion 94, it being understood that air from a suitable compressed air supply is supplied to the fitting 422 through a flexible hose 428.

Referring again to the manner in which the forearm portion 94 is rotated with respect to the elbow portion 90, the cylindrical housing portion 400 is provided with an internal ring gear 430 (FIGS. 11 and 17) which is in mesh with the idler gear 388, the gear 388 being carried by the housing 270, as described heretofore. Accordingly, when the output shaft 370 of the gearing 314 is rotated, the forearm housing portion 400 is rotated through the gears 374, 376, 386, 388 and 430.

Considering now the manner in which the other two output shafts 368 and 372 of the gearing 314 are employed to effect the wrist bend and wrist swivel actions described generally heretofore, it is pointed out that all three of the output shafts of the gearing 314 extend through an opening 432 (FIG. 11) in the elbow housing 270 and the output shafts 368 and 372 (FIG. 15) are connected through universal couplings 434, shafts 436 and universal couplings 438, within the interior of the tapered forearm housing 400, 406 to two splined shafts 440 and 442 (FIG. 19) which are mounted in the end plate 408 of the forearm portion 94. The hand gearing mechanism 410 is mounted to the end plate 408 by means of the bolts 444 so that this mechanism rotates with the forearm portion 94. Since the two shafts 440 and 442 are offset from the central axis of the forearm portion 94 the portions of the universal couplings 438 are provided with splined end portions mating with the splined shafts 440 and 442 so as to permit a limited movement of the universal couplings 438 along the length of the shafts 440 and 442 as the forearm portion 94 is rotated through 300 degrees in the forearm twist axis.

Figure 19:
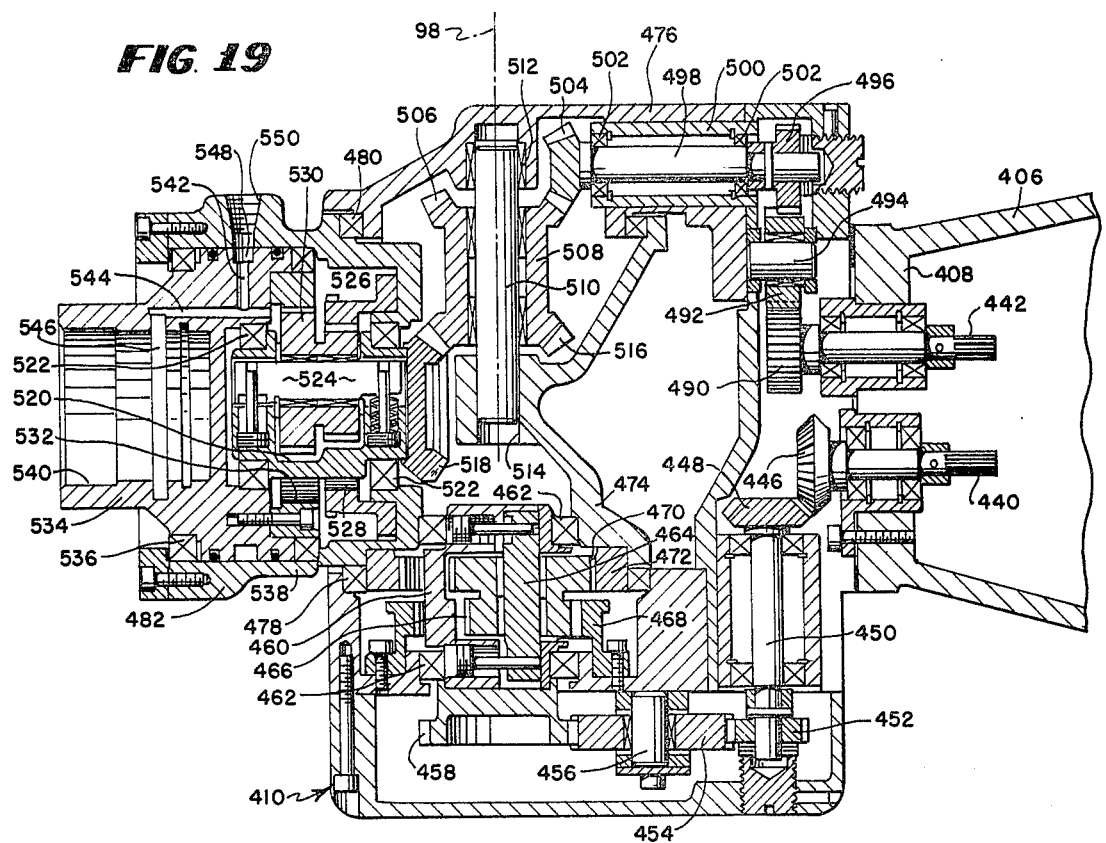
FIG. 19 is a sectional plan view of the manipulator hand portion of the manipulator shown in FIG. 1.
Figure 21:
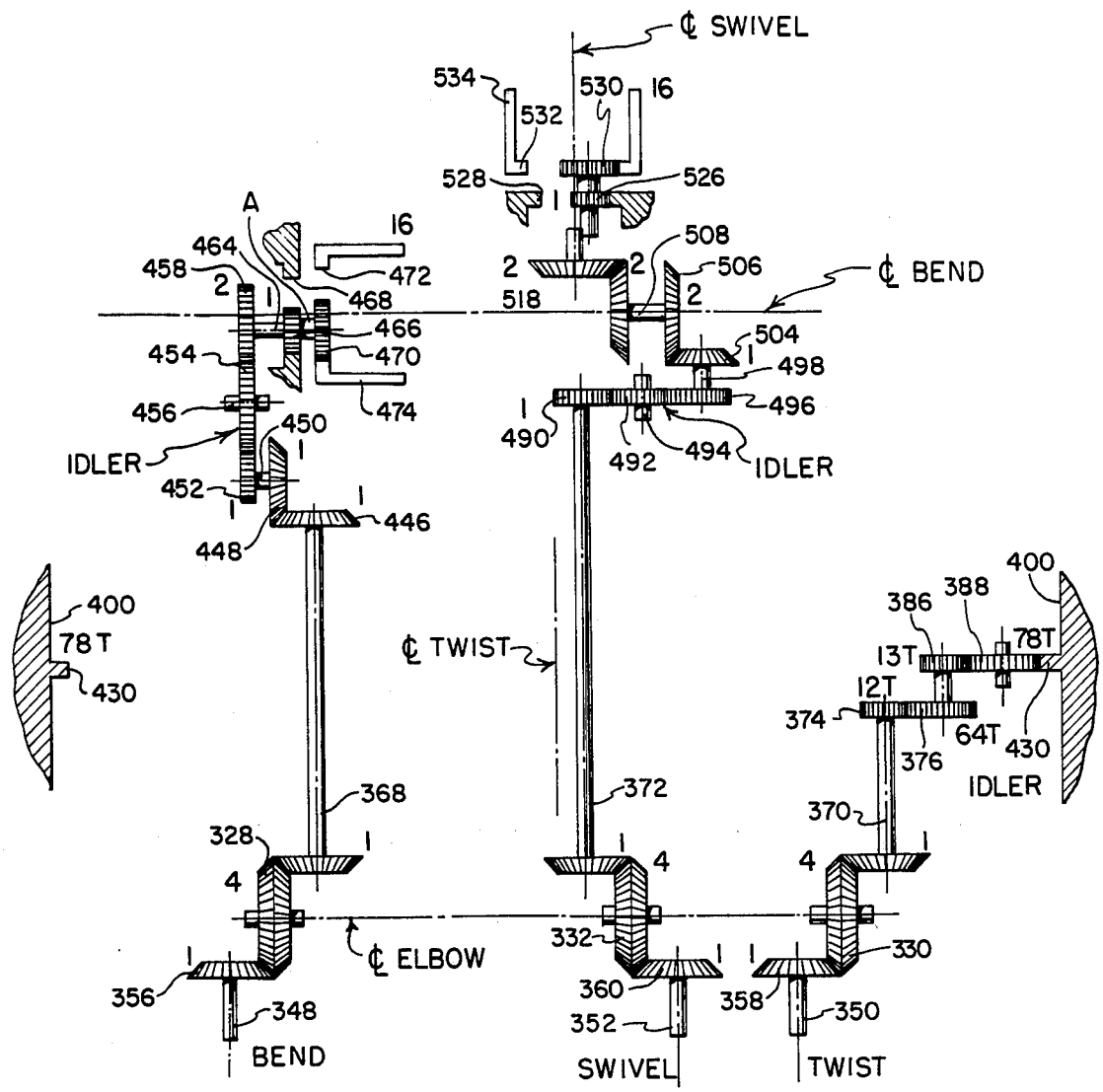
FIG. 21 is a diagrammatic view of the gear drive trains of the manipulator of FIG. 6.

The hand gearing mechanism 410 is shown in FIG. 19 and is illustrated diagrammatically in FIG. 21. A beveled gear 446, which is connected to the splined shaft 440, engages a mating beveled gear 448 carried on the end of a transverse shaft 450. A gear 452 is positioned on the other end of the shaft 450 which is in mesh with an adjustable idler gear 454 rotatably mounted on an idler shaft 456. The idler gear 454 is connected to the input gear 458 of a planetary drive unit 460 which is rotatably mounted in the bearings 462 and includes an offset shaft 464 on which is mounted a gear 466 in engagement with a fixed internal toothed ring gear 468 and a second gear 470 which is in engagement with an internal toothed ring gear 472 which is connected to the wrist bend output member 474. The output member 474 is rotatably mounted in the main housing 476 of the hand gearing mechanism 410 by means of the bearings 478 and 480 so that the member 474 may be rotated about the wrist bend axis 98. Accordingly, when the output shaft 368 of the main gearing 314 is rotated, the wrist bend output member 474 is rotated so that the outer end portion 482 thereof is pivotally moved around the forward edge of the housing 476 along the bend axis 98.

Considering now the manner in which rotation of the output shaft 372 is employed to effect the wrist swivel movement, the splined shaft 442 has a drive pinion 490 on the end thereof which is in mesh with an idler gear 492 rotatably mounted on an idler shaft 494. The idler gear 492 is in engagement with a gear 496 mounted on one end of a shaft 498 which is rotatably mounted in a sleeve 500 by means of the bearings 502 and carries a beveled gear 504 on the other end thereof. The beveled gear 504 is in mesh with a beveled gear 506 formed on one end of a transverse sleeve 508 which is rotatably mounted on a transverse shaft 510, the shaft 510 being in turn rotatably supported at one end thereof within the housing 476 by means of the bearing 512 and is connected at the other end thereof to a bore 514 formed in the bend output member 474 so that the shaft 510 is aligned with the bend axis 98 and the member 474 may be rotated about this axis while at the same time permitting the sleeve 508 to be independently driven through the swivel gearing described heretofore.

A beveled gear 516 is formed in the other end of the sleeve 508 and engages a beveled input gear 518 of a planetary gear drive unit 520 which is rotatably mounted in the member 474 by means of the bearing 522 and includes an offset shaft 524 on which are mounted a first gear 526 in engagement with an internal toothed ring gear 528 which is connected to the bend output member 474, and a gear 530 which is in engagement with an internal toothed ring gear 532 secured in one end of a wrist swivel output member 534. The member 534 is rotatably mounted in the outer end portion 482 of the bend member 474 by means of the bearings 536 and 538. The wrist swivel output member 534 is provided with a socket 540 adapted to receive any one of a number of interchangeable article gripping members, or other tools, and is provided with passageways 542 and 544 by means of which compressed air can be supplied to the groove 546 and may be employed to actuate the article gripping hand which is placed in the socket 540, as will be readily understood by those skilled in the art. The passageway 542 communicates with a groove 548 formed in the periphery of the wrist bend output member 534, the groove 548 in turn communicating with an opening 550 in the outer portion 482 of the bend output member 474 so that compressed air may be supplied by way of the conduit 552 (FIG. 13), through the rotating joint 554 which is positioned on the wrist bend axis 98 and is attached to one side of the hand gearing 410, and through the output conduit 556 to the opening 550. Accordingly, compressed air is supplied to the groove 546 for actuation of the article gripping fingers while permitting movement in the above described wrist bend and wrist swivel axes.

Figure 20:
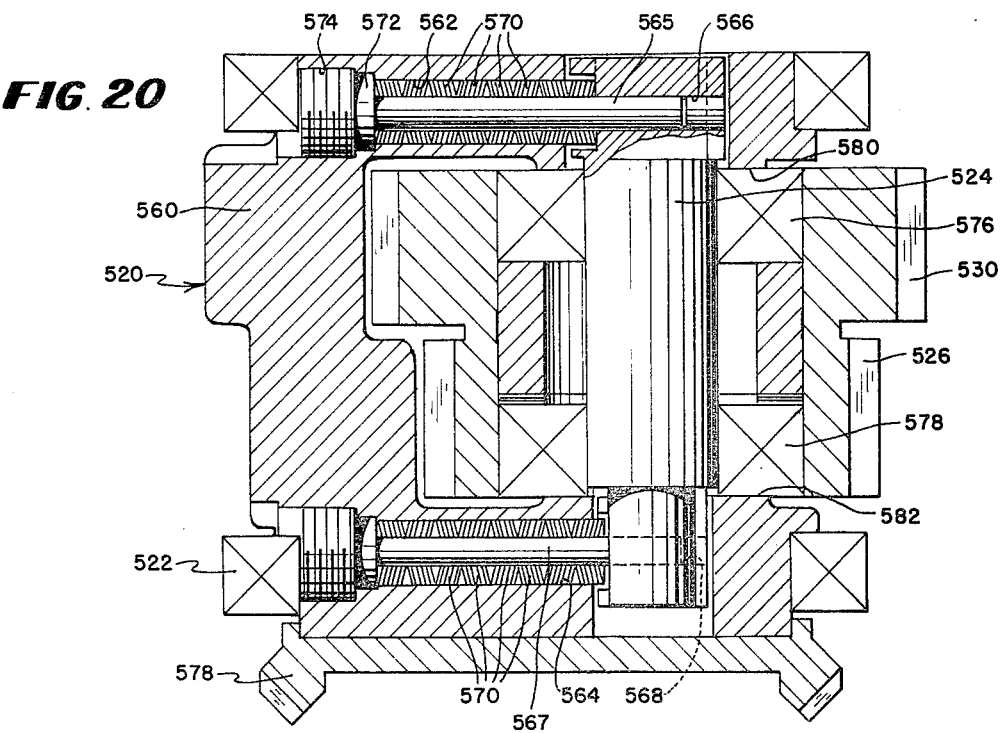
FIG. 20 is a sectional view of one of the differential drive units of FIG. 19 taken on a larger scale.

As stated generally heretofore, it is an important aspect of the invention to provide a programmable manipulator arm arrangement which is highly versatile and may be moved at high speed and positioned accurately so as to accomplish assembly of parts to close tolerances in a minimum amount of time. The above described ball-screw drives for the three major axes accomplish these objectives since they are powerful enough to rotate and tilt the relatively massive shoulder arm portion 84 and pivot the elbow arm portion 90. Furthermore, these ball screw linear actuators provide a substantial step down ratio so that a relatively stiff drive means is provided for positioning these relatively massive portions of the manipulator arm to the desired accuracy. However, with regard to motion in the three outer axes, these motions are obtained by direct gearing as described in detail heretofore and it is highly essential that all backlash be removed from the gear trains associated with each of these axes. Furthermore, it is important that an arrangement be provided in which backlash will not be introduced upon wear of the parts so that continuous usage of the manipulator without substantial downtime is provided. Elimination of backlash is particularly important in the complex hand gearing mechanism 410 since the article gripping fingers must be precisely positioned in order to accomplish assembly of small parts. To this end, each of the planetary drive units 460 and 520 is provided with a backlash eliminating arrangement which is maintained despite wear of the intermeshing parts. More particularly, with respect to the planetary unit 520 shown in FIG. 20, the main housing 560 thereof is provided with a pair of transverse bores 562 and 564 which communicate with the ends of the shaft 524, these end portions of the shaft 524 being provided with bore 556 and 568 which receive transversely extending pins 565 and 567. The pins 565 and 567 are adapted to receive a plurality of stacks of Belleville spring washers 570, each stack consisting of 8 or 9 springs and alternate stacks of springs being opposite oriented, as shown in FIG. 20. The springs 570 may be held under pressure by means of a cap 572 which is held in place by a setscrew threaded into the threaded bore 574, so that side thrust is exerted on both ends of the shaft 524. The shaft 524 is mounted in the bearings 576 and 578 between end faces 580 and 582 of the housing 560 so that the entire assembly including the gears 526, 530 and the bearings 576 and 578 may be urged laterally under the force of the Belleville springs 570. Accordingly, when the planetary unit 520 is mounted in the hand mechanism 410, as shown in FIG. 19, the teeth of the gears 526 and 530 are urged respectively into engaement with the ring gears 528 and 532 so as to remove all backlash in the planetary gear system. Preferably, the Belleville washers 570 provide approximately 300 pounds of side thrust and are operated over a portion of the force/deflection characteristic of the springs in which the force remains relatively constant with variation in deflection of the spring. Accordingly, when the moving parts become worn and the deflection of the Belleville springs 570 changes slightly, the force exerted by these springs will still be relatively constant so as to provide an automatic adjustment for wear which continuously eliminates backlash. Furthermore, with the disclosed arrangement it is not necessary to disassemble the hand gearing mechanism 410 in order to compensate for changes in backlash due to wear, or the like.

In connection with the automatic assembly station apparatus described thus far, it should be pointed out that the speed and accuracy with which the manipulator arms 50 and 52 are moved in assembling parts on a mass production basis must be considerably greater than that presently available in industrial robots if the automatic assembly station is to be economically feasible. Preferably, the speed and accuracy with which parts are assembled should be one and one-half times that of a human being to justify the use of such assembly stations. Such requirement for speed and accuracy demands not only a stiffer supporting structure and drive mechanism but also a lightweight design which will give the manipulator arm a high enough natural frequency so that it can respond to the desired control signals in a minimum amount of time. With the arrangement of the present invention, the hydraulically driven ball screws and high reduction ratio gear boxes provide the necessary stiffness in structure which is considerably superior to the hydraulic cylinder actuator type of drive employed previously for moving the controlled axes of a manipulator apparatus. While the hydraulic cylinder actuator is superior in response to a pneumatic one, the oil column in the cylinder is compressible and reflects the condition of all load changes and variations and hence is too soft and spongy to be used for rapid assembly of parts.

The hydraulically driven ball screw drive arrangements described in detail heretofore provide a stiffness which is several orders of magnitude better than the hydraulic vane motor type of drive arrangement. In this connection it is also pointed out that the amount of stiffness required is related to the inertia of the mass that is to be driven. For the wrist bend and wrist swivel motions, less stiffness is required than for the major arm articulations. Thus, if stiffness is plotted against moment of inertia, a diagonal line across the plot will represent a constant natural frequency and the wrist articulations and major arm articulations will lie on a constant frequency line, the larger inertia major articulations requiring a larger angular stiffness along this line. The arrangement of the present invention provides an increase in natural frequency of approximately one order of magnitude which results in a speed increase of a factor of two for short motions and a five-fold increase in accuracy. The arrangement of the present invention also provides hand gear trains which are relatively small so that the manipulator hands may be programmed to assemble small parts and at the same time provides the above described planetary gear systems which provide approximately sixteen to one reduction, which when combined with the two to one input gear reduction provides an overall thirty-two to one ratio which provides the desired output speed in relation to conventional motor speeds. It is also pointed out that the inertia forces of the high speed elements in the manipulator arm are minimized in accordance with the present invention by selecting a ball screw with a relatively coarse pitch. Thus, the ball screw such as the ball screw 160 provided in the actuating unit 142, preferably has a pitch of one thread per inch so that when driven at a maximum speed of 1500 inches per minute the inertial forces of the drive elements do not become excessive.

Considering now the electronic circuitry and computer-assist facilities which are provided in accordance with the present invention to enable the manipulator arms at each assembly station to be initially taught to perform a series of part assembling operations and then repeat these taught assembly operations during a series of playback cycles, it is first pointed out that the control system for each manipulator apparatus, such as the manipulator apparatus 50, is of the same general type as described in detail in Dunne et al U.S. Pat. No. 3,661,051 and reference may be had to said patent for a detailed description of this general type of control system. However, for the purpose of the present invention, it may be stated generally that each of the six axes of the manipulator 50 is provided with a suitable digital encoder which provides an absolute position measurement of the position of the manipulator arm in each of the six controlled axes at all times.

During the teaching operation, the various hydraulic motors previously described, which are used to move the manipulator arm in each of the six controlled axes, are energized, usually at relatively slow speeds, for a sufficient time interval to bring the manipulator arm to a desired position in all axes. As this movement is accomplished in each axis the encoders are correspondingly driven through suitable gearing. When the desired position is achieved in all axes the digital encoder values are all recorded in a suitable memory where they may be used as command signals during the playback mode of operation of the manipulator.

During playback, the actual position of the manipulator arm, as indicated by the digital encoders associated with each axis, are compared with the digital command signals previously recorded in the memory during the teaching operation, the output of the comparator providing an error signal which is employed to control the driving motor in each axis so as to move the manipulator arm to the new commanded position. In the case of the three main motions of the manipulator, i.e. the waist, shoulder and elbow arm motions, the digital encoders are driven directly from the hydraulic motor which drives the ball screw. Thus, considering motion in the elbow arm axis a plate 600 (FIG. 6) is mounted on the end of the hydraulic motor 146 and a digital encoder 602 is mounted on the plate 600. A gear 604 mounted on the shaft of the encoder 602 is in mesh with a gear 606 mounted on the end of the shaft of the motor 146 so that as the motor 146 drives the nut 166 through the screw 160, as described heretofore, the encoder 602 provides a digital output which corresponds to the position of the nut 166 and hence the absolute position of the elbow arm portion 90 which pivots about the elbow axis 92. In this connection it will be understood that the gearing 604, 606 is chosen so that a suitable gear reduction is provided so that the encoder 602 moves through its entire range of digital output values when the elbow arm portion 90 moves through the 130° arc shown in FIG. 5. In addition, a tachometer 601 may also be mounted on the plate 600 and driven from the motor 146 through the gears 606 and 607. The output of the tachometer 601 may be employed as a velocity feedback signal to the servo amplifier for the elbow arm axis. This velocity feedback signal is effective to prevent oscillation and hunting in the controlled axis while permitting movement of the manipulator arm at high speed between programmed portions which requires rapid acceleration and deceleration. Similar control of the other axes is also provided.

In this connection it will be understood that the encoders associated with each axis, such as the encoder 602, may if desired, comprise a suitable synchro with an associated analog to digital converter for converting the sine wave output of the synchro to a corresponding digital output. Such an arrangement is shown in Dunne U.S. application Ser. No. 442,862 filed Feb. 15, 1974.

An encoder 608 associated with the hydraulic motor 200, is employed to provide a digital signal corresponding to movement of the shoulder arm portion 84 about the shoulder axis 86. A tachometer 609 is also employed to provide velocity feedback for this axis. Also, an encoder 610 (FIG. 8) is associated with the hydraulic motor 224 and provides a digital output signal corresponding to the position of the rotary platform 80 as it is moved about the rotary axis 228. A tachometer 611 is also employed to provide velocity feedback for this axis.

In order to provide a digital position signal corresponding to each of the three other axes of the manipulator, i.e. the forearm twist axis, the wrist bend axis, and the wrist swivel axis, while at the same time providing an arrangement which makes these digital signals available with a minimum of complexity even though these signals represent movement of the manipulator hand at the other end of the manipulator arm, a series of three encoders 612, 614 and 616 (FIG. 13) are mounted on the elbow arm housing 270.

Each of these encoders is connected through a flexible coupling 618 (FIG. 11) to a shaft which is mounted in the housing 362 and carries a bevel gear in mesh with one of the ring gears 328, 330 and 332. More particularly, considering the encoder 616, this encoder is connected through the flexible coupling 618 to a shaft 620 (FIG. 16) which is mounted in the housing 362 and carries the bevel gear 622 which is in mesh with the ring gear 330. Accordingly, when the input shaft 350 is employed to drive the forearm portion 94 to effect a forearm twist action, by rotation of the output shaft 370 in the manner described in detail hereinabove, the ring gear 330 also drives the encoder shaft 620 through the beveled gear 622, so that the encoder 616 provides an absolute digital position signal representing the position of the forearm portion 94 as it is rotated in the path 114 (FIG. 4).

In a similar manner the encoders 612 and 614 are connected to the ring gears 328 and 332 so as to provide digital position signals corresponding to the wrist bend and wrist swivel motions of the manipulator arm. In this connection it is pointed out that the encoders 612, 614 and 616 actually measure the position of the three outer axes at a point intermediate the driving means and the gearing in the manipulator hand 410 which is employed to effect the wrist bend and wrist swivel actions. Such an arrangement has the advantage that the encoders 612 and 614 are remote from the manipulator hand 410 so that they do not interfere with assembly operations and may be readily serviced. At the same time, due to the improved anti-backlash gearing arrangement employed in the manipulator hand 96, as has been described in detail heretofore, the output signals of the encoders 612 and 614 are accurate measurements of the position of the manipulator hand 96 in the wrist bend and wrist swivel axes so as to accomplish the assembly of small parts to close tolerances.

Tachometers 613 (FIG. 6) may be employed for each of the three outer axes to provide velocity feedback signals to the respective servo amplifiers in these axes, these tachometers being mounted on the ends of the driving motors 232, 234, etc.

Figure 22:
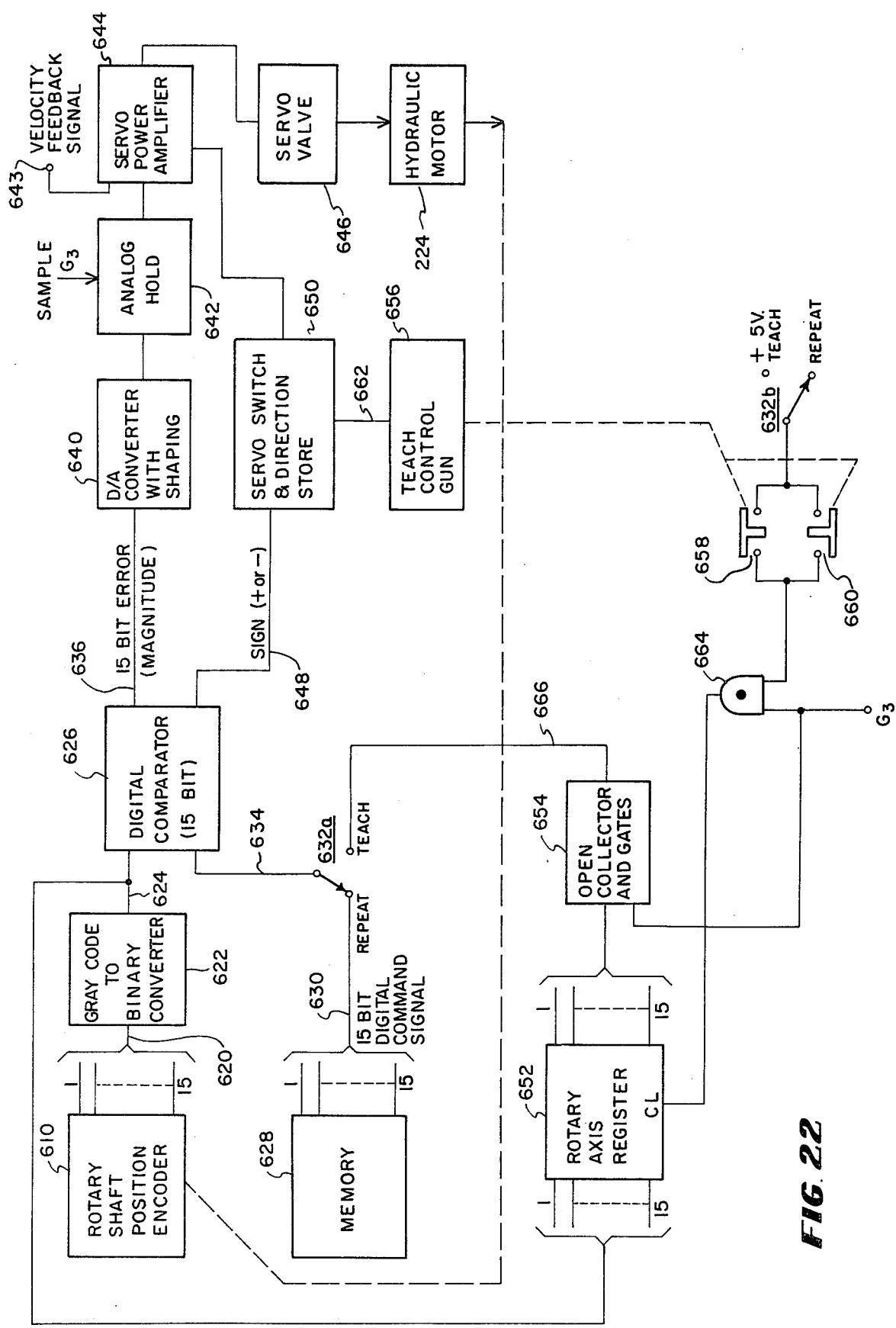
FIG. 22 is a simplified block diagram of the electronic circuitry associated with one axis of the manipulator of FIG. 6 and illustrating the closed loop teach arrangement of the present invention.

Considering now the electronic circuitry of the present invention whereby each of the manipulator arms 50, 52 may be positively controlled in position during the teaching operation so that one arm does not move while the other arm is being programmed or taught its desired movement, reference is first made to FIG. 22 wherein a closed loop teach arrangement is shown for only a single axis, i.e. the rotary axis 228. Referring to this figure, the rotary shaft position encoder 610 is provided with a group of output lines 620 on which the absolute position of the shaft of the encoder 610 appears as a gray code number. These lines are supplied to a gray code to binary converter 622 wherein they are converted to binary code and supplied over the conductor 624 to a digital comparator 626.

During the repeat or playback phase of the manipulator 50 the digital memory storage facilities, indicated generally at 628, are connected by way of the multiconductor cable 630 and a section 632a of the repeat-teach switch 632 to the other input 634 of the comparator 626. In the comparator 626 the digital encoder and digital command signals are compared and a digital error signal representing the magnitude of the difference between the actual position of the rotary encoder 610 and the command signal from the memory 628 is supplied over the multiconductor cable 63b to a digital to analog converter 640 wherein the error signal is converted to an analog signal having the proper shape for moving the manipulator arm in the rotary axis and decelerating it without overshoot. The analog signal developed by the converter 640 is supplied to an analog sample and hold circuit 642 so that during the time period allotted to the rotary axis the magnitude of the error signal is sampled by the circuit 642 and a voltage proportional thereto is continuously supplied to a servo power amplifier 644 which drives the servo valve 646 and thereby controls the hydraulic motor 224 which drives the manipulator 50 in the rotary axis 228. A feedback signal proportional to velocity in the rotary axis may be applied to the terminal 643 of the servo amplifier 644 from the tachometer 611 to permit high speed movement in this axis without hunting or oscillation.

The digital comparator 626 also provides a plus or minus signal on the conductors 648 which are supplied to a servo switch and direction store circuit 650 wherein the direction that the manipulator arm is to move to reduce the error to zero is stored and employed to control the servo amplifier amplifier 644 so that the servo valve 646 actuates the hydraulic motor in the correct direction to reduce this error signal to zero.

All of the above described circuit components may be substantially similar to that described in detail in the above identified U.S. Dunne et al Pat. No. 3,661,051 and form no part of the present invention. However, in accordance with an important aspect of the present invention, the digital output of the rotary encoder 610, as converted by the converter 622, is continuously recorded in a rotary axis register 652 which is updated once each multiplex period during the time period assigned to the rotary axis. A similar register is provided for each of the five other controlled axes of the manipulator 50 and the outputs of these registers are supplied through open collector AND-gates indicated generally at 654 and the teach-repeat switch section 632a to the other input of the digital comparator 626 in place of the memory command signal from the memory 628.

During the teaching operation, the position indicated by the rotary encoder 610 is employed as a temporary command signal so as to hold the manipulator hand 50 in the previously adjusted position while the teaching operator is making an adjustment in the position of the other manipulator 52 or in some other axis of the manipulator 50. More particularly, during the teaching operation a teach control gun 656 is employed to control movement in the rotary axis, as well as the other five controlled axis of the manipulator, a similar teaching gun being described in detail in the above-identified U.S. Dunne et al Pat. No. 3,661,051 for the five axis manipulator disclosed therein.

The gun 656 includes a pair of direction buttons 658 and 660 for the rotary axis which are selectively depressed by the operator when he wishes to move the manipulator arm in the rotary axis in a desired direction. For example, when the button 658 is moved, and assuming that this button corresponds to the plus direction, a signal is supplied over the conductors 662 to the servo switch and direction store 650, so that the power amplifier 644 is energized in the plus direction.

At the same time that this occurs, a teach-repeat switch section 632b supplies a plus five volt signal through the closed plus direction button 658 to one input of an AND-gate 664, the other input of this AND-gate being provided with an enabling pulse during the period assigned to the rotary axis, as will be described in more detail hereinafter.

The output of the AND-gate 664 is employed as a clock input pulse for the rotary axis register 652 so that this register is permitted to register the output of the rotary encoder 610 during the G3 multiplex period assigned to the rotary axis, but only if one of the direction buttons 658, 660 is depressed. The multiplex pulse assigned to the rotary axis is also suplied to the open collector AND-gates 654 so that the ouputs from all six axes may be collectively supplied over the multiconductor cable 666 and switch section 632a to the input of the digital comparator 626 where the outputs of the six registers are employed as temporary command signals.

During actual movement of the manipulator arm during the teaching operation, i.e. when the rotary plus direction button 658 is depressed, a voltage is supplied to the servo power amplifier 644 so as to cause the motor 224 to be moved in the plus direction. However, as soon as the rotary plus direction button 658 is released the rotary axis register 652 is no longer permitted to be updated or altered but instead holds the last position of the rotary encoder 610. The rotary position thus stored in the register 652 is then employed as a temporary command signal, which is supplied to the comparator 626. Thus, when the teaching operator moves the manipulator 50 in other controlled axes, or puts down the teach control gun 656 entirely while he performs a teaching operation for the other manipulator 52, the output of the register 652 is continuously supplied to the digital comparator 626. Furthermore, the other components of the servo loop continue to be energized so that if for any reason the manipulator 50 is moved slightly in the rotary axis, such movement produces a change in the output of the encoder 610 which is continuously compared with the previous position of this encoder as registered in the register 652 and the digital comparator 626 and following control components function in a manner described in detail above to actuate the servo valve 646 in the correct direction to cause the manipulator 50 to be moved back to its previous position as registered in the register 652.

Figure 24:
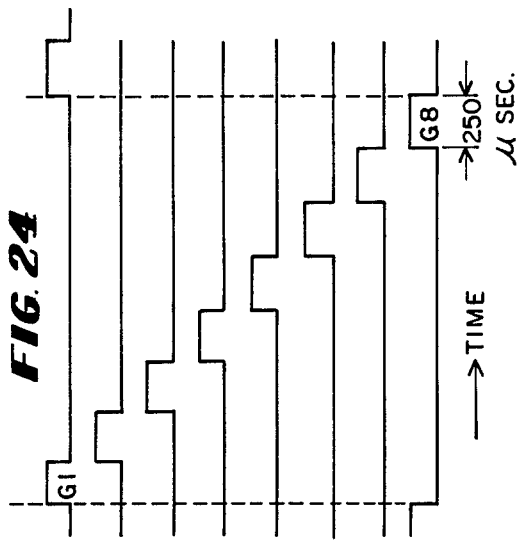
FIG. 24 shows the multiplex timing periods used in FIG. 23.
Figure 23:
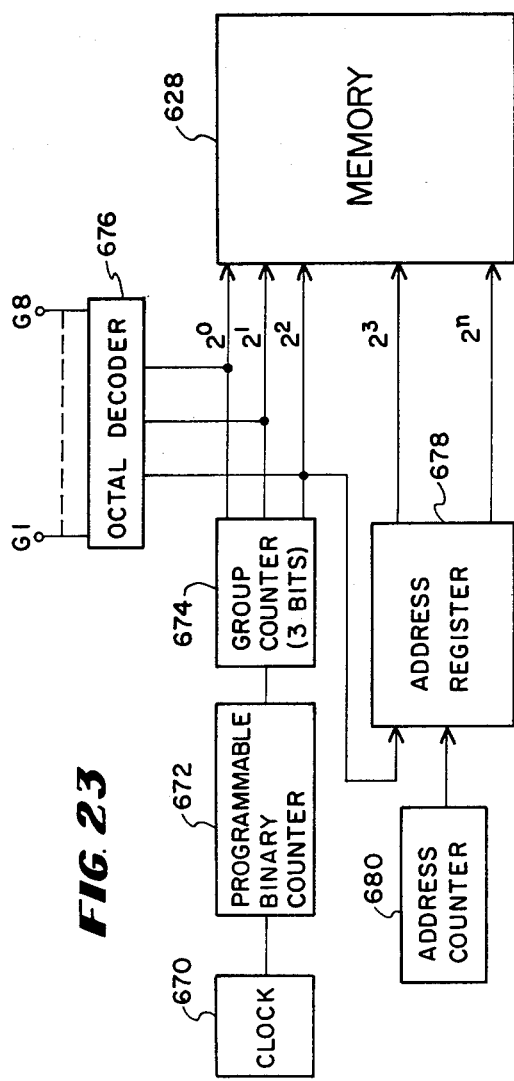
FIG. 23 is a simplified block diagram of the closed loop teach arrangement of FIG. 22 and shown for all axes of the manipulator.

Referring now to FIGS. 23 and 24, the circuit arrangement for providing closed-loop teach facilities for all six controlled axes of the manipulator 50 is shown in these figures. More particularly, as shown in FIG. 23, a clock 670 is connected through a programmable binary counter 672, the function of which will be described in more detail hereinafter, to a group counter (3 bits) 674 the output of which is supplied to an octal decoder 676. The octal decoder 676 provides multiplex pulses on the output conductors G1 to G8, inclusive, each of these multiplex pulses having a nominal time duration of approximately 250 microseconds, as shown in FIG. 24. The exact time duration of each multiplex period may be varied by adjusting the programmable counter 672, as will be described in more detail hereinafter. The outputs of the last six multiplex periods are individually assigned to the six controlled axes of the manipulators 50 and 52 and the first two multiplex periods G1 and G2 are employed for auxiliary control functions such as OPERATE EXTERNAL (OX), WAIT EXTERNAL (WX), binary coded command signals for the programmable counter 672 and other control functions, as will be described in more detail hereinafter. The output of the three bit counter 674 is supplied to an address register 678 which is connected to the memory 628 so that each address location or programmed step may be accessed in the memory 628 through the address register 678. The register 678 is controlled by an address counter 680 which functions during the playback operations to shift the output of the memory 628 from one programmed step to the next, as will be readily understood by those skilled in the art.

In order to employ a common gray to binary code converter 622 for all six controlled axes, the individual conductors of each of the encoders 602 and 608 to 618, inclusive, are supplied to a series of open collector AND-gates 682 and 684. The other input of each of the AND-gates 682, 684 is supplied with the multiplex pulse from the octal decoder 676 in accordance with the multiplex period assigned to that particular axis. Thus, the AND-gates 682, 684 associated with the rotary encoder 610 are supplied with the enabling pulse G3, the AND-gates associated with the encoder 608 are supplied with a multiplex pulse G4, and the AND-gates associated with the wrist swivel encoder 614 are supplied with the enabling multiplex pulse G8.

The direction buttons 686, 688 are employed to control updating of a register 690 and the direction buttons 692, 694 are employed to control updating of the wrist swivel register 696 in the manner described in detail heretofore in connection with FIG. 22. The outputs of all of the registers 652, 690 and 696 are supplied through open collector AND-gate circuits, such as the AND-gates 654 described heretofore in connection with the rotary axis, to the repeat-teach switch section 632a where they are supplied to the comparator as a temporary command signal during the teaching operation, as described heretofore.

It will be noted that the comparator 626 and digital to analog converter 640, which latter unit includes the function generation networks described heretofore, are common to all of the six axes of the manipulator, thereby substantially simplifying the amount of circuitry required within each manipulator apparatus. The output of the digital to analog converter and its function networks is supplied to the various sample and hold circuits for each axis, such as the sample and hold circuit 642 for the rotary axis. The sample and hold circuit 696 for the shoulder axis and the sample and hold circuit 698 for the wrist swivel axis are also shown in FIG. 23, their respective servo amplifiers being indicated at 700 and 702. It will be understood that the comparator 626 also provides a suitable direction signal which is supplied to servo switch and direction store circuits, as described in detail heretofore in connection with the single axis arrangement shown in FIG. 22, these circuits being omitted from FIG. 23 for purposes of simplification.

All of the six controlled axes of the manipulator 50 are thus provided with active servos in the teach mode which function to hold the position of each axis in the last taught position. Control of motion in any axis will only be turned over to the teach control when the respective direction button is pushed so as to move the manipulator arm to a different position. During this movement a running record of movement in each axis is provided by the registers 652, 690 and 696, etc. and when the motion button is released the tracking ceases, thereby maintaining an accurate record of the taught end point. This stored end point data is then used in a closed-loop control to maintain precise positioning of one manipulator arm while the other manipulator arm is being programmed. In this connection it will be understood that during the teaching operation, once the manipulator arm is moved to a desired position in all axes a record button 704 is closed which supplies the digital position signals for all of the encoders of the six controlled axes to the memory 628 during the respective multiplex periods G3-G8. In addition any other auxiliary control signals relative to that programmed step are selected by means of suitable switches which are energized during the multiplex period assigned thereto, i.e. G1 and G2.

During the playback or repeat mode of operation of the manipulators 50 and 52, it is contemplated that the manipulator arm 50 will function primarily in a point to point mode of operation wherein successive program steps are supplied from the memory 628 to the comparator 626 as position command signals which are compared with the actual position signals of the encoders 602 and 608 to 616, inclusive, the manipulator arm being moved in all six controlled axes until the error signals in these axes have been reduced to a desired degree of accuracy. Such an arrangement is described in detail in said U.S. Dunne et al Pat. No. 3,661,051, as well as other ones of the above-mentioned patents. However, in accordance with an important aspect of the present invention each of the manipulators 50, 52 is provided with a linear interpolation unit whereby short, straight line, constant velocity steps may be provided so that a simulated continuous path control mode is provided for each of these manipulators. With such an arrangement one can closely approximate a continuous path in space by recording a series of end points spaced in the order of one-half inch apart or less. During playback an auxiliary control signal indicates that the velocity or continuous path mode is to be employed instead of the normal point-to-point mode for the next program step. The linear interpolation unit will perform a number of functions on a time shared basis for each of the six controlled axes of the manipulator. First, the interpolation unit subtracts the present axis position from the new end point command and thereby provides a digital signal corresponding to the incremental change to be made in that axis. The linear interpolation unit then divides the time of the program step up into a series of equal time intervals, such as thirty-two, and also divides the incremental position change by the same number. In the first interpolation interval the result is added to the initial position. This resultant is the first of 32 intermediate, artificially generated positional commands which are generated locally by the interpolation unit in response to a single program step which has been recorded during the teaching operation. In the second time interval the linear interpolation unit divides the total positional change by 16 yielding a result which is once again added to the initial axis position data. Since this process is repeated at equal time intervals a series of 32 equally spaced intermediate digital position commands are produced which results in a constant velocity traverse for the motion required by the recorded program step. By varying the timing by means of counter divider techniques, a large number of different speeds of operation in the interpolation mode can be effected. Furthermore, a specific control signal specifying the path speed when operating in the interpolation or velocity mode can be programmed during the teaching operation, as will be described in more detail hereinafter.

Figure 25:
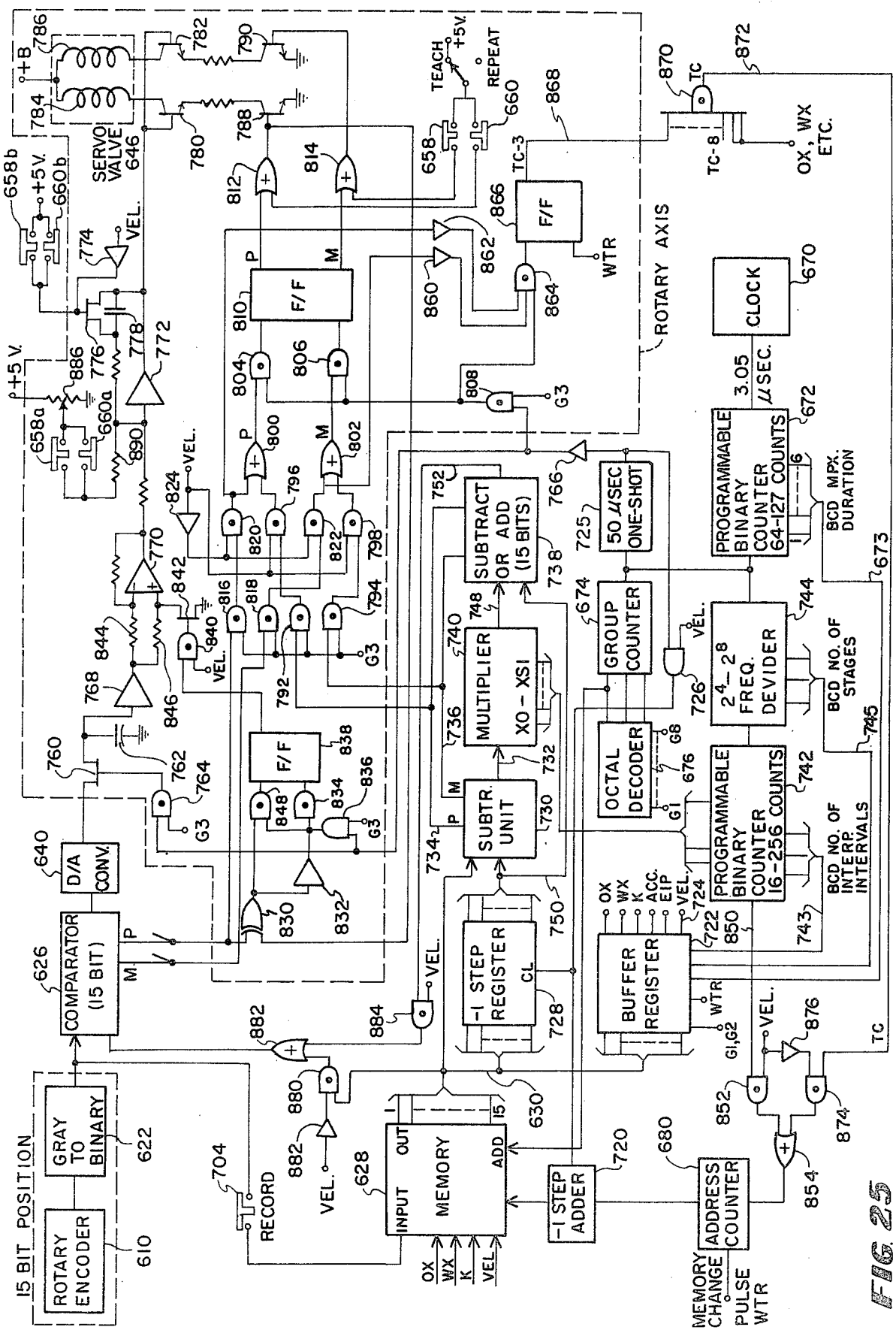
FIG. 25 is a detailed block diagram of the linear interpolation facilities of the present invention shown in connection with one axis of the manipulator.

Referring now to FIG. 25 wherein the common linear interpolation unit is shown in conjunction with the circuitry required for a single axis, i.e. the rotary axis of the manipulator 50, it is first pointed out that many of the circuit components are similar to that referred to heretofore in connection with FIGS. 22 and 23 and hence have been given the same reference numerals. However, in the circuit arrangement of FIG. 25, a minus one step adder 720 is provided between the address counter 680 and the memory 628.

During the teaching operation, when a particular program step or steps is to be performed during playback in the velocity mode, an auxiliary signal, identified as VEL, is also recorded in the memory 628. Accordingly, on playback an identification is provided by the auxiliary VEL signal when a particular program step is to be performed in the velocity mode, i.e. that the linear interpolation facilities of FIG. 25 are to be employed.

In the following description it will be assumed that program step 10 has been performed in the point to point mode of operation and when program step 11 is read from the memory 628 it includes an auxiliary VEL signal. All of the auxiliary signals which occur during the G1 and G2 multiplex periods are stored in a series of buffer registers 722 so that a velocity mode VEL signal is produced on the output conductor 724 during program step 11. This VEL enabling signal is supplied to all of the points indicated in FIG. 25. First, this VEL signal is applied as one input to an AND-gate 726 the other input of which is the output of a 50 μsec one-shot 725 which is connected to the output of the programmable counter 672. The one-shot 725 develops a 50 μsec pulse at the beginning of each multiplex pulse period, regardless of the setting of the counter 672. Accordingly, the AND-gate 762 is enabled during the first fifty microseconds of each of the multiplex periods G1–G8 and this enabling signal is supplied as a control or clock pulse to a minus one step register 728 and as an enabling pulse to the minus 1 step adder 720. During periods when the circuit 720 is enabled it subtracts 1 step from the output of the address counter 680 and thereby recalls the position information corresponding to the command signals for program step 10 during the first fifty microseconds of each multiplex period, these recalled positional command signals being stored temporarily in the −1 step register 728. Accordingly, during each multiplex cycle the positional command signals for all six axes corresponding to program step 10 are successively registered in the register 728. During the latter portion of each multiplex period the −1 step adder is disabled and the output of the memory 628 continues to provide the program step 11 positional command signals on the output conductors 630.

The memory output signals are also supplied to a subtraction unit 730 together with the output of the −1 step register 728 so that the absolute position corresponding to the previous program step 10 is subtracted from the new command information corresponding to program step 11 in the subtraction unit 730. The difference between these two command signals is produced on the output conductors 732 of the subtraction unit 730. The unit 730 thus successively provides a digital representation of the incremental distance to be moved between program step 10 and program step 11 in each of the six controlled axes of the manipulator.

The subtraction unit 730 also provides control signals on the P and M conductors 734 and 736, respectively, which represent the polarity or direction of the desired incremental distance appearing on the output conductors 732 of the unit 730. The plus or minus control signals on the conductors 734 and 736 are supplied to a subtract or add unit 738 to which is also supplied the 15 bit output from the minus one step register 728 corresponding to the command signal for program step 10 which has just been completed. The incremental distance to be moved to new position 11 is now divided by a predetermined factor and the resultant smaller increment is added to the program 10 command signal so as to produce an artificial command signal which is employed to move the manipulator arm an amount equal to this smaller increment. More particularly, a multiplier 740 is arranged to be controlled by a programmable binary counter 742 so that the multiplier 740 will divide the incremental position signal appearing on the conductors 732 into progressively larger increments such as from 1 to 32, during successive counts of the binary counter 742. In this connection it will be understood that the multiplier 740 actually multiplies by a predetermined fraction to provide the required Division into equal time intervals. The maximum count of the counter 742 may be controlled in accordance with auxiliary control signals which are recorded as bits 1, 2 and 3 in the GI multiplex period during the teaching operation. These control signals are stored in the buffer registers 722 and supplied over the conductors 743 to the counter 742 so that the number of interpolation intervals for a program step may be varied from 16 to 256, as will be described in more detail hereinafter.

The rate at which pulses are supplied to the counter 742 determines the time allotted for each interpolation interval and hence determines the velocity of movement of the manipulator arm. In accordance with an important aspect of the invention, the velocity of the manipulator arm may be very accurately controlled over a wide range of values so that movement between two points at a precise velocity may be achieved during playback. More particularly, a frequency divider 744 is provided between the counters 672 and 742 and the number of active divider stages in the divider 744 is controllable in accordance with auxiliary control signals which are recorded as bits 7, 8 and 9 in the G2 multiplex period during the teaching operation. These control signals are stored in the buffer registers 722 and supplied over the conductors 745 to the divider 744 so that the pulse output of the counter 672 is divided by a factor which can be varied from 16 to 256. This variation coupled with the programmable variation of the counter 672 gives a wide range of control over the velocity of movement between two points, as will be described in more detail hereinafter.

Considering now the operation of the interpolation unit described thus far in providing an artificial command signal corresponding to the first increment of movement to be made in the rotary axis between program step 10 and program step 11, and assuming the counter 742 is set for 32 interpolation intervals between program steps, the binary counter 742 initially puts out a binary conbination causing the multiplier 740 to divide by a factor of 32 so that the incremental distance appearing on the output conductors 732 of the subtraction unit 730 is divided by a factor 32 and appears on the output conductors 748 of the multiplier 740. The subtract or add circuit 738 then adds this 1/32 of the incremental distance between program step 10 and program step 11 to the position information appearing on the output conductors 750 of the −1 step register 728, which corresponds to the original position of program step 10.

The output conductors 752 of the subtract or add circuit 738 thus provide an artifical command signal equal to the program step 10 position plus 1/32 of the difference between program step 10 and program step 11. This artificial command signal on the conductors 752 is supplied as an output to a series of AND-gates 884, one for each conductor, to the other output of which is applied the VEL signal. Accordingly, during the linear interpolation mode this artificial command signal passes through the AND-gates 884 and through a corresponding series of OR-gates 882 to the comparator 626. In the comparator 626 this artificial command signal is compared with the output of the rotary encoder 610. In this connection it will be understood that the outputs of all six encoders are connected through suitable open collector AND-gates to the common gray code to binary converter 622 as described in detail heretofore in connection with FIG. 23. An error signal is thus developed at the output of the comparator 626 which is proportional to the difference between the rotary encoder position signal and the above-described artificial command signal corresponding to 1/32 of the distance to new program step 11.

Assuming for the moment that the manipulator arm starts to move in the direction to reduce its error to zero, the output of the multiplier 740 continues to produce a 1/32 increment only until the binary counter 742 is moved to its next position at which point the binary counter output is such that the multiplier 740 divides by a factor of 16 rather than by a factor of 32. It should be noted that a shift from the 1/32 division factor to a factor of 1/16 is not dependent upon the manipulator arm reaching the position corresponding to the first artificial command signal, which was produced during the period when the multiplier was divided by a factor of 32.

When the multiplier 740 divides by a factor of 16 an increment equal to 1/16 of the total distance between program step 10 and program step 11 is now supplied to the subtract or add circuit 738 and a correspondingly larger artificial command signal is supplied to the comparator 626. If the manipulator arm has not moved 1/32 of the distance between program step 10 and program step 11 by the time the multiplier is shifted to a division factor of 16, then a somewhat larger error signal is produced when this shift occurs which in turn causes the manipulator arm to move slightly faster in the rotary axis.

On the other hand, if the manipulator arm has been moved more than 1/32 of the distance from program step 10 to program step 11 by the time the multiplier 740 is shifted to a division factor of 16 then facilities are provided for supplying a somewhat smaller error signal to the servo amplifier controlling the rotary axis, as will be described in more detail hereinafter. Accordingly, facilities are provided for moving the manipulator arm at a substantially constant velocity by successively producing artificial command signals at 32 equal time intervals, these successive artificial command signals also corresponding to 32 equal increments of position between the desired end points of program step 10 and program step 11.

When the binary counter 742 reaches its full count the multiplier 740 is dividing by a factor of one so that the full incremental position signal appearing on the conductors 732 is supplied to the subtract or add circuit 738 and hence the command signal appearing on the conductors 752 is equal to the initially taught position of program step 11.

Considering now the facilities which are unique to the rotary axis to provide movement of the manipulator arm in this axis in accordance with the above described artificial command signals developed by the common linear interpolator unit, the output of the digital to analog converter 640 and its associated function generators is supplied to an FET 760 which is connected in series with a storage capacitor 762. The FET 760 is enabled during the multiplex period G3 assigned to the rotary axis, but only during the last portion of this multiplex period, the first 50 microseconds of this multiplex period being employed to strobe the minus one step adder 720 and store the information corresponding to program step 10 in the minus one step register 728, as described in detail heretofore. Specifically, an AND-gate 764 is provided to control conduction of the FET 760. One input of the AND-gate 764 is the multiplex pulse G3 and the other input is supplied through an inverter 766 from the output of the one-shot 725. Accordingly, during the latter portion of each G3 multiplex period the capacitor 762 is charged to a voltage proportional to the analog error signal developed by the unit 640. The voltage appearing across the capacitor 762 is passed through an emitter follower 768 to an operational amplifier 770 which is selectively employed as an inverter during the linear interpolation mode of operation.

The inverter 770 is required in those situations where the rotary servo valve is initially opened too much in response to one of the first artificial command signals developed by the unit 738 so that when a shift is made to the next artificial command signal a negative error signal is developed by the comparator 626. However, the manipulator arm should still be moved in the same direction and what is needed is to close the servo valve 646 slightly while still providing a basic direction signal which is derived from the difference between program steps 10 and 11. In accordance with the present invention, the subtraction unit 730 establishes the basic direction in which the manipulator arm is to be moved in the rotary axis by means of the control signals established on the conductor 734 or 736 and this basic direction is maintained throughout the linear interpolation cycle. However, while this basic direction signal is maintained throughout the linear interpolation cycle the polarity of output signals developed by the inverter 770 is shifted in accordance with changes in the plus or minus error signal developed by the comparator 628 as successive command increments are developed by the subtract or add circuit 738. The specific operation of the inverter 770 in effecting this change will be described after the remaining portion of the servo valve amplifier circuitry has been described.

The output of the inverter 770 is supplied to an operational amplifier 772 which is employed as a proportional plus reset type of controller so as to effect an integration of the error signal developed across the capacitor 762. This proportional plus reset action is effective during the velocity mode of operation during which linear interpolation is to be made. However, during the point to point mode, when a VEL signal is not produced, the output of an inverting amplifier 774 is supplied to an FET 776 which is connected across the feedback capacitor 778 of the proportional plus reset controller 772 so that this capacitor is short circuited during point to point operation and no integration or reset action is provided in controlling the servo valve in response to the error signal developed on the capacitor 762.

The output of the proportional plus reset controller 772 is supplied to the bases of control transistors 780 and 782 which control the respective windings 784 and 786 of the servo valve 646 which drives the manipulator arm in the rotary axis. This error signal is supplied to the bases of both of the transistors 780 and 782. However, only one of these transistors is effective to supply current to the winding 784 or the winding 786, depending upon the conduction of switching transistors 788 or 790 which are connected in series with the transistors 780 and 782, respectively.

Considering now the manner in which the direction signal produced by the subtraction unit 730 is effective to control conduction of one of the transistors 788 or 790 during the linear interpolation of velocity mode, these direction signals are supplied to AND-gates 792 and 794 to the other input of which is supplied the G3 multiplex pulse. The output of the AND-gates 792 and 794 are respectively supplied to one input of the AND-gates 796 and 798 which are also controlled by the VEL signal which is produced during the velocity mode type of operation. Accordingly, the P signal is supplied through an OR-gate 800 and the M signal is supplied through an OR-gate 802 during the velocity mode of operation. The outputs of these OR-gates are supplied respectively to AND-gates 804 and 806 to the other input of which there is supplied an enabling signal during the latter portion of the G3 multiplex period, this enabling pulse being derived from an AND-gate 808 to which the G3 pulse and the ouput of the inverter 766 are connected. Accordingly, a flip-flop 810 is set in the pulse direction in response to a signal on the output conductor 734 of the subtraction unit 730 and is set to the opposite polarity in response to a signal appearing upon the conductor 736. The output conductors of the flip-flop 810 are supplied through OR-gates 812 or 814 to the bases of the transistor 788 or 790 respectively, so as to energize the servo valve 648 in either the plus or minus direction in accordance with the setting of the subtraction unit 730.

Considering now the operation of the direction store circuit during the point to point mode of operation, in this mode the directional output signals from the comparator 626 should control movement in the rotary axis rather than the subtration unit 730. To this end, the P and M conductors of the comparator 626 are supplied to AND-gates 816 and 818, respectively. The G3 pulse is supplied to the other inputs of these AND-gates so they produce an output during the multiplex period assigned to the rotary axis. The outputs of the AND-gates 816, 818 are supplied to AND-gates 820 and 822, respectively. The VEL signal is supplied through an inverter 824 to the other input of the AND-gates 820 and 822. Accordingly, during point to point mode of operation, when no VEL signal is produced, the AND-gates 820 and 822 are also enabled so that the P or M signals developed by the comparator 626 are passed through the OR-gate 800 or the OR-gate 802 and actuate the flip-flop 810 so that one of the transistors 788 or 790 is selectively rendered conductive to determine the direction of movement during point to point operation in the rotary axis. During such point to point operation the analog error signal developed across the capacitor 762 for the rotary axis is amplified in the operational amplifier 772 in a proportional manner since the capacitor 778 is short circuited by the conductive FET 776 due to the fact that no VEL signal is applied to the inverter 774. This amplified error signal is applied to the bases of the transistor 780 and 782 and the conductive one of the transistors 788 or 790 controls flow of current through the windings 784 or 786 proportional to this error signal. Accordingly, the rotary axis is moved until the rotary encoder 610 provides an output signal proportional to the command signal derived from the memory 628.

Considering now the manner in which the inverter 770 functions during the velocity or linear interpolation mode of operation to reverse the polarity of the analog error signal developed across the capacitor 762, it will be recalled that during the linear interpolation mode, the rotary servo valve 646 may be opened too great an amount at some point during the production of artificial incremental commands by the above described linear interpolation system. When this occurs the comparator 626 will continue to gie an output and the direction signals on the M and P output conductors of the comparator 626 would reverse. However, since these conductors do not control the servo valve direction during the velocity mode of operation, the negative error signal developed by the digital to analog converter 640 will charge the capacitor 762 in the same direction as previously since the polarity of the error signal developed by the digital to analog converter 640 does not change with direction. This means that the servo valve 646 would be opened wider whereas the posited condition would dictate that the valve should be closed slightly so as to provide a constant velocity of movement in the rotary axis.

Under these conditions the inverter 770 is rendered effective to invert the error signal developed by the summing capacitor 762 so that the servo valve 646 is closed slightly under these conditions. More particularly, the changing plus and minus output of the comparator 626 relative to the plus and minus output of the subtractor unit 730 is employed to shift the amplifier 770 from an inverting amplifier to a noninverting amplifier, thereby making the desired change in polarity of the analog error signal. To this end, an exclusive OR-gate 830 is provided which has as one of its inputs the P lead from the comparator 626 and as its other input the output from the OR-gate 812 which corresponds to a signal on the P lead 734 of the subtractor unit 730. During periods when the polarity of the comparator direction signal is the same as the polarity of the direction signal from the subtraction unit 730 no output is derived from the exclusive OR-gate 830. Under these conditions the zero output from the exclusive OR-gate 830 is passed through an inverter 832 and is applied as one input to an AND-gate 834 to the other input of which is applied an enabling signal during the latter portion of the G3 multiplex period, this enabling signal being derived from an AND-gate 836 to whose inputs the G3 multiplex pulse and the output of the inverter 766 are supplied. Accordingly, when the polarity of the comparator direction signal is equal to the polarity of the direction signal from the subtraction unit 730, a flip-flop 838 is reset. The set output of the flip-flop 838 is supplied as one input to an AND-gate 840 to the other input of which is supplied the VEL signal. The output of the AND-gate 840 is connected to the base of an FET 842 which is not conducting until an output is derived from the AND-gate 840. Accordingly, during periods when the comparator direction signal is equal to the subtraction unit signal the non-inverting input of the amplifier 770 is not grounded by the FET 842. The amplifier 770 is thus non-inverting under these conditions. However, when the comparator direction signal reverses with respect to the subtraction unit signal, as for example when a signal appears on the P lead 734 of the subtraction unit 730, while at the same time the comparator signal changes from a signal on the P lead to a signal on the M lead, an output is derived from the exclusive OR-gate 830 which is passed through an AND-gate 848 to set the flip-flop 838. When the flip-flop 838 is set an output is derived from the AND-gate 840 which renders the FET 842 conductive and grounds the non-inverting input of the amplifier 770 so that this amplifier now becomes inverting and inverts the analog error signal developed across the capacitor 762. This condition will remain only until movement in the rotary axis has slowed down sufficiently to cause the direction signal from the caparator 626 to again agree with the direction signal from the subtraction unit 730. When this latter condition is reestablished no output is derived from he exclusive OR-gate 830 and the flip-flop 838 is reset so that the amplifier 770 goes back to a non-inverting condition.

During periods when the point to point mode of operation is employed, no VEL signal is applied to the AND-gate 840 and hence the amplifier 770 remains in its non-inverting condition continuously for point to point operation. Also, as discussed above, the capacitor 778, is shorted by the FET 776 during point to point operation so that the amplifier 770 acts only as a proportional amplifier in this mode of operation.

Considering now the operation of the linear interpolation unit after all thirty-two increments of motion between program step 10 and program step 11 have been completed, under these conditions the address counter 680 should be strobed so that the next program step, i.e. program step 12 becomes the new command signal. However, in accordance with the present invention such change from program step 11 to program step 12 is not controlled by total coincidence in all of the controlled axes but instead is determined by filling of the binary counter 742 which in turn indicates that all thirty-two artificially generated incremental command signals have been developed by the subtract or add circuit 738. To this end, when the binary counter 742 is reset to zero, an output is derived therefrom on the conductor 850 which is supplied as one input to AND-gate 852 to the other input of which is supplied the VEL signal. During the velocity mode of operation, when the binary counter 742 is reset an output is supplied through the AND-gate 852 and through an OR-gate 854 to the address counter 680 so as to cause this counter to shift to the next program step, i.e. program step 12 in the memory 628. However, this change does not occur until a memory change pulse WTR is also supplied to the address counter 680, as will be described in more detail hereinafter. In this connection, it is pointed out that the total time allotted for movement in all axes during the velocity mode of operation is determined by the time required to fill the binary counter 742 which is in turn controlled by the division rate of the frequency divider 744. As discussed previously, the input to the frequency divider 744 is a pulse occurring once every complete multiplex cycle. The duration of a multiplex cycle can be varied by auxiliary control signals which are recorded as bits 1-6, inclusive, in the G2 multiplex period during the teaching operation. These control signals are stored in the buffer registers 722 on playback and are supplied over the six conductors 673 to the counter 672 so that a single multiplex period can be varied from 195.2 $\mu$sec. to 390.4 $\mu$sec. A complete multiplex cycle, which includes eight multiplex periods, can thus be programmed to occur at a rate of from 1.5 to 3.0 milliseconds. Assuming a nominal time of 244 microseconds, if the frequency divider 744 divides by a factor one hundred twenty-eight, for example, then the binary counter 742 will be stepped at a rate of 1/32 of a second, thus allowing this amount of time for each incremental command to be performed. Since there are 32 incremental commands developed by the multiplier 740 during a linear interpolation cycle, a total of one second is provided under these assumed conditions, for simultaneous movement in the various control axes to complete the desired movements between program step 10 and program step 11. However, it will also be understood that these movements are occurring continuously and simultaneously in each axis due to the voltage stored on the error capacitor in that axis, such as the capacitor 762 in the rotary axis. During the latter part of each multiplex period the comparator 626 compares the output of the subtract or add circuit 738 with the encoder signal and the FET 760 is energized so as to charge the capacitor 762 to the new value of error signal. Accordingly, the error signal information is updated once every two milliseconds for each axis. While a total of one second to complete movement of a programmed step is sufficient for the manipulator arm to move a substantial distance, the program steps involving the linear interpolation mode are usually relatively close together when a continuous path type of operation is employed and the path consists of a series of small straight line segments.

During the point to point mode of operation, it is still necessary to provide facilities for shifting from one program step to the next when total coincidence is achieved in all six controlled axes between the encoder signals and their corresponding command signals derived from the memory 628. To this end, the P and M outputs from the AND-gates 820 and 822, respectively, are supplied through the inverters 860 and 862 as two inputs for a three input AND-gate 864. The other input of the AND-gate 864 is derived from the AND-gate 808 and is an enabling pulse occurring during the latter portion of the G3 multiplex period assigned to the rotary axis. The M and P direction output from the comparator 626 are both zero only when coincidence between command and encoder signals is achieved in the rotary axis. Accordingly, during point to point operation enabling signals are developed by both of the inverters 860 and 862 and supplied to the AND-gate 864 only when the desired movement in the rotary axis has been completed. When this occurs, the AND-gate 864 sets a flip-flop 866 which produces a signal on its set output conductor 868 indicating that coincidence has been achieved in the rotary axis. The conductor 868 is supplied to an AND-gate 870 to which outputs, corresponding to the 868 output from the rotary axis, are supplied for all the other five controlled axes. In addition any OX or WX signals are also supplied to the AND-gate 870 when any external functions are completed. Accordingly, when total coincidence is achieved in all six axes and the external conditions have been satisfied, a total coincidence output is derived from the AND-gate 870 which is supplied over the conductor 872 to one input of an AND-gate 874. The other input of the AND-gate 874 is supplied through an inverter 876 from the VEL terminal so that when the system is operated in the point to point mode of operation a TC signal on the conductor 872 passes through the AND-gate 874 and the OR-gate 854 and again conditions the address counter 680 to step to the next program step in the memory 628.

During point to point operation no VEL signal is produced and registered in the buffer register 722 so that the −1 step adder 720 and the −1 step register 728 are inactive. Under these conditions the command signals corresponding to desired movement in all six controlled axes are supplied from the output conductors 630 of the memory 628 to a series of AND-gates, indicated collectively as the AND-gates 880 to the other input of which is supplied the output of an inverter 882 connected to the VEL signal. Accordingly, when no VEL signal is produced an enabling input is provided for the AND-gates 880 so that the command signals from the memory 628 pass through the OR-gates 882 to the input of the comparator 626. Since no VEL signal is produced during point to point operation, the AND-gates 884 are not enabled so that no output from the subtract or add circuit 738 is supplied to the comparator 626 under these conditions. Accordingly, during point to point operation the encoder signals are compared with command signals derived from the memory 628 and employed to move the manipulator arm in all six controlled axes, as described generally heretofore and as described in detail in previous patents such as U.S. Dunne et al Pat. No. 3,661,051.

During the teaching operation, one or the other of the direction buttons 658 and 660 is depressed by the teaching operator in accordance with the direction in which he wishes the manipulator arm to move in the rotary axis. When either of the buttons 658 or 660 is closed a signal is passed through one of the OR-gates 812 or 814 so as to render one of the control transistors 788 or 790 conductive. However, it is also necessary to supply an input voltage to the servo amplifier 772 during the teaching operation so that the servo valve 846 will be opened and the manipulator arm moved in the rotary axis in the desired direction. To this end, a potentiometer 886 is connected from plus five volts to ground, the arm of this potentiometer being connected to the teach button switches 658a and 660a which are closed simultaneously with depression of the direction buttons 658, 660 respectively. In this connection it will be understood that the switches 658a and 660a may simply comprise a second switch section on the direction buttons 658 and 660. The sections 658a and 660a are connected together and through a summing resister 890 to the input of the amplifier 772. Also, during the teaching operation a third set of switch sections 658b and 660b are connected between the plus five volt terminal and the FET 776. During the teaching mode of operation the FET 776 is thus rendered conductive during either direction of motion so that the capacitor 778 is short circuited and the amplifier 772 is operated in the proportional mode only. Accordingly, a signal is supplied to the bases of the transistor 780 and 782 during depression of either one of the buttons 658a or 660a which is of the proper polarity to cause one of the servo valve windings 784 or 786 to be energized in the proper amount to actuate the servo valve at the desired speed of motion in the rotary axis. In this connection it will be understood that the potentiometer 886 may be adjusted as desired to control the speed of movement in the rotary axis.

As discussed generally heretofore, it is exceedingly difficult to program or teach the manipulator 50 so that the manipulator hand 96 will move in a linear or straight line path. This is because the movements in the six controlled axes of the manipulator 50 involve rotary movement about series connected joints and movement of certain of these axes interact with other axes as they are moved. Furthermore, simultaneous movement in a number of different axes by depressing the required ones of the teach direction buttons 658, 660, 686, 688 and 692, 694 (FIG. 24), and the choice of appropriate speeds in each of these axes to effect a resultant straight line motion is almost impossible for a human operator to perform manually, particularly in confined situations. On the other hand, many operations in assembly of parts require such straight line motion. For example, when inserting a cylinder into a hole, or when sliding mating parts into straight line grooves, etc. it is extremely desirable to be able to produce a linear or straight line equivalent motion of the manipulator hand, at any desired angle, during the teaching operation.

Figure 26:
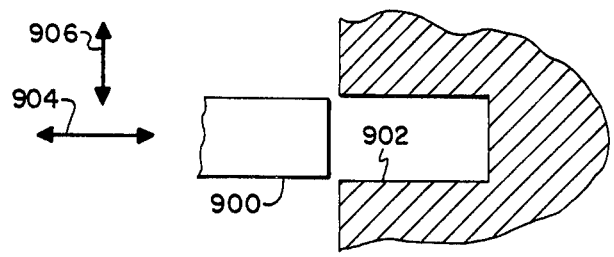
FIG. 26 is a diagram employed in describing the teach assist facilities of the present invention.

To resolve these conflicting requirements, and in accordance with an important aspect of the present invention, facilities are provided for employing a computer to perform the necessary calculations and determine the necessary movements in each of the six controlled axes which are required to effect linear or straight line motion in a desired direction. More particularly, as shown in FIG. 26, when it is desired to insert a pin 900 into a mating opening 902 the manipulator hand 96 is pointed or aimed so that the cylinder 900 is aligned along the line 904, shown in FIG. 26, which corresponds to the axis of the opening 902. This axis may be at any desired angle with respect to the horizontal or vertical. The programmer than specifies a distance along the line 904 which the pin 900 is to be moved in order to insert it to a desired depth in the opening 902. The encoder readings corresponding to the position of the pin 900 shown in FIG. 26 when it is immediately adjacent the opening 902 and is aimed along the axis 904 are supplied to the computer together with a specification of the distance the pin 900 is to be moved along the axis 904. The computer then makes the necessary calculations to compute a series of incremental positions in all six controlled axes such that the pin 900 will move along the axis 904 the desired distance. In this connection it will be understood that movement along the axis 904 will require many calculations by the computer since the only data available to it is the digital encoder readings for the six controlled axes at the point of entry of the pin 900 shown in FIG. 26, as will be described in more detail hereinafter.

In a similar manner the computer may also be used in a teach-assist arrangement for movement in a line 906 which is perpendicular to the axis 904, such motion being programmed in a manner similar to the above-described motion along the axis 904. The movement may also be in a so-called sweep axis perpendicular to the plane of the lines 904, 906, or along a line consisting of a combination of all three of these motions, as will be described in more detail hereinafter.

Figure 27:
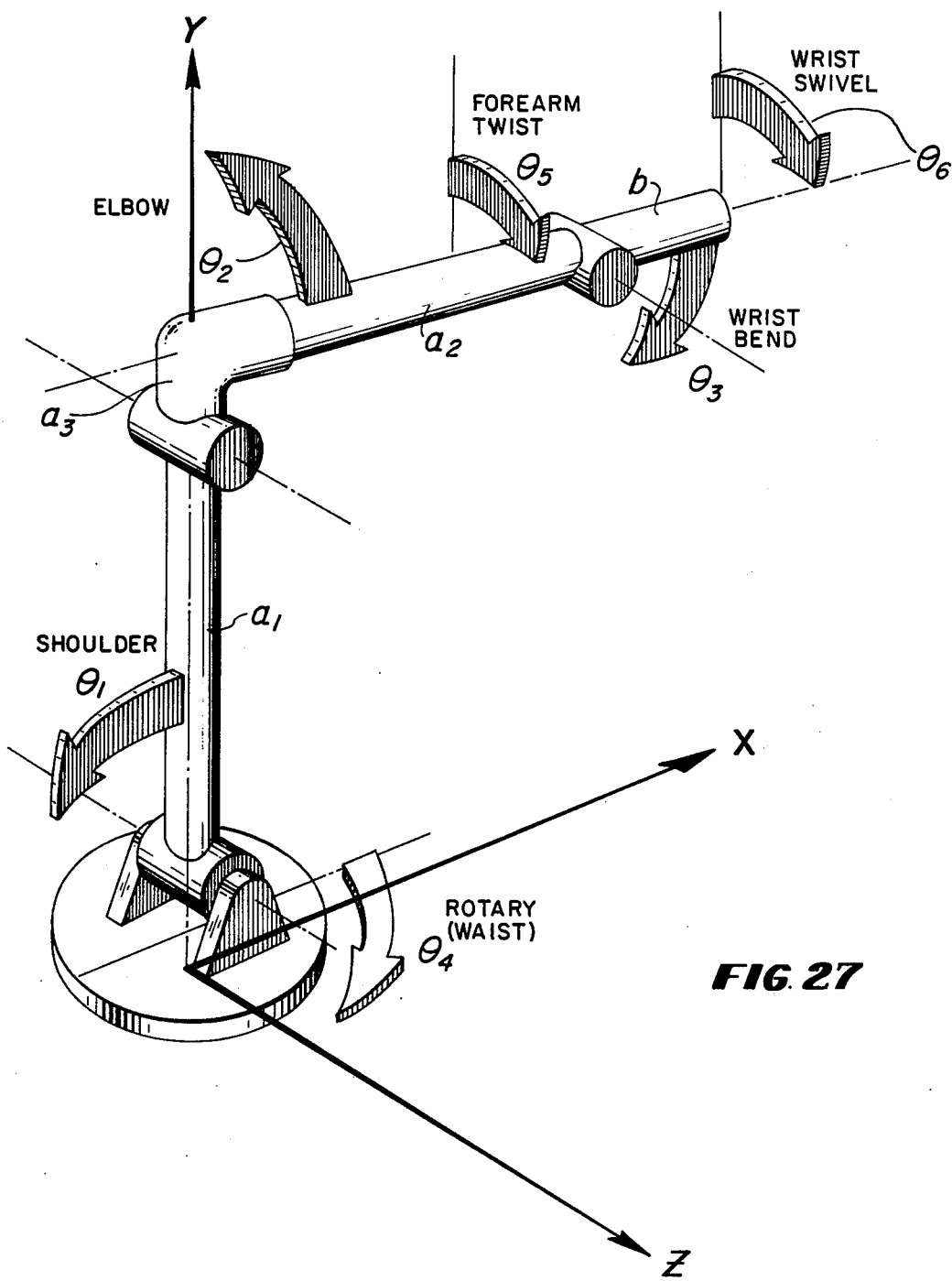
FIG. 27 is a diagrammatic perspective view of the manipulator of FIG. 6 and illustrating the six controlled axes of this manipulator.

In accordance with an important aspect of the invention, the calculations which the computer must make in order to effect motion along the axis 904 or the axis 906 are substantially reduced, so that the time required for the computer to produce the incremental positional data for movement to the desired position within the opening 902 is substantially smaller. This is important even though the computer is used off-line during the teaching operation, since even with the simplification described hereinafter the calculations are extremely complex and require a substantial amount of computer time. Before considering the manner in which the computer calculates the desired movement along the axis 904, the various relationships between the six controlled axes of the manipulator 50, and the equations which have been developed in accordance with the present invention to simplify these relationships, will be discussed. Thus, referring to FIG. 27, the six articulations of the manipulator 50 are shown in relation to a superimposed X, Y, Z Cartesian coordinate axis system, movement in each of the six controlled axes of the manipulator being identified by a particular angle. Thus, motion in the rotary axis is identified as $\theta4$, motion in the shoulder axis is identified as $\theta1$, motion in the elbow axis is identified as $\theta2$, motion in the forearm twist axis is identified as $\theta5$, motion in the wrist bend axis is identified as $\theta3$, and motion in the wrist swivel axis is identified as $\theta6$. In FIG. 27 the manipulator arm is shown with all of the angles $\theta1$–$\theta6$ at zero and the arrows indicate the direction of increasing $\theta$. Also, $\theta2$ equals zero when the shoulder arm portion 84 is at right angles to the elbow arm portion 90. All other $\theta$'s are zero at midtravel of the motion in that axis.

As described generally heretofore, the six controlled axes have the following ranges of movement with respect to the zero angles shown in FIG. 27;

| 01 | = | +30 (shoulder) |
|----|---|----------------|
|    |   | −50            |
| 02 | = | +40 (elbow)    |
|    |   | −50            |
| 03 | = | ±120 (wrist bend) |
| 04 | = | ±55 (rotary)   |
| 05 | = | ±150 (wrist twist) |
| 06 | = | No mechanical limits (wrist swivel) |

While $\theta6$ has no mechanical limits, for simplicity in computer programming all arguments of trigonometric functions should be less than 180° or pi radians to avoid ambiguity in arc functions. Accordingly, for the computer teach-assist facility described in detail hereinafter, $\theta6$ will be limited to ±180°.

The position of each of the motions indicated in FIG. 27 is given by the encoders 602 and 608 to 616, inclusive, as described in detail heretofore. The output of these encoders when converted to angular information will be defined as $\theta1e$ to $\theta6e$, inclusive. As will be evident from the pictorial representation in FIG. 27, a number of the movements in the various controlled axes are in series with one another so that there are various interactions between the different degrees of motion. Thus, when one axis is rotated it imparts a motion to another axis. In some cases the motion caused by interaction with another axis is not measured by the encoder. Therefore, $\theta N$ does not equal $\theta Ne$ for some axes. In other cases, more than one axis imparts an interaction to a particular axis.

In accordance with an important aspect of the invention, the particular gear ratios and interconnecting drive mechanisms, described heretofore and particularly set forth in FIG. 21, are arranged so that the expressions for all of the terms $\theta1$ to $\theta6$, inclusive, as a function of $\theta1e$ to $\theta6e$, inclusive, may be expressed by combining encoder outputs on a binary related basis. This means that the particular values for $\theta1$ to $\theta6$, inclusive, may be derived by simply adding a fixed and binary related portion of one encoder output to the output of another encoder. Specifically, the gear ratios and interconnecting mechanisms shown in FIG. 21 are arranged so that the following expresions for $\theta1$ to $\theta6$, inclusive, occur:

$$\theta1 = \theta1e \tag{1}$$

$$\theta2 = \theta2e \tag{2}$$

$$\theta3 = \theta3e + 1/32\theta5e \tag{3}$$

$$\theta4 = \theta4e \tag{4}$$

$$\theta5 = \theta5e \tag{5}$$

$$\theta6 = \theta6e + 1/16\theta3e + 17/512\theta5e \tag{6}$$

Since it is also necessary for the computer to convert in the opposite direction, i.e. from encoder values to $\theta1$ to $\theta6$ values, the following expressions are also provided in the arrangement shown in FIG. 21 of the present invention:

$$\theta1e = \theta1 \tag{7}$$

$$\theta2e = \theta2 \tag{8}$$

$$\theta3e = \theta3 - 1/32\theta5 \tag{9}$$

$$\theta4e = \theta4 \tag{10}$$

$$\theta5e = \theta5 \tag{11}$$

$$\theta6e = \theta6 - 1/16\theta3 - 1/32\theta5 \tag{12}$$

In order to provide an arrangement so that the computer does not call for a position of any motion beyond its mechanical stops, limits for $\theta1e$ to $\theta6e$ must be made.

As stated heretofore the $\theta6$ is limited to plus or minus 180°. Using equations (1) to (6) and the defined ranges of $\theta1$ to $\theta6$, limits for $\theta1e$ to $\theta6e$ can be established as follows:

$$\theta1e = \theta1 < 30 \text{ degrees} \tag{13a}$$

$$\theta1e = \theta1 > -50 \text{ degrees} \tag{13b}$$

$$\theta2e = \theta2 < 40 \text{ degrees} \tag{14a}$$

$$\theta2e = \theta2 > -50 \text{ degrees} \tag{14b}$$

$$\theta4e = \theta4 < 55 \text{ degrees} \tag{15a}$$

$$\theta4e = \theta4 > -55 \text{ degrees} \tag{15b}$$

$$\theta5e = \theta5 < 150 \text{ degrees} \tag{16a}$$

$$\theta5e = \theta5 > -150 \text{ degrees} \tag{16b}$$

$$\theta3e = \theta3 - 1/32\theta5e < 115.3 \text{ degrees} \tag{17a}$$

$$\theta3e = \theta3 - 1/32\theta5e > -115.3 \text{ degrees} \tag{17b}$$

$$\theta6e = \theta6 - 1/16\theta3 - 17/512\theta5e < 167.8 \text{ degrees} \tag{18a}$$

$$\theta6e = \theta6 - 1/16\theta3 - 17/512\theta5e > -167.8 \text{ degrees} \tag{18b}$$

Figure 28:
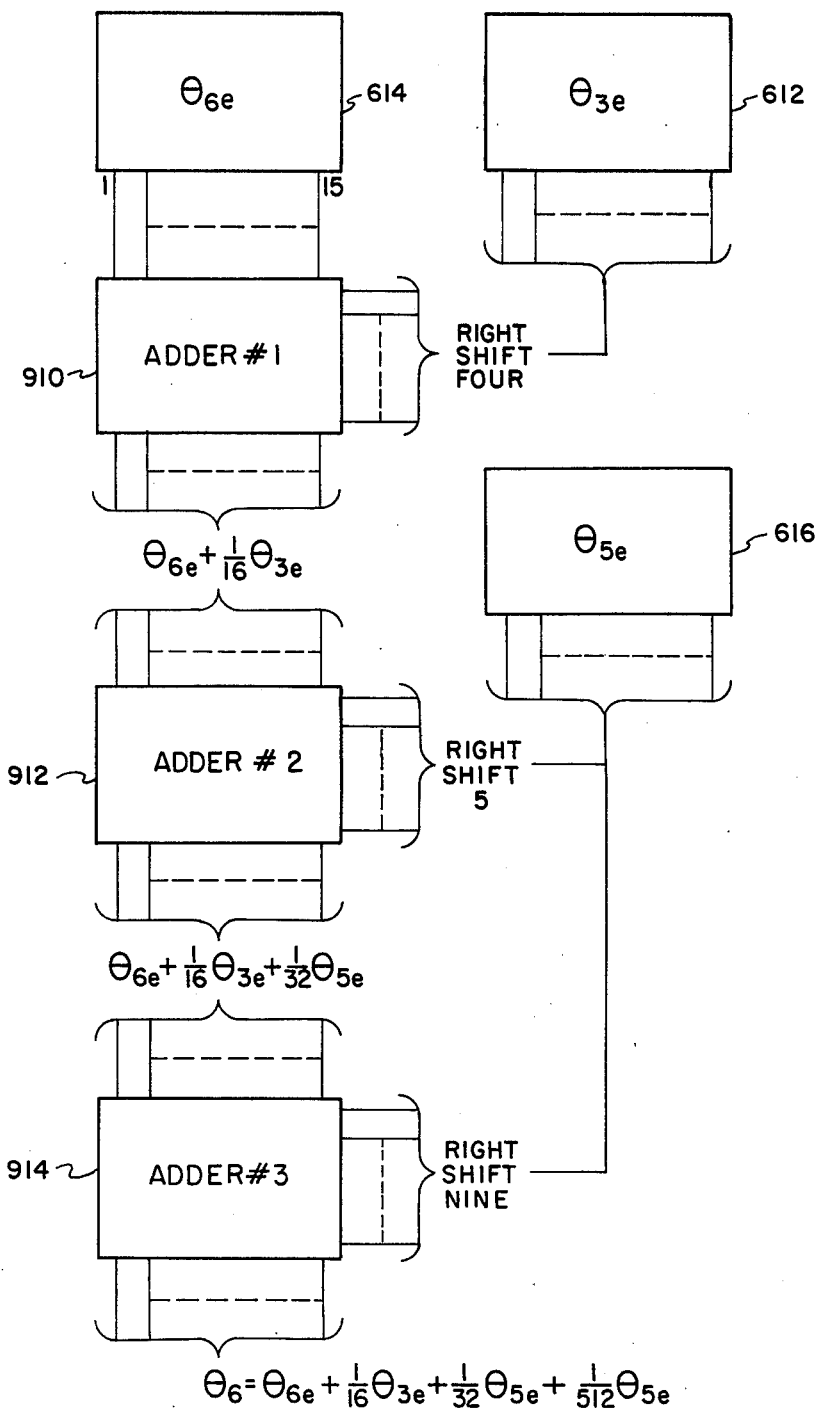
FIG. 28 is a block diagram illustrating the manner in which desired angular values may be derived from encoder values in accordance with the present invention.

As an example of the simplification provided in accordance with the present invention for converting encoder readings into the desired $\theta$ values, and considering the derivation of $\theta 6$ which is the wrist swivel motion and involves components of wrist swivel, wrist bend and forearm twist, as shown in equation (6), in FIG. 28 a typical logic circuit arrangement is shown for deriving $\theta 6$ from the three component encoder values. Thus, the wrist swivel encoder 614 is supplied to a first adder 910 and the 15 bit output from the wrist bend encoder 612 ($\theta 3e$) is shifted right by four bits and supplied as the other input for the adder 910. The output of the adder 910 is thus the $\theta 6e$ value plus 1/16 of the $\theta 3e$ value.

The output of adder 910 is supplied to a second adder 912 to the other input of which is supplied the output of the forearm twist encoder 616 ($\theta 5e$) but right shifted by a binary factor of five so that the output of the second adder 912 is $\theta 6e$ plus 1/16$\theta 3e$ plus 1/32$\theta 5e$. The output of the adder 912 is supplied to a third adder 914 to the other input of which is supplied the output of the forearm twist encoder 616 right shifted by a factor of 9. The output of the third adder 914 is thus the desired value of $\theta 6$ since the two components of the forearm twist encoder $\theta 5e$ of 1/32 and 1/512 correctly sum to the required value set forth in equation (6). Accordingly, by simply providing three adders, which may be hard wired or may be programmed in the computer, the conversion from encoder values to $\theta 1$ to $\theta 6$ values is very simply accomplished in accordance with the present invention. It will also be noted that the conversion equations (7) to (12), inclusive, are also related to one another by binary increments so that the addition of $\theta$ values may be very simply accomplished to convert back to desired encoder values.

In order for the computer to calculate the desired positions in each of the six controlled axes in order to accomplish straight line movement along the axis 904, for example, it is necessary that the computer transform the $\theta$ values, given by the encoder outputs as modified by equations (1) to (6) above, into corresponding Cartesian coordinates, i.e. X, Y and Z components so that the new increment of motion may be added in Cartesian coordinates. It is then necessary for the computer to transform these new Cartesian coordinate values back into polar coordinate form in order to produce $\theta$ values which can constitute new command signals for moving the six controlled axes to the new position along the axis 904.

If these transformations are accomplished by the solution of six simultaneous equations in six unknowns the task of performing each transformation is extremely complex, consumes a considerable amount of computer time and is cumbersome to program. In accordance with the present invention a simplified approach is provided which substantially shortens the total time required for the computer to make the necessary calculations and yields accurate results. Furthermore, this approach is arranged to cooperate with the above-described linear interpolation mode of operation during playback so that extremely accurate motion along any desired direction is provided. This simplification is accomplished by initially positioning or aiming the manipulator hand so that it is pointing in the desired direction of movement which is to be programmed. The encoder data thus provided when the pin 900 is aimed in the correct direction to be inserted into the opening 902 (FIG. 26) then establishes orientation angles which are defined during the teach aiming process and may be employed in converting into Cartesian coordinates and back into polar coordinates to substantially simplify the required calculations.

Figure 11:
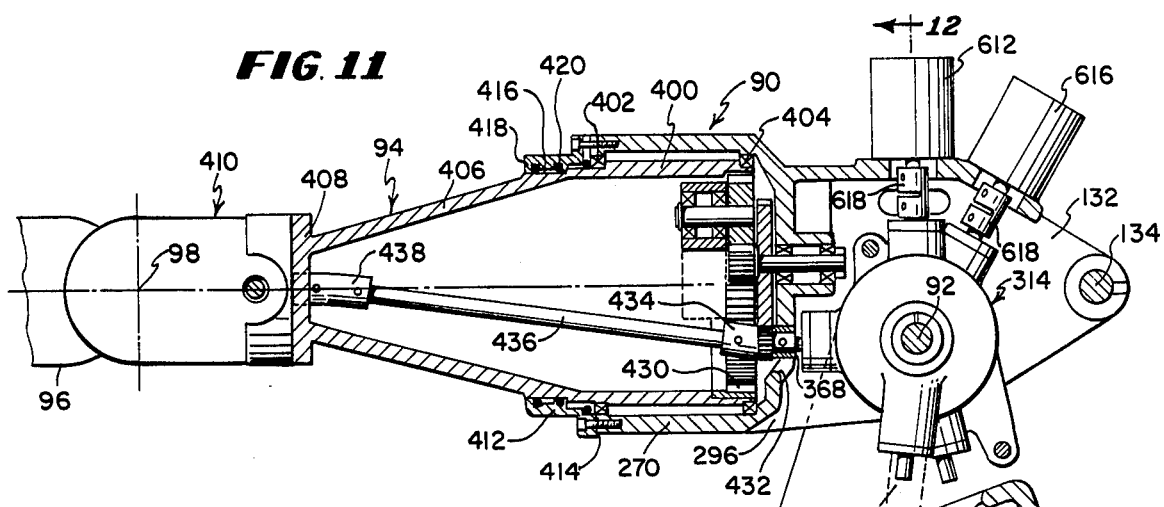
FIG. 11 is a sectional view of the forearm portion of the manipulator of FIG. 6 taken along the forearm twist axis thereof.
Figure 12:
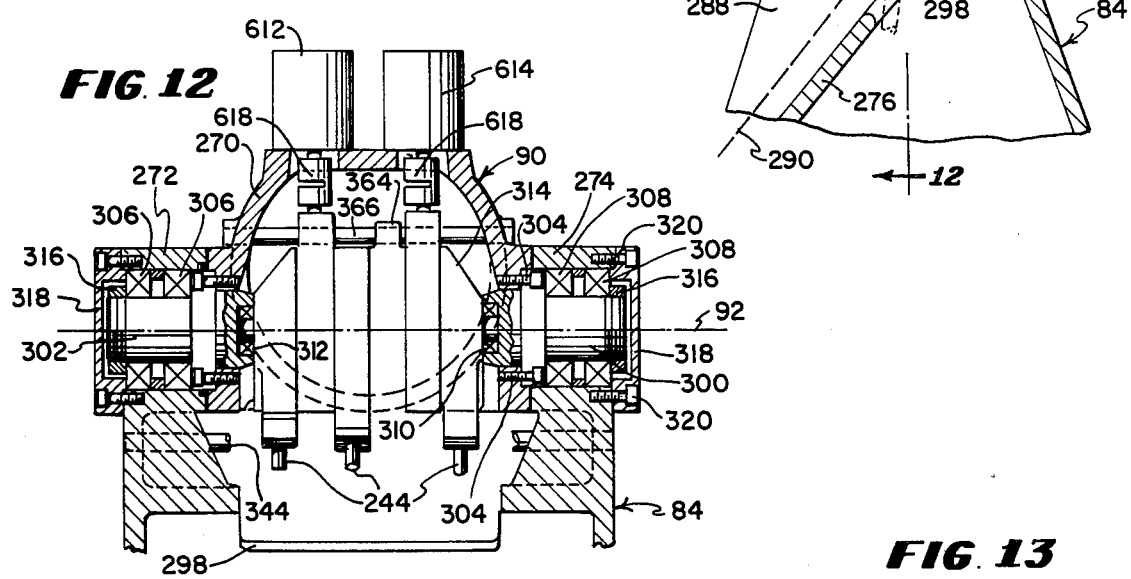
FIG. 12 is a sectional view taken along the line 12—12 of FIG. 11.
Figure 13:
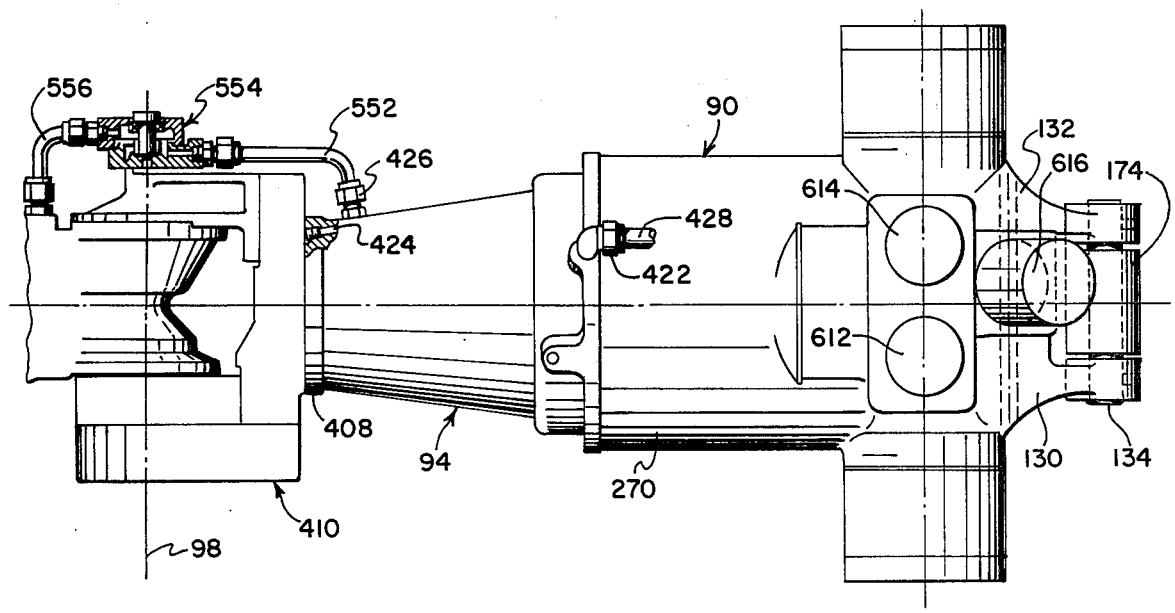
FIG. 13 is a fragmentary plan view of the manipulator forearm portion of FIG. 11.
Figure 29:
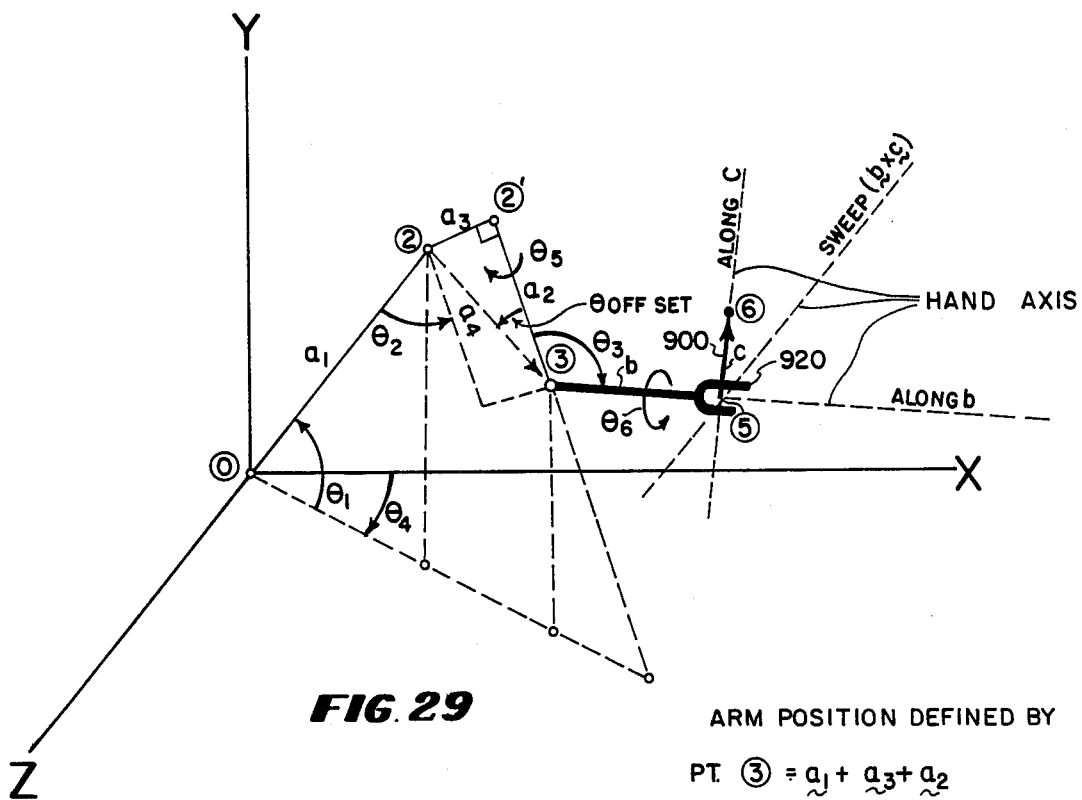
FIG. 29 is a diagrammatic perspective representation of the manipulator of FIG. 6 employed in describing the teach assist facilities of the present invention.

Before considering this simplification in detail, reference is made to FIG. 29 wherein the various articulations which are interconnected to make up the manipulator arm 50, are shown. Referring to this figure, the vector a1 represents the shoulder arm portion 84. The vectors a2 and a3, which are at right angles, represent collectively the orientation of the elbow arm portion 90. The offset portion a3 is required because the axis of the elbow arm portion 90 is positioned somewhat above the elbow arm axis 92, as is best illustrated in FIG. 11. However, the components a2 and a3 are always positioned at right angles to one another, as shown in FIG. 29.

The component b represents the manipulator hand 96 which is movable about the wrist bend axis, identified as pt. 3 (this point being identified by the numeral 3 within a circle in FIG. 29) and movement of the element b in the wrist bend axis corresponds to the indicated angle $\theta 3$. The jaws of the manipulator hand are indicated at 920 in FIG. 29 and the element c represents an article, such as the pin 900, which when grasped in the jaws 920 extends at right angles to the element b. The end of the pin 900 (or element c), termed the end effector in the following description, is identified at pt. 6. The intersection of the elements b and c is identified as pt. 5 in FIG. 29. When the manipulator hand is rotated in the wrist swivel axis to produce a change in $\theta 6$, the end effector (pt. 6) moves in a plane perpendicular to the element b.

As described generally heretofore, the simplified approach of the present invention for calculating the necessary transformation from Cartesian to polar coordinates is based on the premise that the teaching operator wishes to move the end effector either along the axis of the element b or along the axis of the element c. However, more complex movements, such as a sweep movement along a path perpendicular to the plane defined by the members b and c is also possible, or along a line which is a combination of movement along b, along c or along the sweep axis, as will be described in more detail hereinafter.

It will thus be seen that the manipulator arm 50 is comprised of the members a1, a2, a3, b and c. Furthermore, orientation of this arm is controlled by varying the joint angles $\theta 1$ through $\theta 6$ inclusive. By limiting the commanded motion to movement of X inches in the direction the element b is aimed or movement of X inches in the direction element c is aimed (shown as "along b" or "along c" in FIG. 29) the complexity of the Cartesian polar trasformation is greatly reduced. This is because when motion is commanded along either plus or minus b or along plus or minus c, we know that points 3, 5 and 6 must each move an identical $\Delta X$, $\Delta Y$ and $\Delta Z$. This is because the members b and c are essentially rigidly attached and in quadrature with each other.

The angular orientation of the element c with respect to the element b can be adjusted by changing $\theta 6$. Nevertheless, if we command a motion along b then pts. 3, 5 and 6 all move in parallel with each other and parallel to the axis of the element b. Similarly, if we command motion along the element c, pts. 3, 5 and 6 all move in parallel with each other and parallel to the axis of the element c. By constraining all motions from a given start point at which the values $\theta 1$ to $\theta 6$ are known to equal simultaneous linear translation of pts. 3, 5 and 6, the calculations to define the end pt. 6 require only three equations with six unknowns. These same three equations when simplified to five unknowns define pt. 5; and finally the same three equations when simplified to three unknowns define pt. 3.

As shown in FIG. 29, pt. 3 is defined as equalling the sum of the vectors a1+a2+a3. Pt. 5 is defined as equalling the sum of the vectors a1+a2+a3+b. Similarly, pt. 6 is defined as equalling the sum of the vectors a1+a2+a3+b+c. In accordance with an important aspect of the invention, three equations have been developed involving the six unknowns, $\theta 1$ to $\theta 6$, inclusive, which define x6, y6 and z6, i.e. the Cartesian coordinates of the end effector pt. 6. These equations can be used to solve for the pt. 5 coordinates x5, y5 and z5 by setting the c terms equal to zero and similarly one can solve these equations for x3, y3 and z3 by setting both b and c term coefficients equal to zero. Specifically, the three equations which have been developed to give the x, y and z coordinates of the end effector pt. 6 in terms of the elements a1, a2, a3, b, c and the angles $\theta 1$ to $\theta 6$, inclusive, are as follows:

$$x6 = a1 \cdot \cos\theta 1 \cdot \cos\theta 4 + a2 \cdot \cos(180-\theta 1-\theta 2) \cdot \cos\theta 4 + a3 \cdot \sin(180-\theta 1-\theta 2) \cdot \cos\theta 4 + b \cdot \cos(180-\theta 3) \cdot \cos\theta 4 \cdot \cos(180-\theta_1-\theta_2) + b \cdot \sin(180-\theta 3) \cdot \cos\theta 5 \cdot \sin(180-\theta 1-\theta 2) \cdot \cos\theta 4 - b \cdot \sin(180-\theta 3) \cdot \sin\theta 5 \cdot \sin\theta 4 - c \cdot \cos\theta 6 \cdot \sin(180-\theta 3) \cdot \cos\theta 4 \cdot \cos(180-\theta 1-\theta 2) + c \cdot |\cos A| \cdot \sin(180-\theta 1-\theta 2) \cdot \cos\theta 4 \; B - c \cdot |\cos A| \cdot \sin B \cdot \sin\theta 4 \quad (19)$$

$$y6 = a1 \sin\theta 1 - a2 \sin(180-\theta 1-\theta 2) + a3 \cdot \cos(180-\theta 1-\theta 2) - b \cdot \cos(180-\theta 3) \cdot \sin(180-\theta 1-\theta 2) + b \cdot \sin(180-\theta 3) \cdot \cos\theta 5 \cdot \cos(180-\theta 1-\theta 2) + c \cdot \cos\theta 6 \cdot \sin(180-\theta 3) \cdot \sin(180-\theta 1-\theta 2) + c \cdot |\cos A| \cdot \cos B \cdot \cos(180-\theta 1-\theta 2) \quad (20)$$

$$z6 = a1 \cdot \cos\theta 1 \cdot \sin\theta 4 + a2 \cdot \cos(180-\theta 1-\theta 2) \cdot \sin\theta 4 + a3 \cdot \sin(180-\theta 1-\theta 2) \cdot \sin\theta 4 + b \cdot \cos(180-\theta 3) \cdot \sin\theta 4 \cdot \cos(180-\theta 1-\theta 2) - c \cdot \cos\theta 6 \cdot \sin(180-\theta 3) \cdot \sin\theta 4 \cdot \cos(180-\theta 1-\theta 2) + b \cdot \sin(180-0-3) \cdot \cos\theta 5 \cdot \sin(180-\theta 1-02) \cdot \sin\theta 4 + c \cdot |\cos A| \cdot \cos B \cdot \sin(180-\theta 1-\theta 2) \cdot \sin\theta 4 + b \cdot \sin(180-\theta 3) \cdot \sin\theta 5 \cdot \cos\theta 4 + c \cdot |\cos A| \cdot \sin B \cdot \cos\theta 4 \quad (21)$$

where: $|\cos A| = \left|\cos\left\{\sin^{-1}(\cos\theta 6 \cdot \sin(180-\theta 3))\right\}\right|$ and $B = \theta 5 + \sin^{-1}\left(\dfrac{\sin\theta 6}{\left\{\cos\left\{\sin^{-1}(\cos\theta 6 \cdot \sin(180-\theta 3))\right\}\right\}}\right)$ After the end effector, i.e. pt. 6, is positioned and is aimed in the direction the teaching operator wants to move, it is then necessary to calculate and solve for the coordinates of pts. 3, 5 and 6 in X, Y and Z Cartesian coordinates which defined the starting point for the proposed movement in a particular direction, such as the axis 904, corresponding to movement along the axis of the element b in FIG. 29. These coordinate value sets can be calculated from the equations 19, 20 and 21 given above. First, the coordinate values X6, Y6 and Z6 are determined by substituting the required $\theta 1$ to $\theta 6$ values in each of equations 19, 20 and 21, respectively. The c terms are then set to zero and these equations are then solved for X5, Y5 and Z5. Both the b and c coefficient terms are then set to zero and these equations are solved for the coordinates X3, Y3 and Z3.

Figure 30:
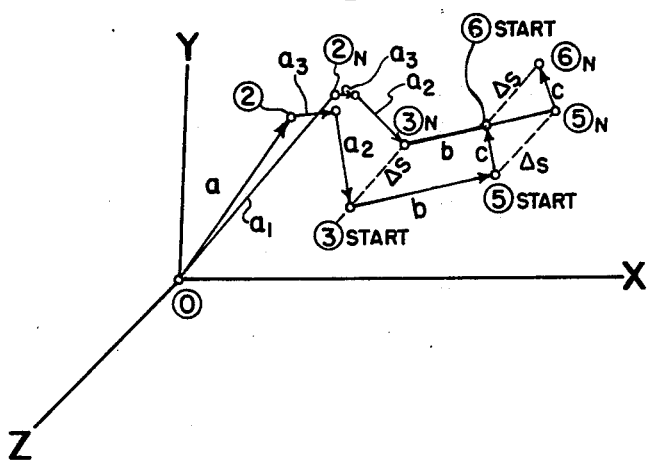
FIG. 30 is a simplified diagrammatic representation similar to FIG. 29 but showing translational movement of the manipulator hand to a new position.

It is necessary to calculate the $\Delta X$, $\Delta Y$ and $\Delta Z$ coordinate components needed to move the commanded distance along the b axis. It is important to understand that pts. 3, 5 and 6 will each be moved by identical $\Delta X$, $\Delta Y$ and $\Delta Z$ distances. This insures that hand orientation from the wrist out (pt. 3) will be maintained. Members b and c will be translated linearly in space but their orientation will remain the same as that of the aimed start point, as illustrated diagrammatically in FIG. 30. Referring to FIG. 30, it will be seen that the members a1, a2 and a3 of the manipulator arm will be moved, as required, to yield the "no twist" translation of elements b and c. However, the members a1, a2 and a3 will probably end up in a nonparallel orientation relative to their "aimed" start point position, as shown in FIG. 30. By constraining movement of pts. 3, 5 and 6 to a constant $\Delta S$ (S=distance) the calculations required to derive the $\theta 1$ to $\theta 6$ set necessary to define new pts. 3, 5 and 6 (defined as pt.3N, pt.5N and pt.6N) are substantially simplified.

Considering now the generation of $\Delta X$, $\Delta Y$ and $\Delta Z$ components of the proposed move $\Delta S$, $\Delta S$ may first be defined in accordance with the following relationship:

$$\Delta S = \sqrt{\Delta X^2 + \Delta Y^2 + \Delta Z^2} \quad (22)$$

where $\Delta S$ represents the distance through which pts. 3, 5 and 6 are to be moved, with $\Delta X$, $\Delta Y$ and $\Delta Z$ representing the Cartesian coordinate components of the proposed $\Delta S$ move.

If the proposed move is to be along the element b, i.e. the axis 904, then $\Delta X$, $\Delta Y$ and $\Delta Z$ values are derived from the following equations:

$$\Delta Xb = \dfrac{X5 - X3}{b} \cdot \Delta S_b \quad (23)$$

$$\Delta Yb = \dfrac{Y5 - Y3}{b} \cdot \Delta S_b \quad (24)$$

$$\Delta Zb = \dfrac{Z5 - Z3}{b} \cdot \Delta S_b \quad (25)$$

If the proposed move is to be along element c and is equal to $\Delta S$ inches, then $\Delta X$, $\Delta Y$ and $\Delta Z$ are derived as follows:

$$\Delta Xc = \dfrac{X6 - X5}{c} \cdot \Delta S_c \quad (26)$$

$$\Delta Yc = \dfrac{Y6 - Y5}{c} \cdot \Delta S_c \quad (27)$$

$$\Delta Zc = \dfrac{Z6 - Z5}{c} \cdot \Delta S_c \quad (28)$$

In a similar manner, one can move in any direction in space by defining direction cosines with respect to the X, Y and Z axes of the desired translation to be programmed, as follows:

$$\Delta X = \Delta S \times \text{dir. Cos. of Move re X axis} \quad (29)$$

$$\Delta Y = \Delta S \times \text{dir. Cos. of Move re Y axis} \quad (30)$$

$$\Delta Z = \Delta S \times \text{dir. Cos. of Move re Z axis} \quad (31)$$

Having first defined the X, Y and Z coordinates of pts. 3, 5 and 6 prior to the desired move, one can now add the $\Delta X$, $\Delta Y$ and $\Delta Z$ components of the proposed move to the coordinate sets for pts. 3, 5 and 6 to yield coordinate sets for pt.3N, pt.5N and pt.6N of the desired new arm position. The remaining task then becomes one of finding corresponding new angles ($\theta$1N to $\theta$6N) which will yield the X, Y and Z new coordinate sets for pts. 3, 5 and 6. This process is properly called the inverse transformation process and yields the direct $\theta$1N to $\theta$6N angle sets corresponding to a given X, Y and Z coordinate position set for each of pts. 3, 5 and 6. In general, such inverse transformation is accomplished by using three equations involving three unknowns which define the new Cartesian coordinates of pt. 3 and solving for $\theta$1N, $\theta$2N and $\theta$4N, thereby determining the new position of pt. 3. Having determined $\theta$1N, $\theta$2N and $\theta$4N, one can then solve for $\theta$3N by means of the triangle involving pt. 2', pt. 3 and pt. 5 whose three sides can readily be determined. Once $\theta$3N is known, $\theta$5N can then be determined using known coordinates of X5, Y5 and Z5. In a similar manner one can then solve for $\theta$6N once $\theta$5N is determined.

Figure 31:
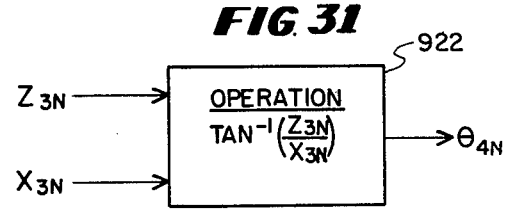

The specific operations which must be performed to provide the inverse transformation discussed above are shown in FIGS. 31-49 of the drawings, which disclose the sequence of operations which are performed by the computer during the teach-assist operation discussed in detail heretofore. As shown in FIG. 31, the first calculation is of $\theta$4N which requires taking the arc tangent of the quantity Z3N/X3N. Thus, assuming motion along b only, it will be noted that the value X3N is equal to the X coordinate (Cartesian) of the original start point derived from equation 19 plus the change in the X component derived from equation (23). In a similar manner Y3N and Z3N are developed. The taking of the arc tangent is indicated by the logic block 922 in FIG. 31, it being understood that this operation is performed in the computer associated with the manipulators 50 and 52, as will be described in more detail hereinafter. In the alternative, the calculations of FIGS. 31 to 49 may be performed in any other suitable manner, such as by means of a hand calculator, or by any type of analog processing, or special, or general purpose digital type processing.

Figure 32:
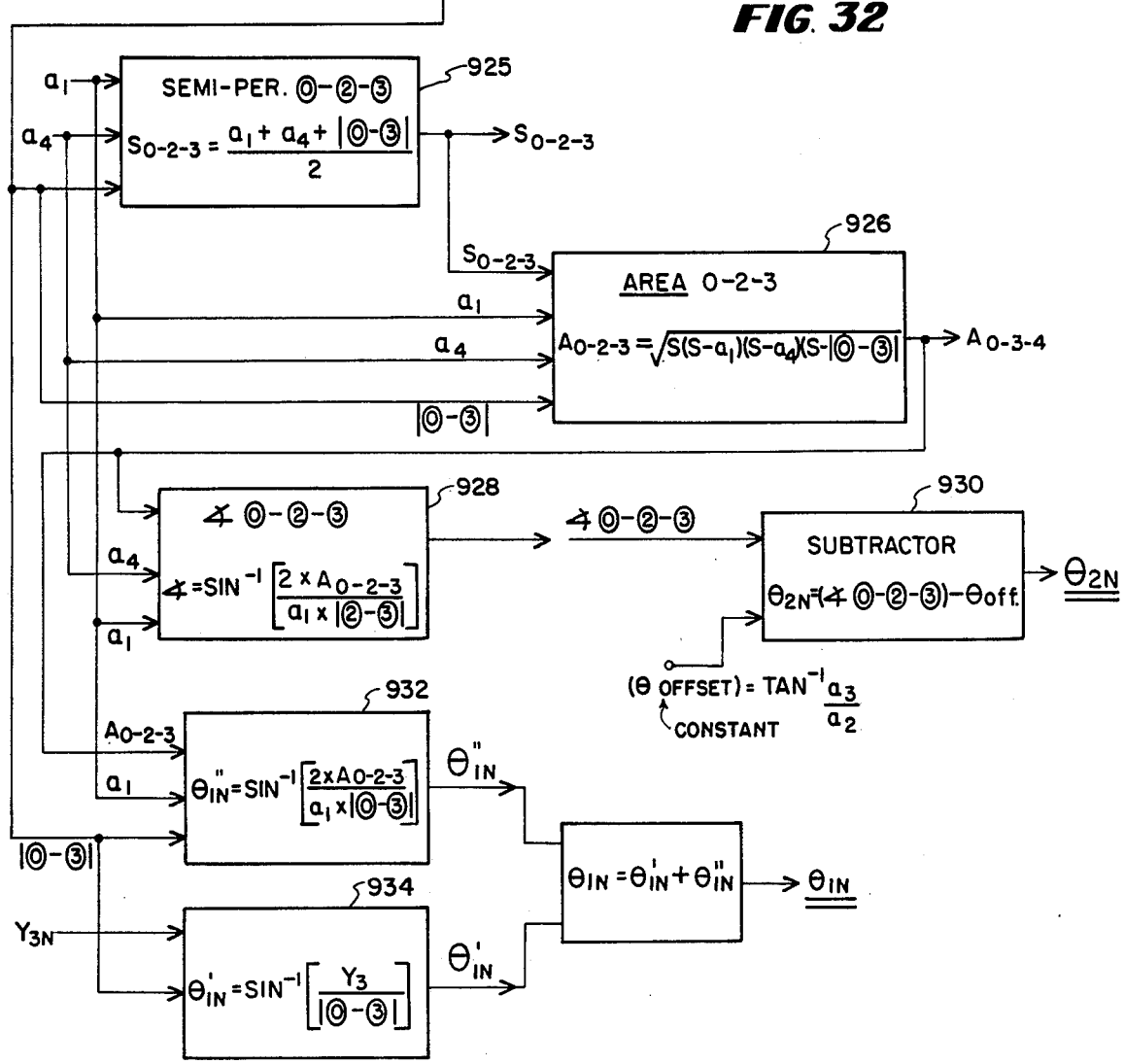
Figure 33:
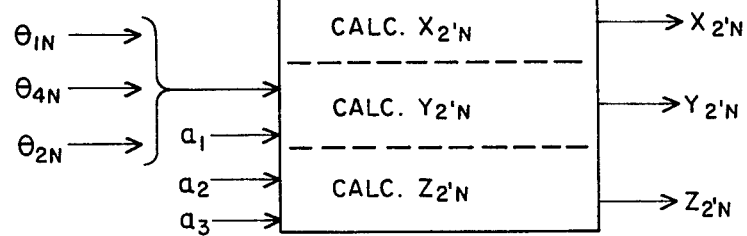

It is then necessary to develop outputs of $\theta$1N and $\theta$2N, this being shown in FIG. 32. In order to derive these quantities, the triangle formed by the pts. 0, 2 and 3 in FIGS. 29 and 30 is employed. First, the magnitude of the distance between pt. 0 and pt. 3 is determined, as shown by the logic block 924. This value is then combined with the known distances a1 and a4 in FIG. 29 in the logic block 925 in order to determine the semiperimeter of the triangle pt. 0-pt. 2-pt. 3, this output being identified as $S_{0-2-3}$. The output of the logic block 925 is then combined with the inputs to this logic block in the logic block 926 to determine the area of the triangle p. 0-pt. 2-pt. 3. In the logic block 928 the arc sine of the angle formed by pt. 0-pt. 2-pt. 3 is determined and this output is supplied to a subtractor 930 in which a value proportional to the $\theta$ offset shown in FIG. 29, i.e. the arc tangent of the quantity a3/a2 is subtracted in order to provide the desired output $\theta$2N. The area output derived from the logic block 926 is also combined with a1 and the magnitude of pt. 0-pt. 3 in the logic block 932 to provide a quantity identified as $\theta$1N'' and Y3 is combined with the magnitude of pt. 0-pt. 3 in logic block 934 to provide an output $\theta$1N', these two outputs being combined in the adder 936 to provide the desired output $\theta$1N. The values $\theta$1N' and $\theta$1N'' are shown in the drawing FIG. 32a from which it will be evident that the desired $\theta$1 is the sum of $\theta$1' and $\theta$1''.

Having thus determined the values for the three command signals for the major axes, i.e. $\theta$1, $\theta$2 and $\theta$4, it is then necessary to compute the new value for $\theta$3, i.e. $\theta$3N. In so doing, reference is made to FIGS. 33 to 37 and FIG. 33a, in which the triangle formed by pt.2'-pt.3-pt.5 is employed. In order to employ this triangle, the coordinates of pt.2'N must first be determined. This is done in the group of logic circuits circuits indicated generally at 938 in FIG. 33. Once these component coordinates for pt.2'N have been determined, the magnitude of the line between pt.2'N and pt.5N is determined by the logic block 940 (FIG. 34), by employing the X, Y and Z coordinates of pt. 5N, which are known, and the computed X, Y and Z components from logic block 938. The semiperimeter of the triangle formed by pt.2'N-pt.3N-pt.5N is then determined in logic block 942 (FIG. 35), the area of this triangle is determined by the logic block 944, as shown in FIG. 36, and finally the value for $\theta$3N then is determined in the logic block 946 (FIG. 37) by employing the area derived from logic block 944 and the components a2 and b.

Figure 38:
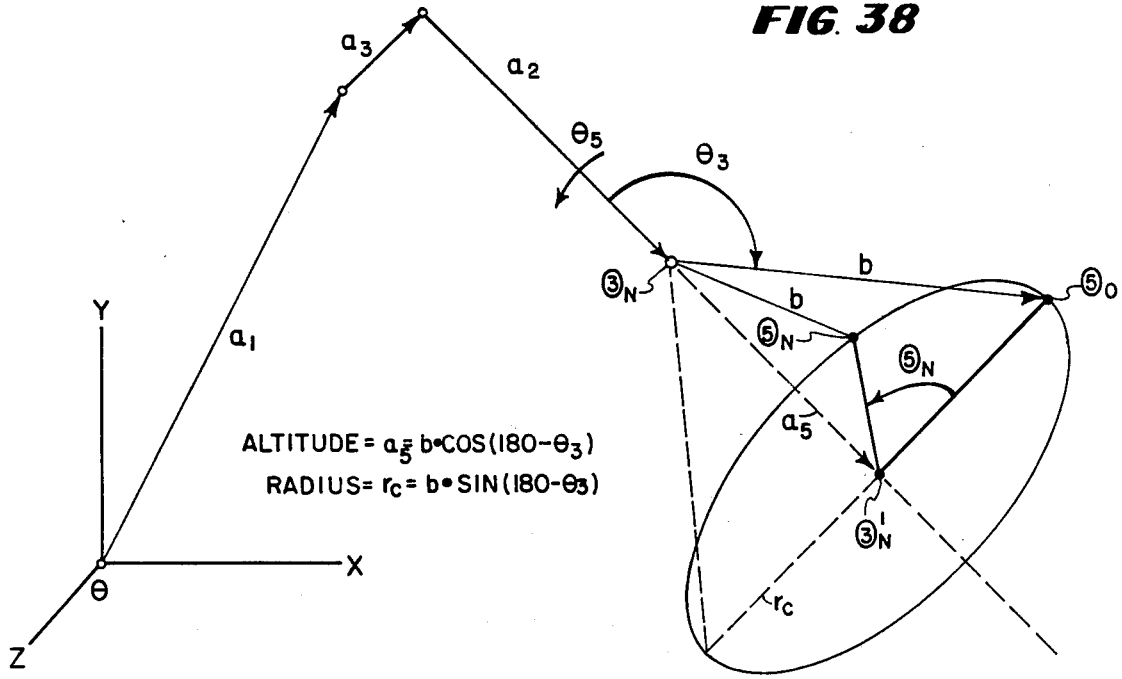
FIG. 38 is a simplified diagrammatic perspective representation similar to FIG. 29 but showing the manipulator arm in a different position, which is employed in describing the calculation of a new angular value for the fourth controlled axis of the manipulator.

Having now the values for $\theta$1N, $\theta$2N, $\theta$3N and $\theta$4N the new value for $\theta$5, i.e. $\theta$5N is now determined using these four previously calculated values. In order to make this determination it is assumed that pt. $5_o$ is the position of pt. 5 when $\theta$5=0, as shown in FIG. 38. Under these conditions, we must find the coordinates of pt. 3' which lies along the axis of element a2 with its relative direction being a function of the angle (180°−$\theta$3). The triangle formed by pt. 3', pt. $5_o$ and pt.5N can then be solved and the angle formed by pt.5N-pt.3'-pt.$5_o$ determined, which is the desired angle $\theta$5N. In FIG. 38 the element a5 is equal to pt.3N-pt.3'N and its X, Y and Z coordinates are formed by means of logic blocks 948, 949 and 950 shown in FIG. 39. The X, Y and Z coordinates of pt.3'N may then be determined by means of the logic blocks 951, 952 and 953 shown in FIG. 39b.

Figure 42:
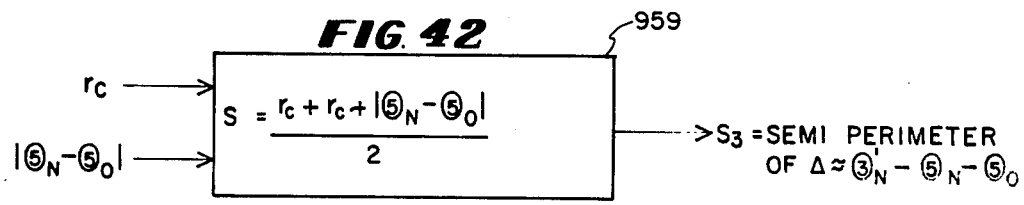
Figure 43:
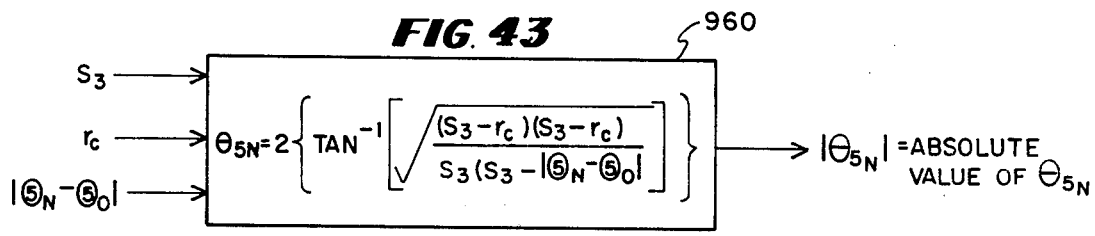
Figure 43A:
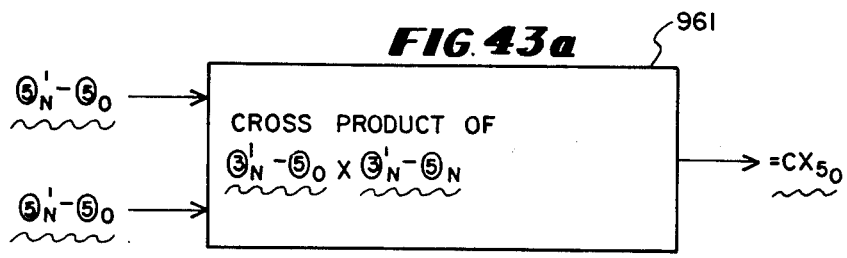
Figure 43B:
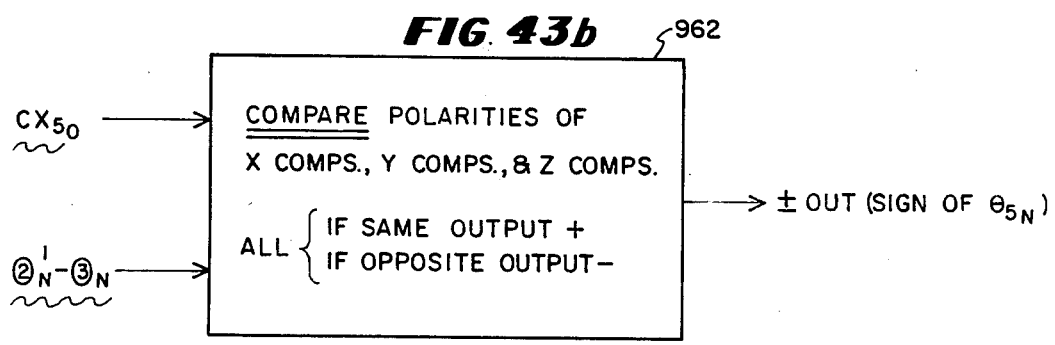

Having now the coordinates of pt.3'N, we can solve for the triangle pt.3'N, pt.5N and pt.$5_o$, the coordinates of pt. $5_o$ (which corresponds to pt. 5 with $\theta$5N=0) being determined by the logic blocks 954, 955 and 956 shown in FIG. 39c. The side formed by points pt. 5N and pt. $5_o$ is then found by means of the logic block 957 in FIG. 40. The radius of the base of the cone formed when $\theta$5 is varied, defined as $r_c$, is then determined from the logic block 958 in FIG. 41 and the two outputs of logic blocks 957 and 958 are employed as inputs to the logic block 959 to determine the semipermieter of triangle pt.3'N, pt.5N, pt.$5_o$, as shown in FIG. 42. The logic block 960 in FIG. 43 is then employed to determine the desired angle $\theta$5N. However, the output of logic block 960 does not tell whether $\theta$5N is plus or minus. The polarity of $\theta$5N is determined by first taking the cross product of vectors pt.3'N-pt.$5_o$ and pt.3'N-pt.5N, as shown by the logic block 961 in FIG. 43a, this cross product being defined as CX$5_o$. If the resultant direction is the same as vector pt.2'N-pt.3N then the sign is plus. If the resultant cross product is opposite of the vector pt.2'N-pt.3N the sign is minus, as determined by the logic block 962 in FIG. 43b. In this connection it should be pointed out that the second solution for $\theta$5N, when -$\theta$3N is used, will always yield a $\theta$5N2=$\theta$5N1−180°. The correct solution set for $\theta$3N and $\theta$5N is that set which requires minimum change for both $\theta$3 and $\theta$5.

Having now calculated $\theta$4N, $\theta$1N, $\theta$2N, $\theta$3N and $\theta$5N, we can now determine $\theta$6N. However, with regard to the solution for $\theta$5N, it is pointed out that if (180°−θ3) lies between ±.01°, as determined by the logic block 963 in FIG. 39a, which we shall define as zero, then θ5 is not solved for directly. The solution of θ6N will yield the assigned θ5N. The (180°−θ3)=0 case corresponds to the situation when element b is colinear with element a2 and the radius of the cone base approaches zero. For this case θ5 and θ6 define rotations about the same axis (element a2) and are effectively in phase, i.e. additive.

Figure 44:
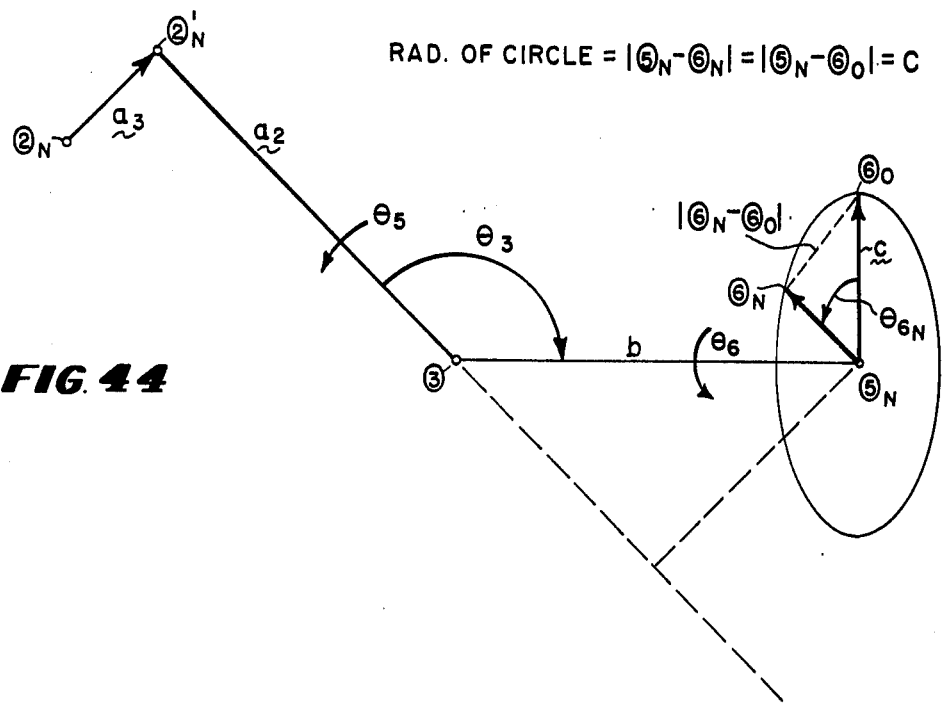
FIG. 44 is a simplified diagrammatic perspective representation similar to FIG. 29 but showing the manipulator arm in a different position, which is employed in describing the calculation of a new angular value for the fifth controlled axis of the manipulator.
Figure 45A:
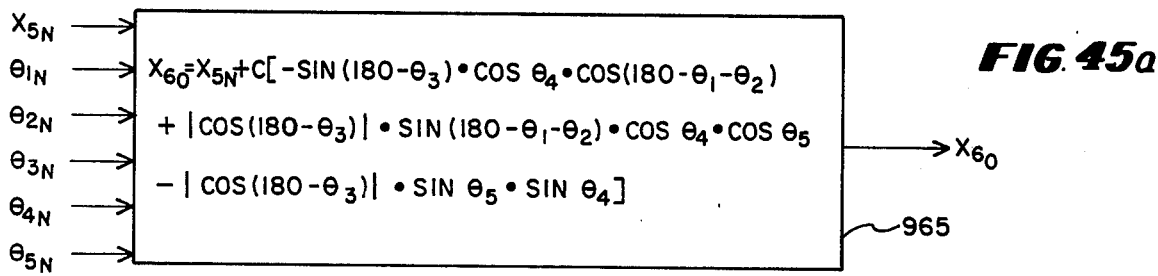
FIGS. 45a, 45b, 45c, 46, 47, 48, 48a, 48b, 49, 49a and 49b are logic block diagrams illustrating the manner in which a new angular value for said fifth axis is calculated.
Figure 45B:
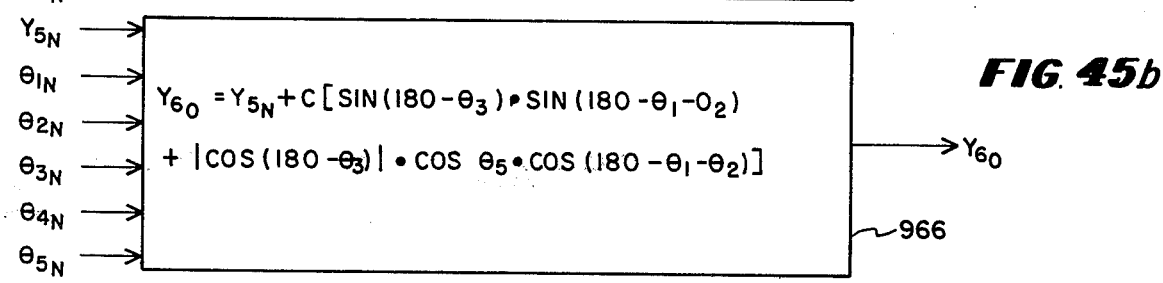
Figure 45C:
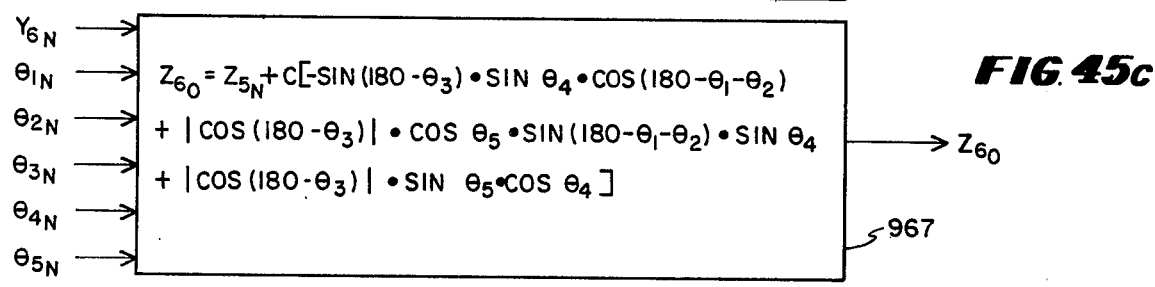
Figure 46:
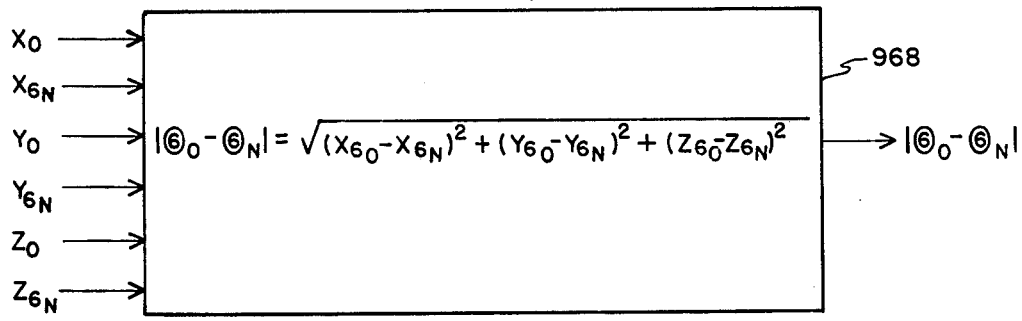
Figure 47:
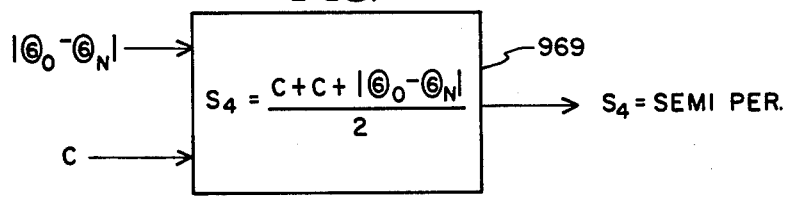

In order to determine θ6N reference is made to FIG. 44 wherein solution of the triangle formed by points pt.5N, pt.6₀ and pt.6N is indicated, the position of pt.6₀ occurring when a value of zero is assigned to θ6. If the logic block 963 shown in FIG. 39a indicates that (180°−θ3) is greater than ±.01° then θ6N is calculated by solving this triangle. Thus, assuming that logic block 963 gives a no answer, the coordinates of pt.6₀ are determined by employing the known coordinates of pt.5N to which are added the components of vector element c (with θ6=0), this summation being performed by the logic blocks 965, 966 and 967 shown in FIGS. 45a, 45b and 45c. The length of the triangle side pt.6₀-pt.6N is then determined by logic block 968 in FIG. 46. The semiperimeter of triangle pt.6N, pt.5N, pt.6₀ is then determined by logic block 969 in FIG. 47 and the magnitude of θ6N is then determined by logic block 970 in FIG. 48.

Figure 48:
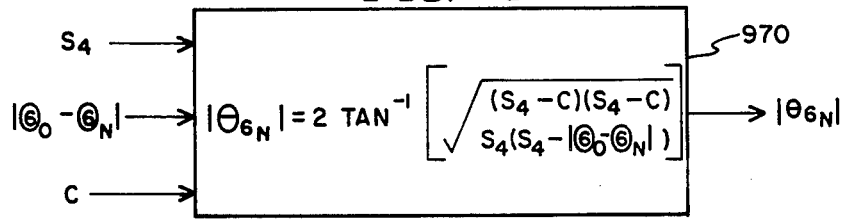
Figure 48A:
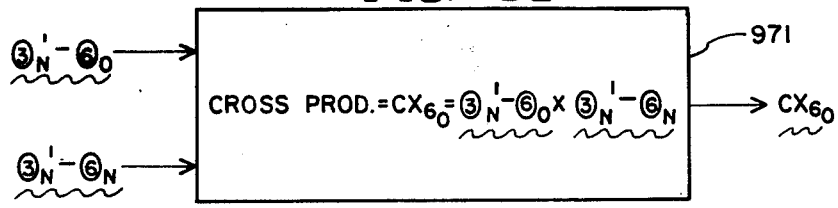
Figure 48B:
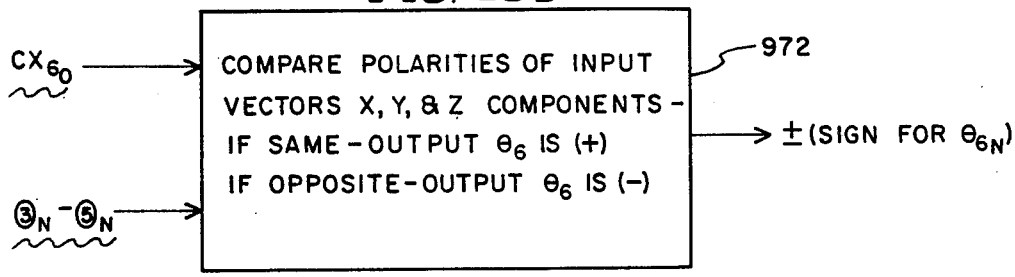
Figure 49:
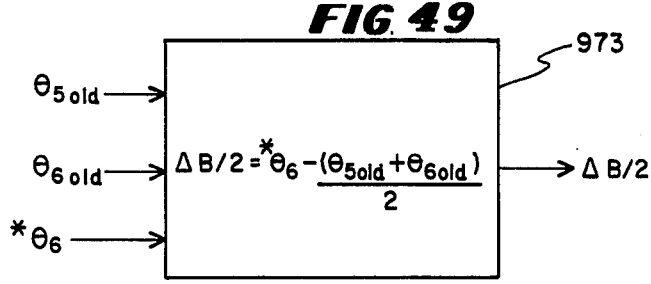
Figure 49A:
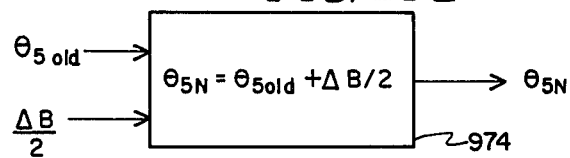
Figure 49B:
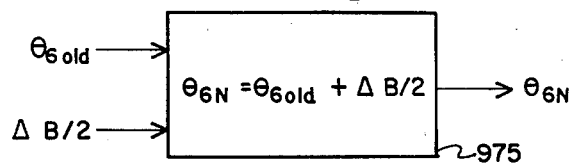
Figure 52:
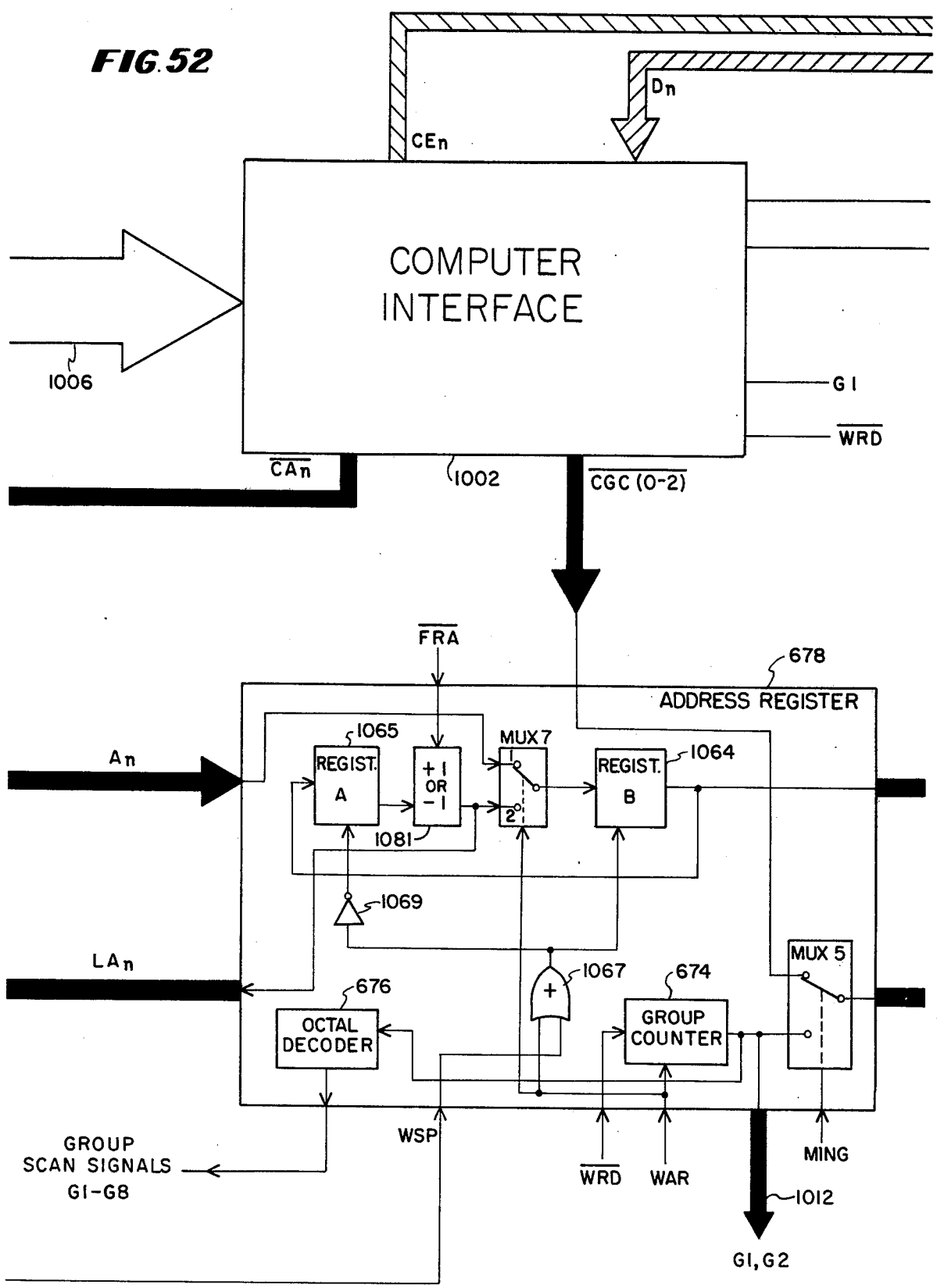
Figure 53:
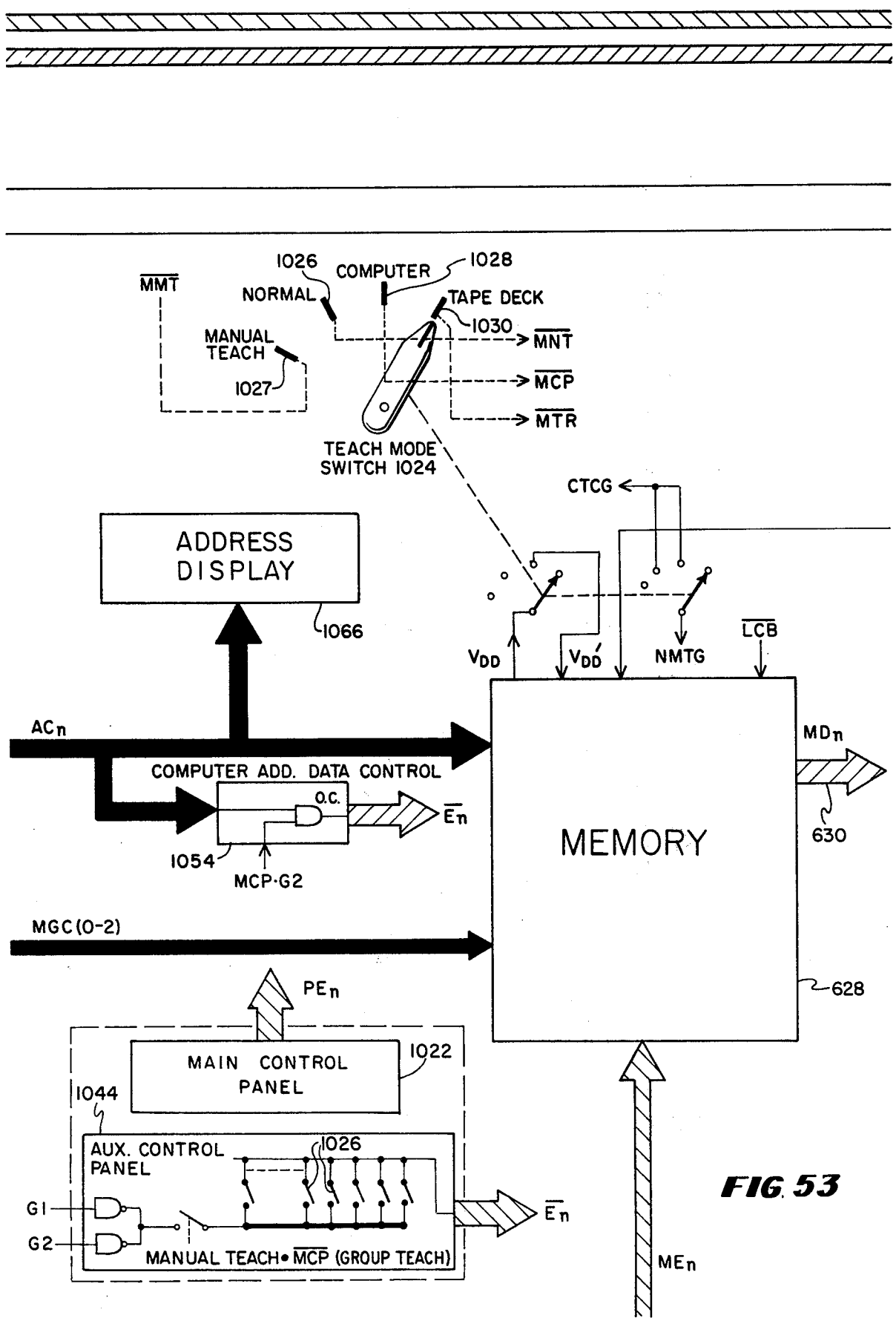
Figure 54:
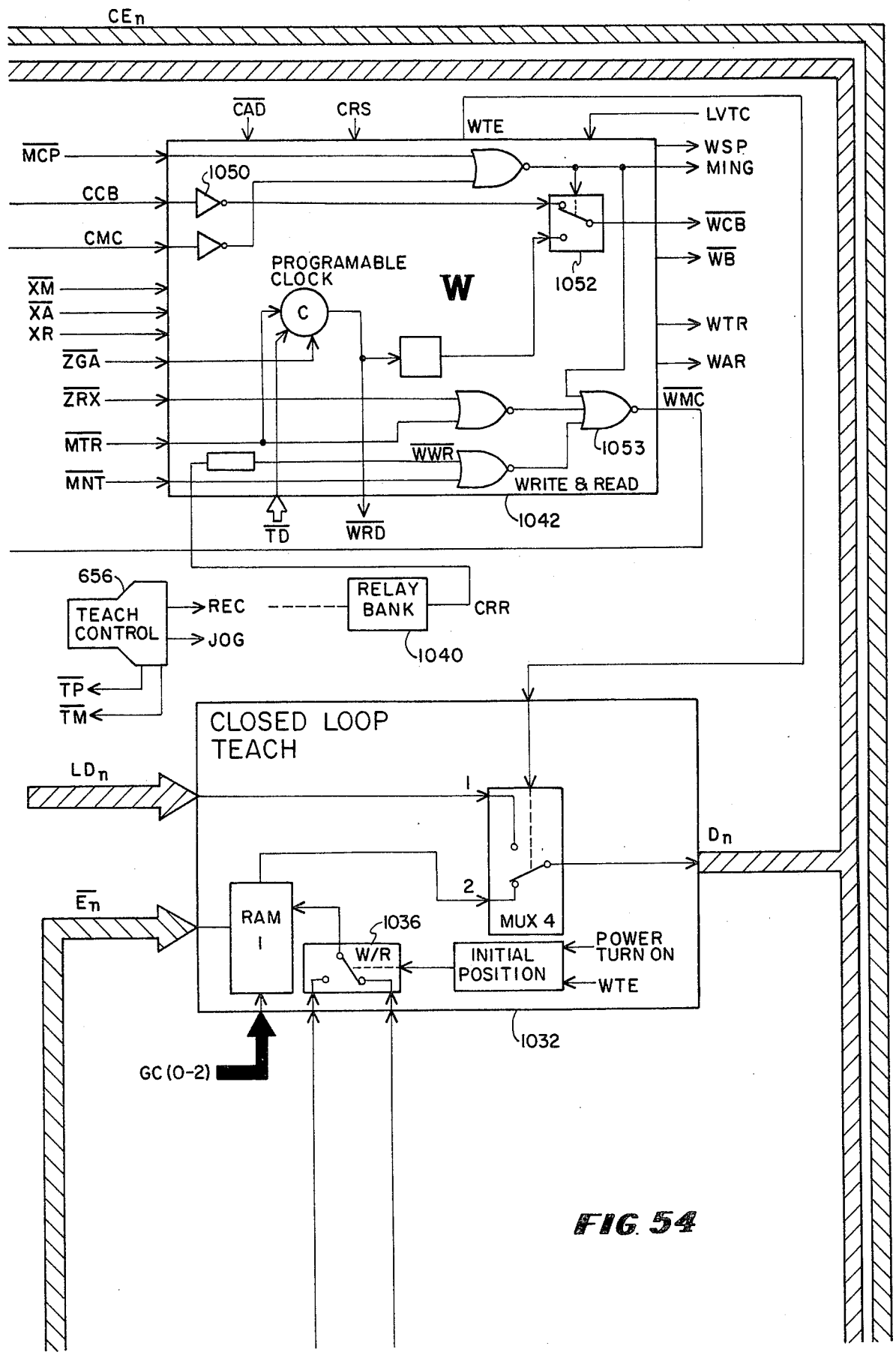
Figure 55:
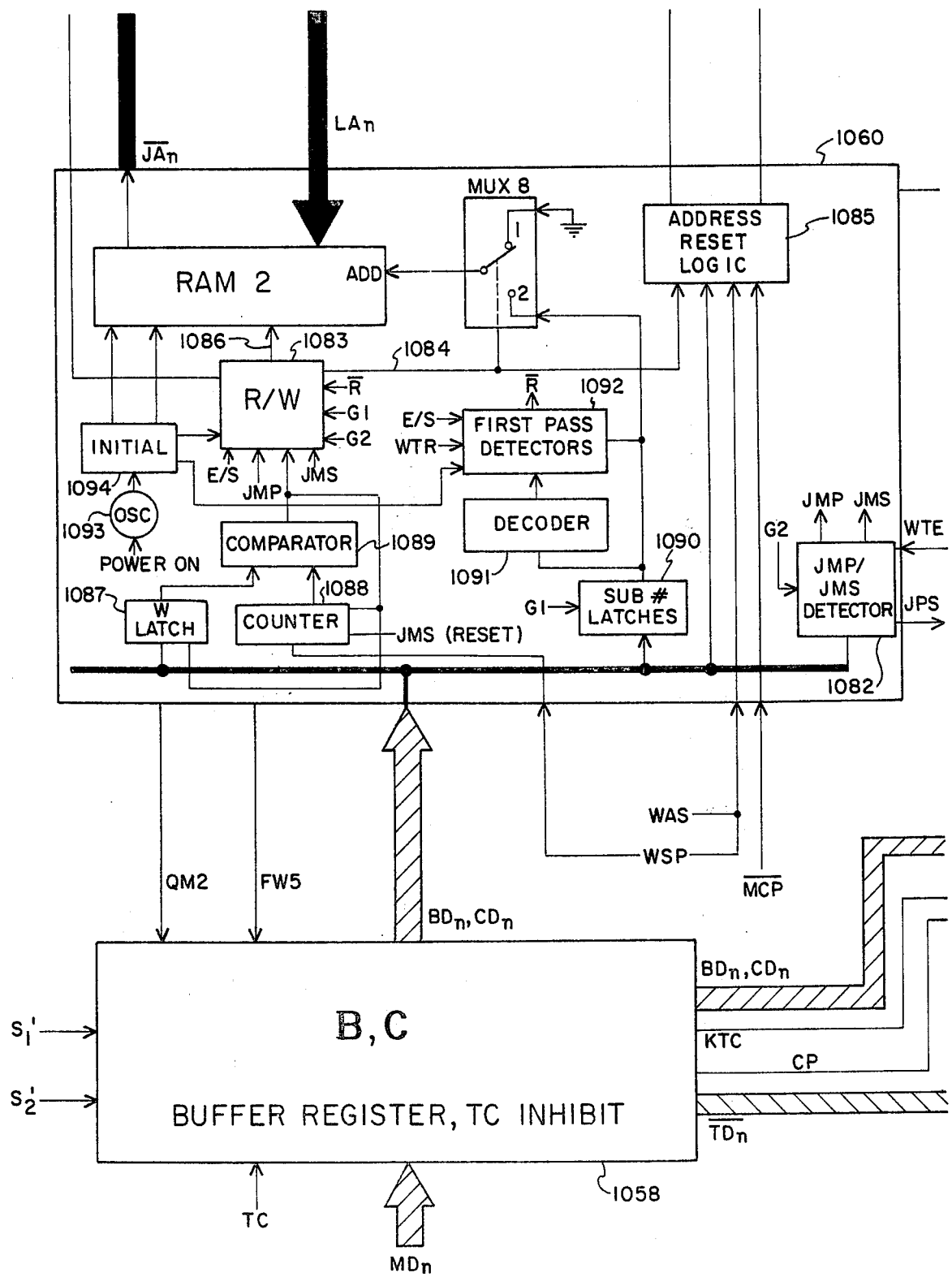
Figure 56:
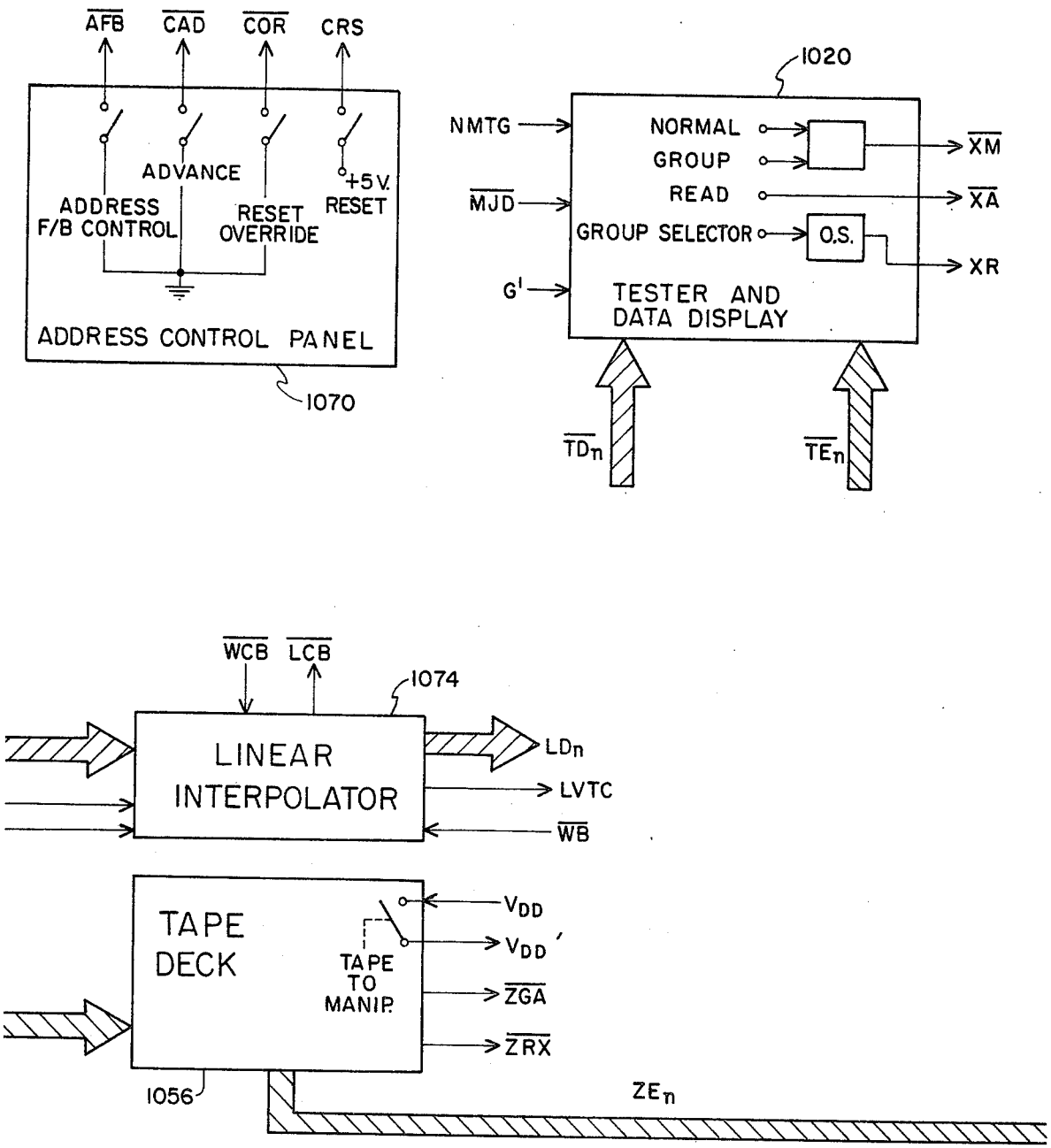
Figure 57:
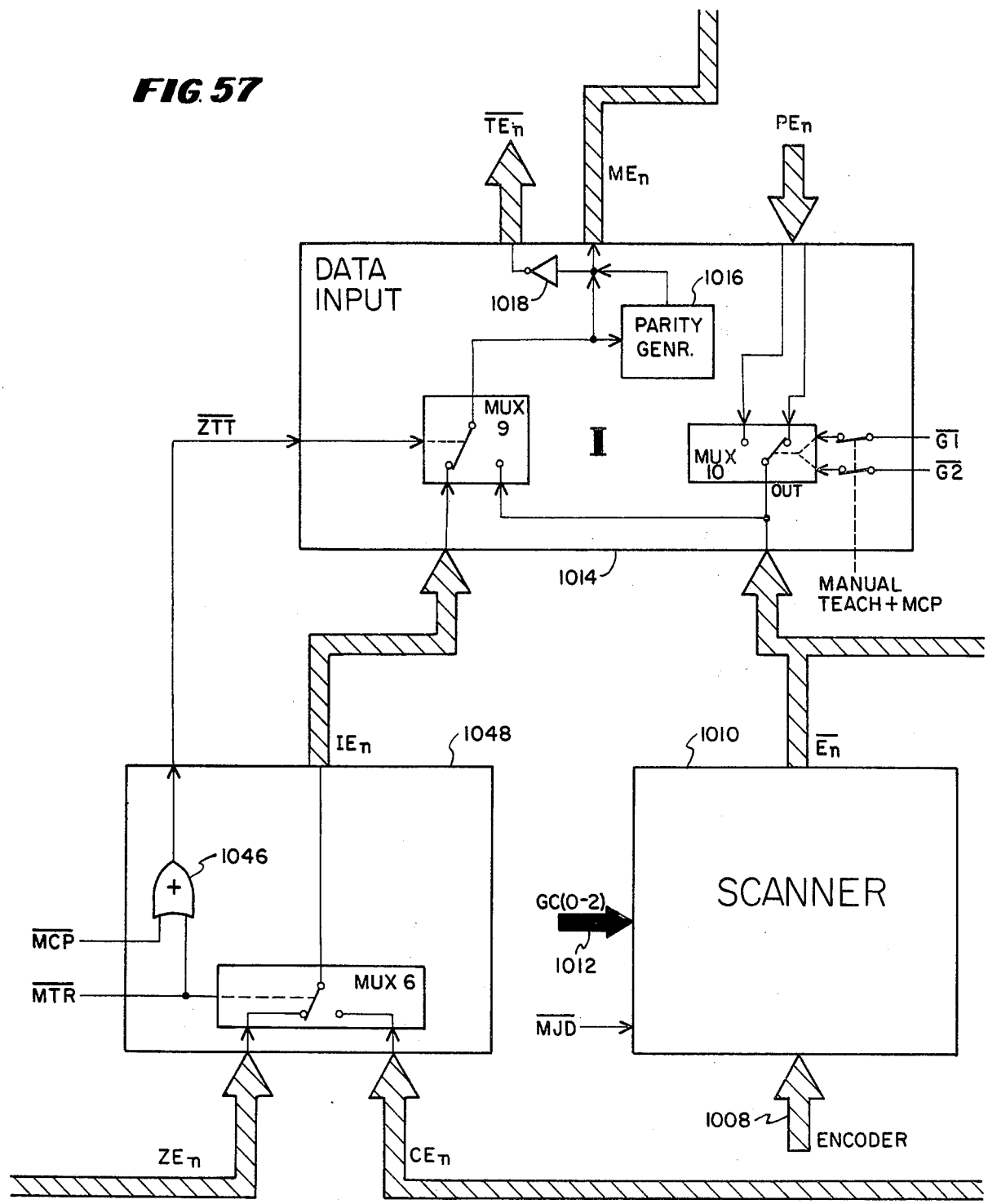

In order to determine the proper sign for θ6N, the cross product of vectors pt.5N-pt.6₀ and pt.5N-pt.6n is obtained by logic block 971 in FIG. 48a and the direction of resultant CX6₀ is compared with vector pt.3N-pt.5N in logic block 972 in FIG. 48b.

Figure 39:
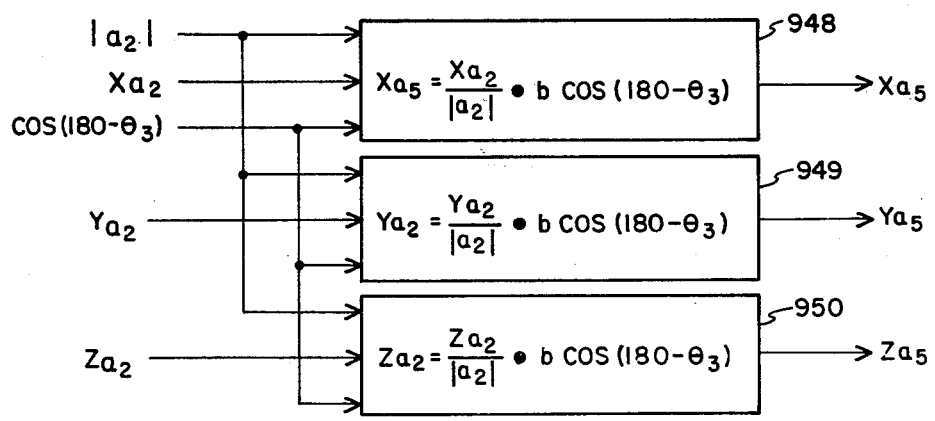
FIGS. 39, 39a, 39b, 39c, 40, 41, 42, 43, 43a and 43b are logic block diagrams illustrating the manner in which a new angular value for said fourth axis is calculated.
Figure 39A:
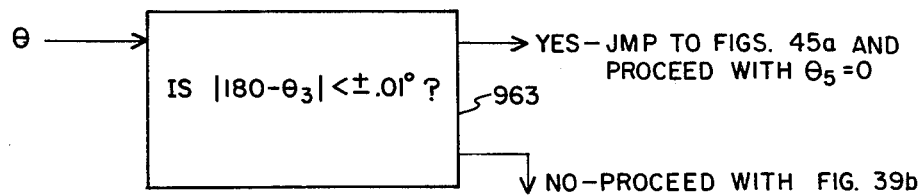
Figure 39B:
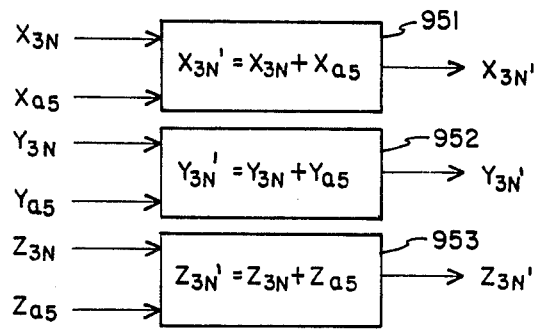
Figure 39C:
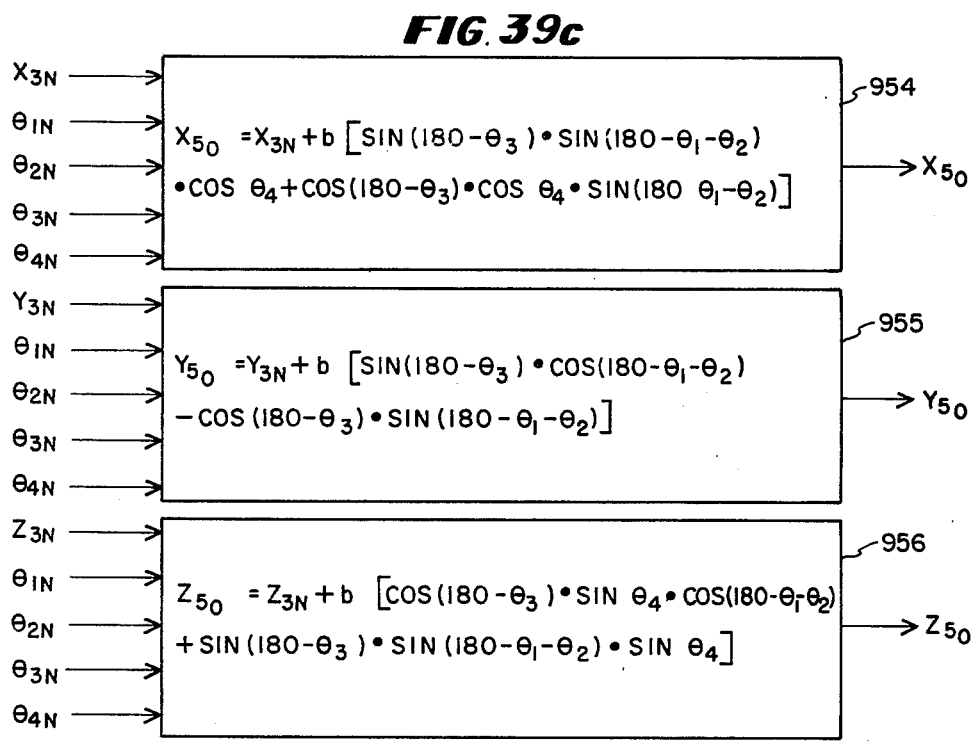
Figure 40:
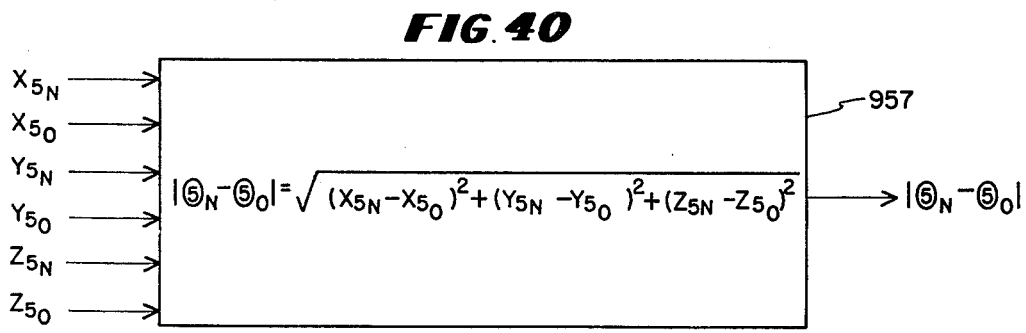
Figure 41:
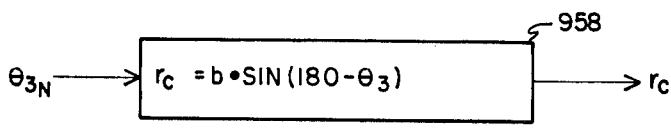

In the special case where θ3 is less than ±.01° (FIG. 39a) the elements a2 and b are substantially colinear and rotation of either θ5 or θ6 results in rotation about the element a2. Under these circumstances, the calculations for θ5N are omitted and θ6N is calculated starting with FIG. 45a and setting θ5=0 in all equations. While the θ6N value calculated in this manner could be used as the new θ6 value without regard to θ5, in order to distribute the total required motion between θ5 and θ6, the following steps are taken. After FIGS. 45a to 48b, inclusive, are completed with θ5=0 the computed value of θ6N, identified as *θ6 is supplied to logic block 973 (FIG. 49) together with the old values of θ5 and θ6. In this logic block the computer increment of movement in θ6 is obtained, identified as ΔB, and is divided by two. The ΔB/2 value is then added to the old θ5 and θ6 values in logic blocks 974 and 975 to obtain the desired θ5N and θ6N values. It is emphasized that logic blocks 973, 974 and 975 are used only in the special case where (180°−θ3) is less than ±.01° (FIG. 39a).

While the above described inverse transformation from Cartesian coordinates to the six desired polar coordinates for the new position to which the manipulator arm is to be moved along the axis 904 may seem quite complex it is substantially simpler than the computations required if the general approach employing six equations each involving six unknowns is employed. This relatively simple inverse transformation is made possible only because one always knows the correct coordinates of pt. 3. This constrains the problem to three equations with three unknowns (θ4, θ1 and θ2) which can readily be solved. Once θ1, θ2 and θ4 have been determined then one is once again dealing with three equations with three unknowns which can readily be solved. It is estimated that the time required for the computer to make the necessary calculations for the above relatively simple inverse transformation is approximately one-tenth to one-twentieth of the time required for the more general approach. It is also important to understand that if desired the steps ΔS along the axis 904 may be relatively short, i.e. in the order of 0.2 inch to 0.4 inch so that the resultant errors in the trajectory can be kept extremely small. It is estimated that for a ΔS of 0.2 inch an error of less than 0.005 inch is experienced when these two points along the axis 904 are also programmed for playback in the velocity mode in which the linear interpolation arrangement described in detail heretofore in connection with FIG. 25 is employed.

As discussed generally heretofore, it is also possible to expand the above described inverse transformation arrangement to computations involving the rotation about pt. 5, as shown in FIG. 50. Referring to this figure, there is shown a programmed rotation about the axis defined by member c. For this case pt. 5 and pt. 6 remain stationary with only pt. 3 moving along the circular dotted path 980. One can readily program the trajectory 980 of the manipulator arm for sequential small changes in angle alpha, which angle is defined as equal to zero at the start position. Such a trajectory may be employed in the assembly of parts where rotary motion about an axis is required, such as the threading of one part into another, etc.

In FIG. 50, the net change in pt. 3 consists of the sum of the vectors pt.3-pt.7 and pt.7-pt.8. However, it will be noted that the vector pt.3-pt.7 is on the b axis and has a magnitude equal to b minus b cos alpha. Its respective components are given by the following equations:

$$\Delta Xb = \frac{X5 - X3}{b} \cdot (b - b \cdot \cos \alpha) \qquad (32)$$

$$\Delta Yb = \frac{Y5 - Y3}{b} \cdot (b - b \cdot \cos \alpha) \qquad (33)$$

$$\Delta Zb = \frac{Z5 - Z3}{b} \cdot (b - b \cdot \cos \alpha) \qquad (34)$$

Vector pt.7-pt.8 is in a direction defined by minus (b×c), this direction being normal to the plane of vectors b and c. In the example of FIG. 50, the magnitude of vector pt.7-pt.8 is equal to (b×sin alpha). Its respective components are given by the following equations:

$$\Delta Xs = -Sx \cdot (b \cdot \sin \alpha) \qquad (35)$$

$$\Delta Yx = -Sy \cdot (b \cdot \sin \alpha) \qquad (36)$$

$$\Delta Zs = -Sz \cdot (b \cdot \sin \alpha) \qquad (37)$$

where,
Sx is direction cosine of sweep axis re: x axis;
Sy is direction cosine of sweep axis re: y axis;
Sz is direction cosine of sweep axis re: z axis.

From these equations we can calculate pt.3N for rotation around the element c in FIG. 50 from the following equations:

$$X_{3N} = X3 + \Delta Xb + \Delta Xs \qquad (38)$$

$$Y_{3N} = Y3 + \Delta Yb + \Delta Ys \qquad (39)$$

$$Z_{3N} = Z3 + \Delta Zb + \Delta Zs \qquad (40)$$

Since pts. 5 and 6 remain stationary, we now have Cartesian coordinates for pt.3N, pt.5N and pt.6N and may proceed as before with the inverse transformation described in connection with FIGS. 31-49, inclusive, to determine the new $\theta 1-\theta 6$ values.

As discussed generally heretofore, the above described teach-assist computer program mode is employed to perform the precise motions associated with assembly of parts at various angles and oblique planes. Accordingly, the teaching operator is relieved of the virtually impossible task of coordinating the six angular motions which define a precise trajectory of the manipulator hand in space. In accordance with a further aspect of the invention, the computer associated with the manipulator apparatus is arranged through appropriate interfacing with the control circuitry of the manipulator so that once the $\theta 1N-\theta 6N$ values have been computed in the manner described in detail heretofore, they may, after appropriate transformation in accordance with equations (7) to (12) and conversion from angular to digital information, be recorded in the memory of the manipulator apparatus where they will function as command signals for all six controlled axes during the playback mode of operation of the manipulator. The manner in which such a computer may be interfaced with a manipulator apparatus is shown in FIGS. 51-58, inclusive, these figures being arranged in the manner shown in FIG. 58A. Referring to these figures, a computer indicated generally at 1000 is coupled to the circuitry of the manipulator console, such as the manipulator 50, through suitable computer interface connections indicated generally at 1002, the circuitry of the manipulator console being shown in FIGS. 51-58 in the form of main blocks which in many instances comprise individual printed circuit boards making up a particular portion of the manipulator circuitry. In those instances where the particular block corresponds generally with that described in detail heretofore in connection with FIGS. 21-25, similar reference numerals have been employed. The computer 1000 is preferably a Data General 32K bit core storage computer Model Nova 2/10 and is provided with a Teletype unit (TTY), indicated generally at 1004 by means of which the teaching operator may employ the computer 1000 as a teach-assist facility during the initial teaching operation and record the computed program steps in the memory 628 of the manipulator. The coupling between the computer 1000 and the computer interface 1002 is indicated generally by the interconnecting wiring 1006. Preferably the interface 1002 is incorporated into the computer 1000 so that the computer and interface may simply be plugged into a manipulator apparatus, such as one of the manipulators 50, 52 to assist in teaching that particular manipulator. The computer 1000 and interface 1002 may also be arranged to service both of the manipulators 50, 52 on an alternate basis, by appropriate switching when the operator indicates which manipulator is to use the computer for the next teach-assist operation.

Considering now the main components of the manipulator circuitry, the signals from the six encoders, indicated generally at 1008 (FIG. 57) are applied to a scanner board 1010 which is also supplied with the three outputs from the group counter 674 (FIG. 52) which are indicated generally at 1012 and correspond to the $2^0$, $2^1$, and $2^2$ inputs shown in FIG. 23. The scanner 1010 develops a suitably multiplexed output in binary code which is indicated by the symbol $\overline{En}$ and is supplied to the comparator 626.

When the encoder data is to be recorded in the memory 628 as a command signal, i.e. during a teaching operation, the $\overline{En}$ data is supplied through MUX9 on the I board 1014 to the memory 628 over the conductors identified as MEn. In this connection, it is noted that the term MUX is employed in FIGS. 51-58 to denote a multiplexer in the form of an integrated circuit which contains a multiplicity of circuits for switching one output between two or more inputs under the control of one or more control wires. This multiplicity of circuits is indicated generally as a single pole double throw switch and the control therefore indicated by a dotted line.

The binary coded data from each encoder comprise a fifteen bit word and a parity generator 1016 is provided on the I board 1014 to add a sixteenth parity bit so that the data supplied to the memory 628 is a sixteen bit word as supplied over the conductors MEn. The encoder data may also be inverted in the inverter 1018 and supplied over the conductors $\overline{TEn}$ to a tester and data display unit 1020. In addition, data from the main control panel 1022 may be supplied to MUX 10 on the I board 1014 where it may be added to the encoder data during the G1, G2 multiplex periods assigned to auxiliary control signals.

A teach mode switch 1024 is provided on the manipulator console which has a normal teach position 1026, identified as $\overline{MNT}$, a manual teach position 1027 identified as $\overline{MMT}$, a computer assist position 1028, identified as $\overline{MCP}$, and a tape deck position 1030 identified as $\overline{MTR}$. When the switch 1024 is in either the position 1027 or 1028, MUX 10 is effective to supply auxiliary information from the main control panel 1022 to the memory 628 by way of MUX 9.

Considering first the operation of the manipulator apparatus during a normal teach operation with the switch 1024 in position 1026, when power is first applied to the manipulator, and whenever the teach-repeat switch is turned from repeat to teach, the position data from the encoders $\overline{En}$ is immediately supplied to a random access memory identified as RAM1 on the closed loop teach board 1032. During this teach mode MUX 4 is switched to the RAM1 output. When power is initially turned on or when the teach-repeat switch is thrown to the teach position ($\overline{WTE}$), the write/read control circuit 1036 controls RAM1 so that the encoder data En is stored in RAM1.

The data stored in RAM1 is identified as Dn which is supplied as one input to the subtractor 1038 in the comparator 626, the other input being the encoder data $\overline{En}$. The comparator thus compares the output of RAM1 with the encoder data $\overline{En}$ and generates the position error identified as EER, i.e., the output of the digital-to-analog converter 640. A closed loop teach system is thus provided which functions to maintain the initial encoder position and prevents drift in all axes, as described in detail heretofore in connection with FIGS. 22, 23 and 24. The P, M direction signals from the comparator 626 function as in repeat for all axes. However, when a teach control direction button for one motion is depressed, such as one of the direction buttons 658, 660 for the rotary axis, a teach direction signal $\overline{TP}$ or $\overline{TN}$ is generated and the P, M signals are inhibited. Accordingly, the selected motion follows the teach control command, but the other motions remain locked on the initial position data stored in RAM1.

The teach direction signals also force RAM1 into the write mode during the selected group period, such as G3 assigned to the rotary axis, so that this scratch pad memory is updated. Hence, when the teach direction button is released, the selected motion locks onto its new position, as described in detail heretofore. When the record button is pushed the outputs of the encoders and the command bits from the main control panel 1022 are written into the memory 628 by way of the I board 1014, as described above. This teach recording process is substantially the same as in a conventional manipulator apparatus. However, when the record button is pressed, a relay bank 1040 is energzed to provide the record signal identified as CRR and this signal is synchronized on the W board 1042 with the system clock. In this way, the memory initiate signal $\overline{WCB}$, the memory mode signal $\overline{WMC}$, the address step signal WSP, and the memory power VDD are generated by the same circuits for all modes of operation.

When the switch 1024 is in the manual teach position 1027, a group teach control mode is also possible. In this position, a built in tester 1020 is used to control the teaching operation. Pushing the group button ($\overline{XM}$ low) causes the prime latch in the W board 1042 to reset synchronously which blocks the system clock. At this point, the group mode operation is the same as in a conventional manipulator for group selection, group read and group record. An auxiliary control panel 1044 includes a series of fifteen switches 1026 which can be used manually to set up any of the command bits required in the G1 and G2 multiplex periods. The auxiliary control panel is employed primarily for manual programming of instructions for jumping from one portion of a program to the other, as will be described in detail hereinafter. Such manual control switches are required since the computer 1000 is employed to teach jump instructions through its control unit 1004 as will be described in detail hereinafter. The fifteen switches 1026 control the fifteen bits in each group and are manually programmed in the group code. The outputs of these switches are OR gated to the output $\overline{En}$ of the scanner 1010 and are supplied to the memory 628 in the manner described in detail heretofore.

As described generally heretofore, the computer 1000 may be employed as a teach-assist facility and responds to input data supplied from the manipulator console by performing calculations on this input data and providing output data which may be stored in the manipulator memory 628. Such teach-assist operation is provided when the teach mode switch 1024 is in the computer position 1028. In this position, there are two aspects to consider. The first is the computer to manipulator mode wherein data developed in the computer is supplied to the memory 628, and a manipulator to computer mode in which instructional data is supplied to the computer 1000. Considering first the computer to manipulator mode, during this mode of operation, the computer 1000 assumes complete control of the manipulator main memory 628 by way of the computer interface 1002. More particularly, interface 1002 first sends the desired address identified as CAn to MUX1 in the address control unit 680. The signal identified as MING controls MUX1 and is active for the computer to manipulator mode. Thus, the desired address is supplied from MUX1 as an address input An to the address register 678. The MING signal also switches MUX 5 to position 2 so that the group portion (3 lower LSD's) of the memory address is controlled by the computer output identified as CGC (0–2), the output of MUX 5 being identified as MGC (0–2). With this arrangement, selection of any particular group at a particular address in the memory 628 is placed under the control of the computer 1000.

The MING signal is also effective through the OR-gate circuit 1046 on the data selector board 1048 to control MUX 9 on the I board 1014 by way of the $\overline{ZTT}$ output from the OR-gate 1046. With this arrangement, when the computer 1000 has completed its calculation of a set of encoder values $\theta1$-$\theta6$, in the manner described in detail heretofore, and this set of computer developed signals is to be recorded in the memory as command signals to be used on playback, the computer calculated data is supplied by way of the interface 1002 and the wiring identified as CEn to MUX 6 on the data selector board 1048. The output from the data selector board 1048, identified as IEn, is then supplied to the other input of MUX 9 on the I board 1014 and from there to the memory 628.

During the computer to manipulator mode of teaching, the system clock is operating and the system loop is closed around RAM1. Hence the manipulator position does not drift while the computer is performing the above calculations and the computed theta values for each axis are being recorded in the memory 628. Also, in the computer to manipulator mode, the W board generated memory initiate signal WCB and the memory mode signal WMC are replaced by the computer interface equivalents CCB and CMC, respectively. Accordingly, no synchronization problem is experienced in introducing the computer calculated data into the memory 628. More particularly, during the computer to manipulator teaching mode, the CCB signal is supplied through the inverter 1050 to the multiplexer 1052 which is controlled by the MING signal so that during this mode of teaching the CCB signal is substituted for the $\overline{WCB}$ signal. Also, the MING signal is supplied through the OR-gate 1053 as the $\overline{WMC}$ signal.

It will be noted that each group of data for a particular axis consists of fifteen bits of information which are transmitted in parallel as a single word, its address having been previously selected by means of the lines CAn and CGC (0–2). These data groups are sent on lines CEn serially starting with command groups 1 and 2 and then sequentially through position groups G3–G8. Since the total address is set up prior to transmitting data, any one data group corresponding to a particular axis may be sent to the memory if desired.

When the switch 1024 is in the position 1028, there may also be established a manipulator to computer mode of operation in which there is no communication between the computer 1000 and the main manipulator memory 628. In this mode of operation, transmission of data from the scratch pad memory RAM1 is employed in the manner described above to maintain a closed loop teach system so that the manipulator position will not drift. Since the system clock is running during this mode of operation, the computer interface circuits must be synchronized to this clock frequency. To this end, WRD (system clock) and G1 (first group pulse) are sent to the interface 1002.

During the manipulator to computer teaching mode, the auxiliary control signals (G1 and G2) are not transmitted to the computer and only the position signals from the encoders (G3–G8) are transmitted to the computer 1000. In this mode of operation, the G1 period is used for synchronization, the G2 period is used to send the present program step address to the computer so that the computer knows where to send the calculated results for this teaching step.

In the manipulator to computer teaching mode of operation, the step address is taken from the address register output by gating the output with the MCP and G2 signals, as indicated generally by the block 1054, the output of this gating system being connected through wired OR-gates (not shown) with the RAM1 input $\overline{En}$. This step address is thus supplied to MUX 4 and over the conductors Dn to computer interface 1002 and thence to the computer 1000. Since the teach repeat switch 1024 is in teach during this mode of operation, MUX 4 is in position 2 and the RAM1 output is also available on lines Dn. These lines are also used as the data input to the computer interface 1002 for positional data representing the present position of the manipulator arm at that time.

When the teach mode switch 1024 is moved to the position 1030, a tape deck 1056 is employed to supply tape recorded positional and control signals, identified as ZEn to MUX 6 on the data selector board 1048. The $\overline{MTR}$ signal produced when the switch 1024 is in the position 1030 controls MUX 6 so that this tape recorded data is supplied through MUX 9 to the memory 628. With such an arrangement, the tape deck 1056 may be employed to record into the memory of a manipulator apparatus directly instead of manually teaching that manipulator apparatus, for example, in those instances, when a series of manipulators are to perform identical tasks during successive playback cycles. The tape deck 1056 receives input information which is initially supplied from the memory output conductors MDn and has been stored in the buffer registers 1058, this information then being supplied over the lines indicated at $\overline{TDn}$ to the tape deck 1056. Accordingly, after a program has been recorded in the memory 628, it may be recorded in the tape deck 1056 during a playback cycle, the input data being supplied over the lines $\overline{TDn}$. Once the program is recorded in the tape deck 1056, it may be employed to control another manipulator apparatus in the manner described above.

When the teach mode switch 1024 is in the tape deck position 1030, the manipulator system clock is stopped and the unit 1056 controls the flow of data in and out of the main memory 628.

Considering now the operation of the manipulator console control circuitry shown in FIGS. 51-58 during the repeat or playback mode of operation, it is first pointed out that the computer 1000 is not employed during playback. Accordingly, the console circuitry shown in these figures functions in a manner generally similar to that described in detail heretofore in the above-identified patents. However, it is pointed out that by means of the circuits on the sequence control board 1060 three different types of address-jump modes, identified as JMP, JMP-R and JMS are provided. In the JMP mode, the manipulator simply jumps to a new address and continues sequentially in steps from this new address. In the JMP-R mode the manipulator jumps to a new address and continues from this new address until a unique "End of sub-routine" bit (End-/Sub.) is detected and then returns to the original program. In the JMS mode, the manipulator jumps to a new address, steps a fixed programmed number of steps n and then returns to the original (N+1) program step.

Before considering the address-jump modes, the operation of the system in the repeat mode during a straightforward program without jumps will be described. The starting address of the program is set by the program selector 1062 and subsequen addresses are sequential in response to the program step change signal WSP. The output of the register 1064 is supplied to a register 1065 and the output of the register 1065 is supplied to a +1 or −1 step adder 1081. Accordingly, if the register 1064 is on step N, the N+1 step appears at the output of the adder 1081. Each time a WSP signal appears the register 1064 is advanced one step, through the OR-gate 1067, but the register 1065 is not advanced due to the inverter 1069. After the WSP signal disappears, the register 1065 is enabled and is advanced to the setting of register 1064. Whenever a non-sequential address is to be placed into the address register 678, a WAR signal is generated which controls the registers 1064 and 1065 through the OR-gate 1067 and also controls MUX 7 so that register 1064 is no longer controlled by the output of adder 1081 but instead is controlled by external address data An. Accordingly, the WAR signal presets the register 1064 by means of the input address lines An through MUX 1 and MUX 2, as determined by the program selector 1062. The output lines ACn of the address register 678 control address of the memory 628, except for the three lowest binary digits which are controlled by the group counter outputs GC (0-2). If desired, the address register outputs ACn may be changed to binary coded decimal by a ROM code converter whose output drives an address display 1066. An advance button 1068 on an address control panel 1070 is employed to step the address register either forward or backward depending on the setting of the step direction switch 1072. Rapid stepping in either direction is obtained by holding the advance button 1068 down.

During playback, command signal output data MDn from the main memory 628 is first supplied to the buffer registers 1058 which provide proper fanout to other circuits. In the buffer registers 1058, the MDn data is latched up during G1 and G2 and decoded to generate the auxiliary control signal bits. The remaining memory data MDn is also buffered in the registers 1058 and supplied as SDn data to the sequence control board 1060. This data is also connected to the data display unit on the front panel and to the built-in tester 1020. The TDn data is also brought out to the tape deck unit 1056 as described in detail heretofore. The buffered data BDn and CDn is also supplied to the linear interpolator 1074. The linear interpolator 1074 may be substantially as described in detail heretofore in connection with FIG. 25 and supplies data over the lines LDn to the closed loop teach board 1032. In the repeat mode of operation, MUX 4 is in position 1 and hence the LDn data is supplied over the lines Dn to the comparator 626. In the point-to-point mode of playback operation, the buffered BDn and CDn data immerges from the linear interpolator as LDn data without change, as described in detail heretofore in connection with FIG. 25. During the velocity mode of operation, identified as CP, the data signals BDn and CDn are modified by the interpolation unit to provide the above described artificial incremental command signals which are supplied as LDn data to the comparator 626. In the comparator 626, the Dn data is compared with the encoder data $\overline{En}$ to obtain the position error signal EER and the direction signals P and M, as described in detail heretofore.

During the repeat mode of operation, the auxiliary control signals are latched up in the buffer registers 1058 during the intervals S1' and S2' which correspond to the latter portions of the G1 and G2 intervals. These control signals are shown in diagrammatic form in FIGS. 62 and 63 and may be programmed either by setting the switches on the main control panel 1022, or by the computer 1000 during a computer assisted teaching operation. Referring to these figures and considering first the point-to-point mode PTP, bits 1 and 2 in the G1 period are employed to program Accuracy 2 and Accuracy 3 signals, as described in detail in said Dunne et al U.S. Pat. No. 3,661,051. Bit 3 of G1 programs a slow teaching speed in all axes; bit 4 is the end of program bits; bits 5 to 9 are OX signals; bits 12 and 15 are WX signals and bits 13 and 14 are clamp control signals. Bits 10 and 11 of G1 are employed to control what mode, i.e. PTP, CP (velocity mode), JMS or JMP, the manipulator is to operate in for a particular program step. In the G2 period, bits 1 to 9 are blank for the PTP mode; bit 10 is another OX signal; bit 11 is a time delay signal indicating that the next program step should be selected after a predetermined time delay and bits 12 to 15 are additional WX signals.

In the CP or velocity mode, bits 1 to 3 of the G1 period control programming of the counter 742 which determines the number of interpolation intervals between two program steps, as described in detail heretofore. Specifically, when bits 1 to 3 are 000, the counter 742 is controlled to provide sixteen interpolation intervals; when bits 1 to 3 are 001 thirty-two interpolation intervals are provided; etc. up to 256 such intervals. Bit 4 is an end of program signal in the CP mode; bits 5 to 15 are similar to the PTP mode described above. In the G2 period, bits 1 to 6 are employed to control programming of the counter 672 which determines the duration of each multiplex period. Specifically, bits 1 to 6 of G2 control the counter 672 so that it counts from a minimum of 64 to a maximum of 127, as described heretofore. Bits 7 to 9 of G2 are employed to control the number of divider stages employed in the divider 744. When bits 7 to 9 are 000 the divider 744 divides by $2^4$ and when these bits are 100 the divider 744 divides by $2^8$. The remaining bits 10 to 15 are similar to the PTP mode described above.

In the JMS mode, bits 1 to 9 and 12 give the starting address of the subroutine list, bits 10 and 11 designate the JMS mode of operation, and bits 13 to 15 designate the subroutine number (#) which can be from 1 to 7 if up to seven pallets are simultaneously employed during one assembly operation. Bits 1 to 3 of G2 in the JMS mode designate the number of steps in that particular JMS sequence, the other bits in G2 being blank.

In the JMP and JMP-R modes, bits 1 to 9 and 12 of G1 give the starting address to which the jump is to be made and bits 10 and 11 designate the JMP and JMP-R modes. A "1" in bit 13 signifies a JMP-R mode in which the arm is returned to the N+1 step when a "1" (end of subroutine bit) is provided in bit 15 of G2. All other bits in G2 are blank for the JMP and JMP-R modes.

Considering now the address-jump mode JMP in more detail, the starting address for the JMP, JMP-R and JMS modes is contained in bits 1 through 9 and 12 of G1. This starting address data is supplied over lines BDn, CDn to a series of starting address latches 1080 in the address input selector 680 and is latched in these latches when a JPS signal is supplied thereto. The JPS signal is developed by a JMP/JMS detector 1082 which is controlled by G1 and produces an output on the JPS conductor when bits 10 and 11 of G1 are either "1", "0" or "1", "1". The detector 1082 also develops a signal on the JMP conductor when bits 10 and 11 are "1", "1" and develops a signal on the JMS conductor when bits 10 and 11 are "1", "0". The starting address in the JMP mode is thus supplied to position 1 of MUX 3 on the address input selector 680. When the read/write control unit 1083 receives either a JMP or JMS signal from the detector 1082 it supplies a signal over conductor 1084 to the address reset logic 1085 which in turn supplies a signal over QA1 to MUX 2 in the address input selector 680 to actuate MUX 2 to position 2 so that the JMP starting address is supplied from the latches 1080 through MUX 3, MUX 2 and MUX 1 to MUX 7. MUX 7 is controlled by the WAR signal to position 1 so that the starting address is supplied to register 1064 and overlines ACn to the memory 628. Accordingly, the memory 628 immediately jumps to the new starting address and continues successive program steps from this point. In the JMP mode no return to an earlier program step is made.

In the JMP-R mode a return to the N+1 step is to be made after the memory 628 has been jumped to the new starting address and then encounters an end/sub "1" bit in bit 15 of G2, as shown in FIG. 63. At the start of a JMP-R mode the address of the N+1 program step which appears at the output of the adder 1081 is supplied over the lines LAn to RAM 2. RAM 2 is a random access memory having eight address slots, the zero address slot being employed to store the address of the N+1 program step and the other seven slots being employed to store the new starting addresses for each of the seven JMS sequences which may all be in progress at one time, as will be described in more detail hereinafter in connection with the JMS jump sequence. The signal on conductor 1084 at the start of a JMP-R mode actuates MUX 8 on the sequence control board 1060 to position 1 so that the address of the N+1 program step is stored in the zero address slot of RAM 2. When an end of subroutine bit is encountered at bit 15 of G2, indicating that the JMP-R mode has been completed and the memory 628 should be returned to the N+1 program step, an E/S signal is supplied to the read/write control circuit 1083 which controls RAM 2 over conductor 1086 to read out the address stored in the zero address slot of RAM 2 and this is supplied over lines $\overline{JAn}$ to position 2 of MUX 3. The control circuit also supplies a signal over the QAD conductor to MUX 3 so that it is actuated to position 2. The address of the N+1 program step is then supplied through MUX 3, MUX 2, MUX 1 and MUX 7 to the register 1064 so that the memory 628 is returned to the N+1 program step and continues sequentially from this point.

The JMS mode is employed when a number of parts are to be removed from different locations on a pallet during successive playback cycles. Typically the JMS mode involves a small number of steps which are required to lift a part from the pallet and move it to a predetermined position. The same number of program steps are thus required for each playback cycle but the position of the part on the pallet is different for each playback cycle. In the arrangement of the present invention the positional commands necessary to pick up each part from a pallet are calculated by the computer 1000 and are stored in a sequential series of program steps in the memory 628 during the teaching operation, this operation being identified as a Task III operation, as described in more detail hereinafter. If a series of three steps are required to pick up each part from the pallet, positional commands will be stored in the memory 628 in sequential three step groups. When a program step is encountered which calls for a JMS sequence the starting address for the first three step group is designated by bits 1 to 9 and 12 of G1, as discussed heretofore in connection with FIG. 62. Assuming that the first three step group in the JMS sequence is stored at program steps 512, 513 and 514, the starting address for program step 512 would be given by bits 1 to 9 and 12 of G1 and the memory 628 should be jumpted to step 512. When these three steps are completed the memory should be returned to the N+1 step and complete the program. However, on the next playback cycle, when the N step calling for this JMS sequence is again encountered, the memory should be jumped to step 515 which is the correct location to remove the next part from the pallet, rather than step 512 the address of which appears at bits 1 to 9 and 12 of the Nth step. Program steps 515, 516 and 517 then give the correct command signals to remove the second part from the pallet. Furthermore a series of different pallets up to a maximum of seven may all be used as different points in the program and the memory 628 jumped to the correct address for each pallet subroutine as called for.

The number of steps a JMS sequence (W commands) for a specific pallet is given by bits 1, 2 and 3 of G2 and is supplied to a W latch 1087 each time a JMS mode program step is encountered. A counter 1088 then counts the number of succeeding program steps and when the counter output equals the number set in the W latch 1087 the comparator 1089 develops an output which is supplied to the read/write control circuit 1083 and also resets the counter 1088 and latch 1087.

Considering now the manner in which the sequence control circuit 1060 operates to jump the memory 628 to the first starting address for the first part on the pallet and then to successive new groups of steps during successive playback cycles, and assuming that a three step sequence is involved and the starting address of the first step is 512, the starting address 512 is first stored in the start address latches 1080 when the detector produces a JPS signal. The N+1 step address is also stored in the zero address slot of RAM 2, as described heretofore, and the subroutine number for the pallet, designated by bits 13, 14 and 15 of G1 is stored in one of the subroutine latches 1090, there being one such latch for each of the seven pallet routines. The stored subroutine number is decoded in the decoder 1091 and actuates the corresponding one of the first pass detector flip flops 1092 so that a flip flop is set corresponding to that subroutine number. These flip-flops are reset when power is initially turned on by a burst of pulses from the oscillator 1093 which are supplied to the initial control circuit 1094 which in turn controls resetting of RAM 2 and the read/write control circuit 1083. The flip-flop first pass detectors 1092 are also reset when the end of subroutine bit is encountered on the last program step of the JMS sequence to remove the last part from the pallet, as will be described in more detail hereinafter.

As soon as the starting address 512 is stored in latches 1080 and a JPS signal is produced, this starting address is supplied to the memory 628 and the three program steps 512, 513 and 514 in this JMS sequence are performed. After the N+1 step address is stored in the zero slot of RAM 2, MUX 8 is actuated to position 2 so that RAM 2 is now address controlled by the subroutine number stored in one of the latches 1090. For example, if the JMS sequence relates to the first pallet, RAM 2 will be addressed so that the addresses of program steps 512, 513 and 514 are successively written in the address slot of RAM 2 corresponding to the first pallet, it being recalled that N+1 address data is supplied to RAM 2 over lines LAn. Accordingly, when the three steps are completed and the comparator 1089 develops an output the address of step 515, which is the first step of the next JMS sequence, is stored in the slot of RAM 2 assigned to the first pallet. The read/write circuit 1083 responds to the comparator output by actuating MUX 8 to position 1 and controlling RAM 2 so that the N+1 step is read out of the zero address slot of RAM 2, over lines JAn and through MUX 3 to the address register 678 so that the memory 628 is returned to the N+1 step. However, since the flip-flop in the first pass detectors 1092 remains set, the next time the Nth step is encountered and a starting address of 512 is stored in the latches 1080 this starting address is not sent to the memory 628. Instead, the read/write circuit 1083 responds to the R̄ signal developed by the set flip-flop by supplying a signal on the QAD line to MUX 3 so that the address of step 515 which is stored in the corresponding slot of RAM 2 is supplied over the JAn lines and through MUX 3, MUX 2 and MUX 1 to the address register 678.

The above operation will continue during successive playback cycles until the last part is being removed from the pallet. When this occurs, the last step in that JMS sequence has a "1" at bit 15 of G2 which is employed to develop an end of subroutine signal E/S which is supplied to the detectors 1092 and read/write circuit 1083 to reset these circuits. When a new pallet is supplied, the starting address will be controlled by the latches 1080 since no first pass flip-flop 1092 has as yet been set. In this connection it is pointed out that the detectors 1092 include a flip-flop for each of the seven subroutine numbers which may be stored in the latches 1090 so that parts may be removed from up to seven pallets during the same program.

A brief description will now be given of the specific tasks which the computer 1000 may perform during the teach-assist operation. The first task which the computer may perform during the teach-assist operation, which may be identified as Task I, is that of making all of the calculations necessary to move in a desired direction a specified distance and at a specified velocity, as described in detail heretofore in connection with FIGS. 31 to 49, inclusive, and store the calculated results in the memory 628 at the required addresses. In this connection, it will be understood that the teaching operator may move the manipulator arm to a desired position and aim it in a desired direction when the switch 1024 is in the normal teach position 1026 and may also program desired auxiliary control signals through the auxiliary control panel 1044 when the switch 1024 is in the manual teach position 1027. However, whenever the computer 1000 is to perform a teaching task the switch 1024 is in the computer position 1028, as described in detail heretofore.

A typical Task I teaching operation is shown in the following printout:

| TASK I Computer-Manipulator Interactive Control |
|---|
| (1) TASK? 1 |
| (2) R WHEN ROBOT READY R |
| (3) ROBOT #: 1 |
| (4) B ": ∅ |
| (5) C ": −3 |
| (6) S ": −2 |
| (7) VEL: 12∅ |
| (8) F OR C: C |
| (9) X FOR X BITS: |

-continued

TASK I Computer-Manipulator Interactive Control

(10) 000000WWWWW
(11) XXXXXXXXXXXX
(12) 123456123456
(13) 000000000000
(14) K FOR OTHER BITS: K
(15) KKTE
(16) 12DP
(17) 1000
(18) P PROCEED: P
(19) TYPE ADDRESS AND 6 READINGS
(20) 010000 022315 015653 022703 037170 040000 040644
(21) P PROCEED: P
(22) ROBOT OUTPUT
(23)   10000 10001 10002 10003 10004 10005 10006 10007
(24)   12002   0 21553 15631 22545 36660 40074 40630
(25) ROBOT OUTPUT
(26)   10010 10011 10012 10013 10014 10015 10016 10017
(27)   12002   0 21010 15613 22407 36350 40167 40616
(28) ROBOT OUTPUT
(29)   10020 10021 10022 10023 10024 10025 10026 10027
(30)   12002   0 20244 15600 22252 36040 40262 40606
(31) ROBOT OUTPUT
(32)   10030 10031 10032 10033 10034 10035 10036 10037
(33)   12002   0 17500 15570 22117 35531 40354 40600
(34) ROBOT OUTPUT
(35)   10040 10041 10042 10043 10044 10045 10046 10047
(36)   12002   0 16743 15563 21764 35223 40446 40575
(37) ROBOT OUTPUT
(38)   10050 10051 10052 10053 10054 10055 10056 10057
(39)   12002   0 16170 15561 21633 34715 40540 40573
(40) ROBOT OUTPUT
(41)   10060 10061 10062 10063 10064 10065 10066 10067
(42)   12002   0 15426 15563 21503 34410 40631 40572
(43) ROBOT OUTPUT
(44)   10070 10071 10072 10073 10074 10075 10076 10077
(45)   12002   0 14664 15567 21354 34103 40722 40574
(46) ROBOT OUTPUT
(47)   10100 10101 10102 10103 10104 10105 10106 10107
(48)   12002   1 14120 15577 21226 33575 41013 40577
(49) COMPLETE
(50) LAST STEP = 520
(51) TASK?

Considering now the sequence of events in performing the above Task I teaching operation, the computer first types out Task? (line 1) on the Teletype unit 1004 and waits. The teaching operator then types the number of the designated task, i.e. "1". The computer then types in line 2 R WHEN ROBOT READY and waits. The operator may now aim the manipulator hand in the desired direction, if he has not already done so, and then types R at the end of line 2. The computer then types line 3 ROBOT #: and wait until the operator types in the number of the robot to be controlled, in this case Robot No. 1. Such an arrangement is required where two or more robots are serviced by one computer. The computer then types line 4 B": and waits for the operator to type in the desired distance of movement along the axis b, as described in detail heretofore in connection with FIG. 29. In this instance zero movement along b is desired and the operator types 0 at the end of line 4. In a similar manner lines 5 and 6 are completed by the operator to indicate the desired distances along c and along the sweep axis (S). In this instance a distance of minus three inches along C and minus two inches along S is desired. The computer then types line 7 VEL: and waits for the operator to fill in the desired velocity of movement in the desired direction. In this instance the operator types in "120" signifying a velocity of 120 inches per minute. As described generally heretofore, the calculations shown in FIGS. 31–49, inclusive, are based on the assumption that the outer three points, i.e. pt.3, pt.5 and pt.6 all move in parallel motion. It such parallel motion is assumed over a relatively large distance then substantial errors may be introduced in the calculations. Accordingly, the computer 1000 first divides the desired distance into small increments of motion in the desired direction and make separate calculations of the encoder values in all six axes necessary to move the manipulator arm successively to these points. These increments may be either coarse or fine, dependent upon the desired accuracy with which the movement is to be made. To this end, the computer types line 8 "F OR C:" and waits for the operator to designate whether the required distance is to be divided up into fine (F) or coarse (C) intervals. In this case the operator types in C at the end of line 8.

The computer then types line 9 X FOR X BITS: and waits. If the operator wishes to change any of the auxiliary control signals in G1 and G2 he types in "X" at the end of line 9. If he does not wish to make any changes from the manual teaching condition, he types CR (carriage return) at the end of line 9. In the present instance the operator types in X and the computer responds by typing lines 10, 11 and 12. These lines designate in vertical columns the six OX and six WX signals. The operator then types in line 13 the desired designation for each OX and WX signal. In the present instance zeros were typed for all columns, indicating that no OX or WX signals are required for this program step.

The computer then types line 14 K FOR OTHER BITS: and waits. The operator may change other bits by typing in K at the end of line 14. The computer types lines 15 and 16 and waits for the operator to fill in line 17. In the present instance clamp K1 is programmed to be actuated by typing a "1" below K1 and zeros are typed below the other columns.

The computer 1000 now has all the information it needs to complete the assigned Task I and types line 18 P PROCEED: and waits. The operator types P when he is ready for the computer to perform its calculations and store them at the desired addresses in the memory 628. However, in the illustrated printout the address and encoder readings of the present position of the manipulator are typed out in lines 19 and 20, it being understood that this information is normally supplied to the computer 1000 over the lines Dn without being printed out. All address and encoder readings are printed out in octal code, each octal digit being convertible into three binary digits as follows:

| Octal Digit | Binary Group |
| --- | --- |
| 0 | 000 |
| 1 | 001 |
| 2 | 010 |
| 3 | 011 |
| 4 | 100 |
| 5 | 101 |
| 6 | 110 |
| 7 | 111 |

In the present instance, the address 512 for the storage of the first calculated set of values is indicated by the octal code number 010000 in line 20 and the six present encoder values by the six octal numbers following thereafter. Lines 21 to 48 then illustrate in printout form the manner in which the computer calculates successive increments in the desired direction and stores them at successive addresses in the memory 628, it being understood that these lines are not normally printed out during a teaching operation. Storage of the calculated encoder values in the memory 628 is achieved by transmitting the address data for a set of calculated values over the lines CAn and through MUX 1 and Mux 7 to register 1064 in the address control unit 678. It also sends appropriate group address information over the lines CGC(0-2) and through MUX 5 to control group addressing of the memory 628 in place of the group counter 674. The calculated encoder values are supplied through interface 1002, lines CEn, MUX6 and MUX9 to the memory 628. Referring to line 23, the addresses for the eight periods G1-G8 of program step 512 are given in octal code and the commands corresponding to each period are given in line 24. Thus the G1 command 12002 converts to 001 010 000 000 010 in binary code which must be read in reverse order, as indicated in FIGS. 62 and 63. This command indicates an Acc. 3 signal at bit, 2 a CP mode signal at bit 11 (indicating that on playback movement for this program step is in the velocity mode, as described in detail heretofore) and a K1 clamp signal is indicated at bit 13, corresponding to the information typed in by the operator at line 17. No command digits appear in the G2 period in line 24, and the six octal numbers following are the calculated encoder values which are stored in the memory 628 in the manner described in detail above. Lines 25, 26 and 27 of the printout correspond to the next set of encoder values calculated by the computer 1000, it being noted that the auxiliary control signals remain the same. However, the address of this next step is 513 as indicated by line 26. In the same manner, seven other sets of calculations, indicated by lines 28-48 are performed by the computer and stored at successive addresses in the memory 628. The computer then types at line 49 COMPLETE and line 50 types the last address, i.e. 520 in decimal code so that the operator has an indication of the number of program steps that have been filled by the computer calculations.

After making these calculations and storing them in the memory 628, the computer waits for the next task assignment. If desired, the teaching operator may go to the manipulator and may throw the teach-repeat switch to the repeat mode and check the steps which have just been calculated by observing the movement of the manipulator hand in response to the calculated sets of encoder values, which have been stored in the memory 628.

The computer 1000 may also be employed to perform a different taks, identified as Task II, during the teaching operation. In the Task II operation, the locations of the manipulator arm at two end points of a desired path are fed to the computer which then computes the velocity control constants and records then in the G1 and G2 intervals of the program step involved in moving between the two desired end points so that the end effector, i.e. pt. 6 will move in a straight line between these two end points. Such a computer assist teaching operation is particularly advantageous in arc welding, or the like, where the end effector (such as the arc welding tip) must be moved in a curved or sinuous path. In prior arrangements such as described in Engelberger et al U.S. Pat. No. 3,885,295 the teaching operator was required to program the manipulator at precisely equal small intervals in order to achieve a constant velocity on playback. Such physical measurement necessarily entailed a certain amount of inaccuracy in spacing of the intervals at which program steps were recorded so that on playback this variation in program step intervals resulted in corresponding variations in velocity of movement of the manipulator hand. In the Task II teaching operation of the present invention the computer 1000 calculates ΔS, the distance between the two desired end points and then calculates the velocity constants which are required to move this distance at a desired velocity. Accordingly, the teaching operator need not position the manipulator arm at precisely equal points along the desired curved path but instead simply positions the arm at two points along the path and informs the computer of the required velocity between points. This substantially simplifies the teaching operation for curved path programming because the operator has only to program points closer together on sharp curves, without regard to the exact equal spacing of these points and the computer determines and stores the correct velocity constants so that movement in a straight line at the desired velocity is achieved on playback.

A typical Task II teaching operation is given in the following printout:

| TASK II Computer-Manipulator Interactive Control |
| --- |
| (1) TASK? 2 |
| (2) R WHEN READY R |
| (3) ROBOT #: 1 |
| (4) TYPE ADDRESS AND 6 READINGS |
| (5) 000730 022315 015653 022703 037170 040000 040644 |
| (6) P PROCEED: P |
| (7) MOVE ROBOT, R WHEN READY R |
| (8) T FOR TOOL OFFSET: T |
| (9) OFFSET B: 9.75 |
| (10) OFFSET C: −1 |
| (11) OFFSET S: .5 |
| (12) VEL: 120 |
| (13) X FOR X BITS: X |
| (14) 000000WWWWWW |
| (15) XXXXXXXXXXXX |
| (16) 123456123456 |
| (17) 000000000000 |
| (18) K FOR OTHER BITS: K |
| (19) KKTE |
| (20) 12DP |
| (21) 1100 |
| (22) P PROCEED: P |
| (23) TYPE ADDRESS AND 6 READINGS |
| (24) 000730 006222 016100 017770 030276 042021 040726 |
| (25) P PROCEED: P |
| (26) ROBOT OUTPUT |
| (27)   730 731 732 733 734 735 736 737 |
| (28)   32004 110 6222 16100 17770 30276 42021 40726 |
| (29) COMPLETE |
| (30) LAST STEP = 59 |
| (31) TASK? |

In a Task II teaching operation the teaching operator first moves the manipulator hand to the first end point and then goes to the teletype 1004 and types in "R" at the end of line 2 and designation of the Robot No. in line 3, as discussed above in connection with a Task I operation. For purposes of illustration, the above printout shows the address and encoder values of the first end point at line 5, although lines 4 and 5 would not normally be printed out. After this data has been accepted by the computer, the computer types line 7 MOVE ROBOT, R WHEN READY and waits. The teaching operator then picks up the teach control gun 656 again and moves the arm to the other end point of the desired path. After moving the arm to this position, the operator then indicates that the arm is at the other end point by typing in R at the end of line 7. For illustrative purposes this new set of encoder values is given in line 24. The computer then types line 8 T FOR TOOL OFF- SET: and waits. If the end effector (pt. 6 in previous description) is offset from the predetermined values of b, c and s, as for example with an arc welding tip, these constants are typed in at the ends of line 9, 10 and 11 by the operator after typing T at the end of line 8. The operator then types in the desired velocity between end points, in this case 120 inches per minute. The operator may also program OX, WX and other auxiliary control bits in G1, G2 as shown by lines 13 to 21.

After the encoder data for the desired end points has been supplied to the computer 1000 it first calculates ΔS, the distance between end points, by first converting the encoder values into Cartesian coordinates by means of forward transformation equations (19), (20) and (21) given above, and computes $$\Delta S = \sqrt{(X_2-X_1)^2+(Y_2-Y_1)^2+(Z_2-Z_1)^2}$$

After ΔS is determined, the computer determines the number of interpolation intervals to be used in accordance with the following table:

| Δ S (inches) | No. of Interp. Intervals | Code |
|---|---|---|
| .1–.2 | 16 | 000 |
| .2–.4 | 32 | 001 |
| .4–.8 | 64 | 010 |
| .8–1.6 | 128 | 011 |
| 1.6–3.2 | 256 | 100 |

The computer then codes the interpolation intervals number for recording in bits 1, 2 and 3 of G1, as described heretofore in connection with FIG. 62. The computer then calculates the total time required for movement between end points by dividing ΔS by the velocity and selects the correct number of divider stages in the frequency divider 74 which brackets the calculated total time, in accordance with the following table:

| Total Time (μ sec.) | Divider Stages | Code |
|---|---|---|
| 3,125–6,250 | $2^4$ | 000 |
| 6,250–12,500 | $2^5$ | 001 |
| 12,500–25,000 | $2^6$ | 010 |
| 25,000–50,000 | $2^7$ | 011 |
| 50,000–100,000 | $2^8$ | 100 |

The computer then codes the selected number of divider stages for recording in bits 7, 8 and 9 of G2, as described heretofore in connection with FIG. 63. Assuming that the total time is 7077 μsec., the computer would select $2^5$ as the correct number of divider stages. However, since selection of the number of divider stages is only approximate, as shown by the above table, the computer then calculates the correct count rate for the programmable counter 672 so that the oscillator clock pulses are divided by exactly the right amount to give the required total time. The computer then codes the desired count rate for recording in bits 1–6 of G1. In the above printout of Task II line 28 gives the command data for G1 and G2 and the six encoder values of point z. These encoder values are the same as line 24 which shows the encoder values when the manipulator is initially moved to point two prior to the computer calculations. It will also be noted that the address of the data on line 28 is given on line 27 which is the same address as initially provided when point one was supplied to the computer, as shown by line 5. In the above printout the first octal command number 32004 on line 28, for the G1 period, converts to the fifteen bit binary number 011-010-000-000-100. When this number is read from right to left for bits 1–15 of G1 (FIG. 62) it will be seen that bits 1–3 show 32 as the number of interpolation intervals. The second octal number 00110 on line 28, for the G2 period, converts to the 15 bit binary number 000-000-001-001-000. Bits 1–6 reading from right to left show a division rate of 72 for the counter 672, it being recalled that this counter has a minimum count rate of 64 which is added to the coded 0001 in bits 1–6 to give 72. Bits 7–9 reading from right to left show a divider rate of $2^5$ for the divider 744, also as in the above example.

In accordance with another aspect of the invention the computer 1000 may be employed to calculate the encoder values and velocity control constants required to move the manipulator hand during successive playback cyles to pick up different parts from a pallet on which the parts are positioned at different locations, this task being identified as Task III. Thus, if the manipulator hand 96 is to be programmed to successively pick up different parts from the pallet 58 (FIG. 3) it is necessary to program the manipulator hand 96 so that it is perpendicular to the plane of the pallet 58 and immediately above one of the parts positioned thereon. The hand must then be programmed to move in a straight line into position to grasp one of the parts and after the air clamp is actuated to grasp the part, the hand should be moved back along this line. However, since the plane of the pallet 58 is at an inclined angle, it will be seen that movement into engagement with the part and removal of the part from the pallet is along a line which is not parallel to any one of the controlled axes.

The Task I operation described above may be employed to effect movement along axis b, for example, into engagement with the part and removal of the part from the pallet. However, in order to simplify the task of teaching the manipulator to pick up each of a large number of parts from the same pallet during successive playback cycles, the Task III operation is arranged to provide all of the positions necessary to accomplish pick-up of each part during successive playback cycles from different positions on the pallet 58. To this end, the coordinates which define the plane of the pallet 58, the desired direction, depth and speed of insertion and withdrawal, and the number of locations on the pallet are supplied to the computer 1000. The computer then makes the necessary calculations to pick up each part and stores the calculated sets of encoder values corresponding to pickup of each part as successive program steps in the manipulator memory 628 as described above in connection with the JMS sequence mode of operation. More particularly, the teaching operator first moves the manipulator hand to a position over one of the parts in one corner of the pallet 58, such as the part 58a (FIG. 3) and moves the manipulator hand down to a position where the fingers grasp the part 58a while it is still on the pallet 58. This downward movement may be accomplished by a Task I operation, as described above. When the manipulator arm is moved to a position to grasp the part 58a, this information is supplied to the computer. The manipulator hand is then moved to a position to grasp a part 58b in another corner of the pallet 58 and after this data has been supplied to the computer, the manipulator arm is moved to a position to grasp a part 58c in a third corner of the pallet 58, this information also being supplied to the computer. After information for the points at which the parts 58a, 58b and 58c must be grasped by the manipulator hand have been fed to the computer, the computer is informed of all necessary data to compute the plane of the pallet 58. Furthermore, by supplying data for the up and down positions with respect to part 58a the computer is also informed of the necessary data to make similar calculations for insertion and withdrawal at each of the other 5 points on the pallet 58. After the computer is then supplied with information relative to the number of parts on the pallet and their spacing, it then calculates the intermediate positions which the manipulator hand 96 must make in order to grasp each one of the different parts on the pallet during different successive playback assembly cycles.

A typical Task III teaching operation is shown by the following printout:

| TASK III Computer-Manipulator Interactive Control |
| --- |
| TASK? 3 |
| (1) ROBOT #: 1 |
| (2) OFFSET B: 8.75 |
| (3) OFFSET C: .25 |
| (4) OFFSET S: .25 |
| (5) VEL: 240 |
| (6) X FOR X BITS: X |
| (7) 000000WWWWWW |
| (8) XXXXXXXXXXXX |
| (9) 123456123456 |
| (10) 1000000000000 |
| (11) K FOR OTHER BITS: K |
| (12) KKTE |
| (13) 12DP |
| (14) 2000 |
| (15) START ADDRESS: 512 |
| (16) SUB #: 2 |
| (17) W: 2 |
| (18) N-MAX: 4 |
| (19) M-MAX: 2 |
| (20) R WHEN ROBOT READY R |
| (21) TYPE ADDRESS AND 6 READINGS |
| (22) 000770 020537 032773 050413 035436 040000 037747 |
| (23) P PROCEED: P |
| (24) R WHEN ROBOT READY R |
| (25) TYPE ADDRESS AND 6 READINGS |
| (26) 000770 017146 032345 047744 035436 040000 037772 |
| (27) P PROCEED: P |
| (28) R WHEN ROBOT READY R |
| (29) TYPE ADDRESS AND 6 READINGS |
| (30) 000770 017146 032347 047744 040726 040000 037012 |
| (31) P PROCEED: P |
| (32) R WHEN ROBOT READY R |
| (33) TYPE ADDRESS AND 6 READINGS |
| (34) 000770 017775 031212 047574 035402 040000 040011 |
| (35) P PROCEED: P |
| (36) ROBOT OUTPUT |
| (37)     770 771 772 773 774 775 776 777 |
| (38) 25000  2 0 0 0 0 0 0 |
| (39) ROBOT OUTPUT |
| (40) 10000 10001 10002 10003 10004 10005 10006 10007 |
| (41)    20  0 20537 32773 50413 35436 40000 37747 |
| (42) ROBOT OUTPUT |
| (43) 10010 10011 10012 10013 10014 10015 10016 10017 |
| (44) 12002  70 17146 32345 47744 35436 40000 37772 |
| (45) ROBOT OUTPUT |
| (46) 10020 10021 10022 10023 10024 10025 10026 10027 |
| (47)    20  0 20563 32751 50410 36531 40000 37502 |
| (48) ROBOT OUTPUT |
| (49) 10030 10031 10032 10033 10034 10035 10036 10037 |
| (50) 12002  70 17171 32323 47741 36531 40000 37525 |
| (51) ROBOT OUTPUT |
| (52) 10040 10041 10042 10043 10044 10045 10046 10047 |
| (53)    20  0 20563 32752 50411 37627 40000 37234 |
| (54) ROBOT OUTPUT |
| (55) 10050 10051 10052 10053 10054 10055 10056 10057 |
| (56) 12002  70 17171 32324 47741 37627 40000 37257 |
| (57) ROBOT OUTPUT |
| (58) 10060 10061 10062 10063 10064 10065 10066 10067 |
| (59)    20  0 20536 32776 50414 40726 40000 36767 |
| (60) ROBOT OUTPUT |
| (61) 10070 10071 10072 10073 10074 10075 10076 10077 |
| (62) 12002  70 17145 32350 47745 40726 40000 37012 |

| -continued |
| --- |
| TASK III Computer-Manipulator Interactive Control |
| (63) ROBOT OUTPUT |
| (64) 10100 47745 10101 10102 10103 10104 10105 10106 10107 |
| (65)    20  0 21501 31545 50160 35402 37760 40005 |
| (66) ROBOT OUTPUT |
| (67) 10110 10111 10112 10113 10114 10115 10116 10117 |
| (68) 12002  70 20033 31130 47502 35402 37760 40030 |
| (69) ROBOT OUTPUT |
| (70) 10120 10121 10122 10123 10124 10125 10126 10127 |
| (71)    20  0 21526 31523 50155 36520 37743 37543 |
| (72) ROBOT OUTPUT |
| (73) 10130 10131 10132 10133 10134 10135 10136 10137 |
| (74) 12002  70 20056 31106 47476 36520 40000 37542 |
| (75) ROBOT OUTPUT |
| (76) 10140 10141 10142 10143 10144 10145 10146 10147 |
| (77)    20  0 21525 31524 50155 37641 40000 37243 |
| (78) ROBOT OUTPUT |
| (79) 10150 10151 10152 10153 10154 10155 10156 10157 |
| (80) 12002  70 20056 31107 47476 37641 40000 37267 |
| (81) ROBOT OUTPUT |
| (82) 10160 10161 10162 10163 10164 10165 10166 10167 |
| (83)    20  0 21501 31550 50160 40763 40000 36770 |
| (84) ROBOT OUTPUT |
| (85) 10170 10171 10172 10173 10174 10175 10176 10177 |
| (86) 12002 40070 20033 31133 47501 40763 40036 36765 |
| (87) LAST SR ADDRESS = 527 |
| (88) COMPLETE |
| (89) LAST STEP = 63 |
| (90) TASK? |

In accordance with an important aspect of the invention the teaching operator types in offset information at the ends of lines 2, 3 and 4 for the b, c and sweep axes (FIG. 29) so that when a part on the pallet 58 is gripped by the hand clamp the actual coordinates used during the computer's calculations will define the point where the part touches the pallet rather than an intermediate point on the part where the clamp actually contacts the part. This information is supplied by the operator in connection with each task III and must be determined by measurement of one of the parts on each pallet. Lines 5 to 14 of the above Task III printout are generally similar to those described above in connection with Tasks I and II. It is also pointed out that for clamp No. 1 (K1) a "2" is programmed (line 14). This is interpreted by the computer as requiring the first step of each JMS sequence to be in the point to point mode and the remaining steps of the sequence are to be in the velocity mode on playback.

The teaching operator chooses an appropriate starting address which is sufficiently removed from the remainder of the program to contain all of the program steps in sequence to unload the entire pallet and types this address at the end of line 15. The identification of the subroutine or pallet number is then typed at the end of line 16; in this case the number 2 pallet is being programmed. The number of steps in each JMS sequence is then typed in at the end of line 17, i.e. "2" which signifies that each JMS sequence involves only two steps. This information is then recorded as bits 1–3 of G2, as described heretofore in connection with FIG. 63. The operator then types in the number of parts in the horizontal direction on the pallet in line 18, i.e. "4" in the above example, and the number of parts in the vertical direction in line 19, i.e. "2".

The six encoder values corresponding to the position of the manipulator arm over a part in the upper left hand corner of the pallet (such as 58a) are given in line 22, the encoder values when the arm is clamping this part are given in line 26, the encoder values when the arm is clamping part 58b are given in line 30 and the encoder values when the arm is clamping part 58c are given in line 34. None of these lines would appear during an actual task III operation, the operator simply moving the arm to these positions in succession in response to lines 20, 24, 28 and 32. The computer then proceeds to make the necessary calculations to determine all positions of the arm necessary to pick up all eight parts from the pallet and records these calculated encoder values in the memory 628 beginning with step 512, as shown by lines 40 to 86 of the above printout. It will be noted that the manipulator was originally at step 770 (octal) when the task III operation was initiated but the computed encoder values are stored beginning at step 512 (10000 octal) as shown by line 40. It will also be noted that the calculated encoder values of the clamping position for the 4th part, given in line 62 compare very closely to the encoder values given in line 30 which correspond to the position the teaching operator moved the arm to clamp part 58b. Also, the calculated encoder values at line 68 for the fifth part compare very closely with line 34. Accordingly, all of the computer calculated encoder values are recorded in the memory 628 rather than using some calculated values and some actual values. However, the original encoder data is used as the first step of the first sequence, i.e. lines 22 and 41 show identical encoder values.

In line 86 of the above printout it will be noted that the G2 octal number converts to binary 101-000-000-111-000. When read from right to left this shows a "1" at bit 15 which indicates the end of the JMS sequences related to unloading this particular pallet. As described heretofore, this end/sub bit is used to reset the first pass detectors 1092 and read/write circuit 1083 in the sequence control circuit 1060 (FIG. 55) during playback, so as to prepare for a new pallet of parts.

In connection with the above-discussed Task I, Task II and Task III computer-assist operations, it should be pointed out that the Teletype keyboard 1004 may be placed at any point convenient to the teaching operator so that he can move the manipulator hand and also communicate with the computer 1000 in a convenient manner while performing these tasks. Of course, once the programmed points are recorded in the memory 628, the manipulator hand will be moved to the corresponding points during playback without assistance by the computer 1000, as described in detail.

While the arrangement shown in FIGS. 51-58, inclusive, employs the computer 1000 as a teach-assist facility to perform various tasks during the teaching operation, such an arrangement does require a separate main memory 628 for each manipulator apparatus. In accordance with a further aspect of the present invention, this arrangement can be substantially simplified when a number of pairs of programmable manipulators are employed to perform simultaneous assembly operations. Such an arrangement is shown in FIGS. 59, 60 and 61. Referring to these figures, a minicomputer 1000a is employed as a control computer in conjunction with a disc memory file 1100 of large capacity to service a series of eight manipulators identified as manipulators Nos. 1 to 8, inclusive. Each pair of manipulators is interconnected with the minicomputer 1000a through the interface units 1102, 1104, 1106 and 1108. The common large memory 1100 is employed instead of the individual memories 628 associated with each manipulator as described in connection with the arrangement shown in FIGS. 51-58, inclusive. The minicomputer 1000a is employed to perform the on line control functions necessary to supply digital programmed command signals to each of the manipulators 1 to 8 inclusive when these manipulators are operated in the repeat mode so that pairs of these manipulators may be simultaneously employed in the assembly of parts, as described heretofore. In addition, the minicomputer 1000a may also perform the off line computations described in detail heretofore in connection with the arrangement shown in FIGS. 51-58, 62 and 63. The disc memory 1100 is provided with a disc memory interface 1110 which operates in response to a request for disc data from any of the four interface units 1102, 1104, 1106 and 1108 to supply the requested data to the computer 1000a.

In FIG. 60, one of the interface units 1102 is shown in more detail, this unit being supplied with timing and control signals from the CPU within the minicomputer 1000a over the indicated lines 1116. A sixteen wire data bus 1118 is connected between the disc memory interface 1110 and the other interface units. In addition a sixteen wire data bus 1120 is connected between the computer 1000a and the other interface units.

The interface 1102 is interconnected with the local memory and control circuits of two manipulators, one such local memory and control circuit being shown in FIG. 61. Referring to FIG. 61, a pair of instruction registers, identified as RAM A and RAM B are employed in each manipulator in place of the main memory 628 described in detail heretofore. Preferably, the registers RAM A and RAM B will comprise only one or two step (eight words/step) instructions registers, data being read into either RAM A or RAM B which serves as a buffer while the other unit is controlling the manipulator. A flip-flop 1122 controls which one of RAM A or RAM B is being used in playback and also serves to direct the next instruction to or from the other register.

Data is clocked in from the interface unit 1102 at a relatively fast rate. All control signals required to effect storage of the next instruction will be supplied by the interface unit 1102. A three wire group address steers each subword into the correct location in RAM A and RAM B. A memory initiate command effects the initiation of properly timed write commands and in a similar manner the necessary mode signal is applied to RAM A or RAM B which is being used as the next step command buffer. The disc memory 1100 has two speeds of operation depending upon whether it is receiving new data from the corresponding interface unit during a teaching operation or whether it is servicing the manipulator in playback. All timing signals are synchronous and are derived from the basic computer clock.

During the teaching operation, only RAM A is employed and this register collects data as each one of the six controlled axes is moved to the new position. Thus, when one of the teach motion buttons for any axis identified as P.B.3-P.B.8 in FIG. 61 is pushed the corresponding movement is recorded in RAM A. However, when the pushbutton is released the data is retained in RAM A in active control and the closed loop teach arrangement described heretofore is employed to hold the command position. The final recording to the disc memory 1100 takes place only when the main record button of the manipulator is pushed, the interface unit then commanding RAM A to read out the full stored word in approximately 15 microseconds. Immediately thereafter, the local control effected within the manipulator control circuit shown in FIG. 61 takes over the maintains the manipulator in the last step position, as described in detail heretofore in connection with FIGS. 22 and 23. The fifteen microsecond gap to effect transmission of the stored word in RAM A to the disc file 1100 will not effect the servo follow up capability for each axis and hence the stored position is maintained.

The function of the interface unit 1102 is servicing two manipulators is to act as the interpreter between the computer 1000a and the local controllers (FIG. 61) in each manipulator. For example, when manipulator No. 1 requests the next instruction a request is generated to the computer for interface No. 1, over the line 1124. The computer, when ready to service the request, responds by transmitting the next data word for manipulator No. 1 on the sixteen wire data bus 1120. The interface unit routes the data to the controller for manipulator No. 1 along with the necessary control and timing signals to store the command in buffer RAM A or RAM B depending upon the state of the flip-flop 1122. Communication from the computer to the local controllers in each manipulator is under the direction of the interface unit and takes place at the nominal 1.6 microseconds per bit cycle time of a conventional minicomputer.

The interface unit 1102 plays a similar role when data is to be recorded in the disc file from a particular local controller associated with a manipulator which is being taught. For example, when recording from manipulator No. 1, the data to be recorded is housed in RAM A. Pushing the record button at manipulator No. 1 tells the interface unit 1102 that manipulator No. 1 desires to transmit data to the main memory 1100. Interface unit 1102 then puts out a request over the lines 1124 to the computer saying that it desires service. The computer then acknowledges the request. The interface unit delivers the proper timing and control signals to manipulator No. 1 local control which results in read out of the contents of RAM A onto the sixteen wire bus 1120. The read out is routed through to the computer 1000a for storage. After read out, local control takes over maintaining the position of that particular manipulator.

Special instruction signals serve to inform the computer 1000a of particular routines or tasks which are to be performed during the teaching operation, as described in detail heretofore in connection with FIGS. 51-58. It should be pointed out that the teach-assist function of the computer 1000a has the lowest priority since its CPU services any and all on line playback requests as they occur in order for the eight manipulators to function simultaneously. Accordingly, if there is any delay in service, it will occur on the special off-line tasks described in detail heretofore.

The minicomputer 1000a may accommodate a sixteen bit word, have a memory cycle time of 1.6 microseconds (core), an add-subtract speed of 3.2 microseconds, a divide (hardware) speed of 16 microseconds and a multiply (hardware) speed of 13.2 microseconds. The disc file memory 1100 may have any size commensurate with the number of operations required by the bank of manipulators controlled thereby. Even the smallest of disc memories provides one million bits of storage which would provide sufficient memory capacity for approximately 15 minutes of operation of eight manipulators assuming an average operating time of one second per step per manipulator. In this connection, it will be understood that while the initial cost of the disc memory 1100 is high, it replaces a large number of individual memories in each manipulator, which are conventionally of the plated wire type and are relatively expensive.

Considering now the work load on the minicomputer 1000a, during playback a relatively small amount of time is required to service all requests from the eight manipulators. For example, if it takes in the order of thirty microseconds of computer time to service a routine request for next step data, from one manipulator, servicing of eight manipulators would require approximately 250 microseconds total time to service one request for each manipulator. Since a manipulator request is generated on the average of one per second it will be evident that a substantial portion of the time of the minicomputer 1000a is available for other tasks, such as teaching operations for individual manipulators, and the like.

In order to execute playback requests at a speed of thirty microseconds, the core memory within the minicomputer 1000a serves as a source of sequential commands (acting as a buffer) and receives blocks of data from the disc memory 1100 during non-request intervals. This technique effectively eliminates the average eight millisecond access time to disc file data as a consideration. In the alternative, the minicomputer 1000a may simply route the requests to and from disc memory in which case eight milliseconds will be required to access each request from one of the eight manipulators. However, even with this arrangement substantial time is available to service all requests from the eight manipulators during the playback operation and still provide substantial time for off-line calculations.

As discussed generally above, the computer 1000 is preferably a Data General 32K bit core storage computer Model Nova 2/10. The specific programs which have been developed to enable this computer to perform the above described tasks are given in the attached Appendix I. Referring to this Appendix, the main or supervisory program is given on page 1 of Appendix I. The subroutine identified as Subroutine CPC on pages 2 to 4 of Appendix I corresponds to the Task I steps described in detail above and in connection with the Task I printout. The subroutine identified as Subroutine ARC on pages 5 to 7 of Appendix I corresponds to the Task II steps described in detail heretofore. The subroutine identified as Subroutine PAL on pages 8 to 11 of Appendix I corresponds to the Task III steps described in detail heretofore in connection with a pallet unloading operation. The subroutine identified as Subroutine CNG on page 12 of Appendix I is employed to change robot constants, such as the length of elements b and c, described heretofore, or any other of the fixed manipulator arm constants, so that manipulator arms of different mechanical dimensions may be employed. This subroutine is also employed to print current values of the robot constants. The subroutine identified as Subroutine TEST on page 13 of Appendix I is employed during de-bugging to print out interim values which are obtained during the above described mathematical calculations, for checking purposes.

The subroutines identified as SR 1 to SR 16 on pages 14 to 34 of Appendix I are employed at various points during the performance of the above described tasks, as indicated in the programs relating to each specific task. The functions performed in each of these subroutines, as well as the previously identified subroutines on pages 1 to 13 of Appendix I, are given in English and are identified by a "C" in the lefthand margin opposite each comment. The subroutine identified as Subroutine CNTRL on pages 35 and 36 of Appendix I is employed to format the auxiliary control bits used during the G1 and G2 periods, as described in detail heretofore in connection with FIGS. 62 and 63. The subroutine identified as Subroutine CNVI on page 37 of Appendix I is employed to convert encoder readings to corresponding angles and the subroutine identified as Subroutine CNVO on page 38 of Appendix I is employed to convert new angles to encoder readings, as described in detail heretofore. The subroutine identified as Subroutine RBTIN on page 39 of Appendix I, is employed to take data from the manipulator encoders and enter them into the computer 1000 through the interface 1002, as described in detail heretofore. The subroutine identified as Subroutine RBTOT on page 40 of Appendix I is employed to transfer data from the computer into the correct slot in the memory 628 of the manipulator apparatus, as described in detail heretofore.

All of the programs in Appendix I with the exception of portions of the subroutines on pages 39 and 40, are given in Fortran IV language and reference may be had to the Fortran IV User's Manual No. 093-000053-08 issued by Data General Corporation for a more complete description of the Data General Fortran IV language and format. Also, in those instances where a standard subroutine is called for in Appendix I, reference may be had to the Run Time Library User's Manual Fortran IV No. 093-000068-05 issued by Data General Corporation which describes the standard subroutines which make up the Fortran IV Library of a conventional Data General Nova 2/10 computer.

Portions of the subroutines given on pages 39 and 40 of Appendix I are in mnemonics code, rather than Fortran IV, and reference may be had to the manual "Introduction to Programming the Nova Computers" No. 093-000067-01 prepared by Data General Corporation for a complete description of the mnemonic code elements employed on these pages of Appendix I.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a programmable manipulator the combination of, a manipulator arm, means for moving said arm to different positions in a plurality of independent axes, memory storage means for storing digital representations corresponding to different positions of said arm in said axes, encoder means for each of said axes and operative to develop position signals corresponding to the actual position of said arm is said plurality of axes, means controlled in part by said encoder means for calculating new digital representations during an initial teaching operation which are different from said position signals and correspond to a desired new position of said arm, and means for storing said calculated digital representations in said memory storage means.

2. The combination of claim 1, wherein said desired new position of said arm is spaced at any desired distance from the actual position of said arm at the previously taught position thereof.

3. In a programmable manipulator the combination of, a manipulator arm, means for moving said arm to different positions in a plurality of independent axes, memory storage means for storing digital representations corresponding to different positions of said arm in said axes, encoder means for each of said axes and operative to develop position signals corresponding to the actual position of said arm in said plurality of axes, means for storing said position signals in said memory storage means during an initial teaching operation so that said stored position signals can act as command signals to control movement of said arm during playback, means controlled in part by said encoder means for calculating new digital representations which are different from said position signals and correspond to a desired new position of said arm, and means for storing said calculated digital representations in said memory storage means so that said stored digital representations may also act as command signals to control movement of said arm during playback.

4. The combination of claim 3, wherein said memory storage means includes a plurality of storage slots corresponding to different positions of said arm, said position signals being stored in certain of said slots and said calculated digital representations being stored in different ones of said slots.

5. The combination of claim 4, which includes means for reading the information stored in said storage slots and controlling movement of said arm in accordance therewith during successive playback cycles.

6. The combination of claim 5, wherein the order in which said storage slots are read corresponds to a desired sequence of movements of said manipulator arm to different positions including said calculated new position.

7. In a programmable manipulator, the combination of, a manipulator arm movable with respect to a plurality of different axes, a manipulator hand connected to one end of said arm and movable with respect thereto, memory storage means for storing digital representations corresponding to different positions of said arm in said axes and different positions of said hand, encoder means for each of said axes and operative to develop position signals corresponding to the actual position of said arm in said plurality of axes, hand encoder means operative to develop position signals corresponding to actual positions of said hand, means controlled in part by said encoder means and said hand encoder means for calculating new digital representations during an initial teaching operation which are different from said position signals and correspond to a desired new position of said arm and said hand, and means for storing said calculated digital representations in said memory storage means.

8. The combination of claim 7, which includes means for recording said position signals corresponding to a particular position of said arm and said hand in said memory storage means during an initial teaching operation so that said recorded position signals can act as command signals to control movement of said arm and said hand during playback.

9. The combination of claim 7, which includes means for moving said arm and said hand so that said hand is aimed in a desired direction, and said calculating means is controlled by encoder means and said hand encoder means when said hand is aimed in said desired direction.

10. The combination of claim 9, wherein said new digital representations correspond to a plurality of new positions in said desired direction, said memory storage means includes a plurality of slots, and said digital representation corresponding to said plurality of new positions are stored in different ones of said slots.

11. The combination of claim 10 which includes means for reading the information stored in said slots and controlling movement of said arm and said hand in accordance therewith during successive playback cycles.

12. The combination of claim 11, wherein the order in which said slots are read by said reading means corresponds to a desired sequence of movements of said arm and said hand including said plurality of new positions in said desired direction.

13. The combination of claim 1, wherein said position signals correspond to different angular positions of said arm about said plurality of axes, means controlled by said angular position signals for calculating the Cartesian coordinates of the free end of said arm, means for adding a predetermined increment to said calculated Cartesian coordinates to provide modified Cartesian coordinates corresponding to said desired new position of said arm, means for converting said modified Cartesian coordinates into new position signals corresponding to the angular positions of said arm about said plurality of axes, and means for storing said new position signals in said memory storage means as said digital representations.

14. The combination of claim 7, wherein said position signals correspond to different angular positions of said arm and said hand, means controlled by said angular position signals for calculating the Cartesian coordinates of a point on said hand, means for adding a predetermined increment to said calculated Cartesian coordinates to provide modified Cartesian coordinates corresponding to said desired new position of said arm and said hand, means for converting said modified Cartesian coordinates into new position signals corresponding to the desired angular position of said arm and said hand, and means for storing said new position signals in said memory storage means as said digital representations.

15. The combination of claim 14, wherein said hand is movable with respect to said arm in a plurality of axes, and equal increments are added to the calculated Cartesian coordinates for said hand, thereby to provide modified Cartesian coordinates corresponding to translatory movement of said hand to said desired new position.

16. The combination of claim 15, which includes means for moving said arm and said hand so that said hand is aimed in a desired direction, and said calculating means is controlled by said encoder means and said hand encoder means when said hand is aimed in said desired direction.

17. The combination of claim 16 wherein said translatory movement of said hand is in said desired direction.

18. In a programmable automatic assembly system, the combination of, a manipulator arm including a first arm portion mounted for movement about a horizontal axis, a second arm portion mounted on the upper end of said first arm portion for movement about a horizontal axis, and a manipulator hand mounted on the outer end of said second arm portion and movable about a wrist bend axis perpendicular to the longitudinal axis of said second arm portion, memory storage means for storing digital representations corresponding to different positions of said first and second arm portions and said hand, encoder means for each of said axes and operative to develop position signals corresponding to the actual position of said arm in said axes, means controlled in part by said encoder means for calculating new digital representations during an initial teach mode which are different from said actual position signals and correspond to a desired new position of said arm, and means for storing said calculated digital representations in said memory storage means.

19. The combination of claim 18, which includes a plurality of said manipulator arms, and said memory storage means is common to all of said manipulator arms.

20. The combination of claim 19, which includes means common to said plurality of manipulator arms for reading said stored calculated digital representations, and control means associated with each of said manipulator arms and responsive to said reading means for moving the associated manipulator arm to said desired new position.

21. The combination of claim 18 which includes means for moving said first and second arm portions and said hand so that said hand is aimed in a desired direction, and said calculating means is controlled by the output of said encoder means when said hand is aimed in said desired direction.

22. The combination of claim 18, which includes means for storing said position signals corresponding to a particular position of said first and second arm portions and said hand in said memory storage means during an initial teaching operation so that said stored position signals and said stored calculated digital representations can act as command signals to control movement of said arm portions and said hand during playback.

23. The combination of claim 18 which includes a work table, and a pair of said manipulator arms positioned on opposite sides of said work table.

24. The combination of claim 19 wherein the first arm portion of each of said arms is mounted for rotary movement about a vertical axis, and means for limiting the rotary movement of said first arm portion to an area on either side of said work table.

25. The method of programming a manipulator provided with an arm which is movable in a plurality of axes and having encoder means for said axes operative to develop position signals corresponding to the actual position of said arm in said plurality of axes, which comprises the steps of moving said arm to a first position, storing said position signals corresponding to said first position in a memory, utilizing said position signals to calculate digital representations which are different from said first position signals and correspond to a desired new position of said arm, storing said calculated digital representations in said memory, and controlling movement of said arm during playback in accordance with both said stored position signals and said stored digital representations.

26. The method of programming a manipulator provided with an arm which is movable in a plurality of axes and a hand connected to said arm and movable in a plurality of axes and having encoder means for said axes operative to develop position signals corresponding to the actual position of said arm and said hand in said plurality of axes, which comprises the steps of moving said arm to a first position, and pointing said hand in a desired direction, storing said position signals corresponding to said first position in a memory, utilizing said position signals to calculate digital representations which are different from said first position signals and correspond to a desired new position of said arm and a new position of said hand along said desired direction, storing said calculated digital representations in said memory, and controlling movement of said arm and said hand during playback in accordance with both said stored position signals and said stored digital representations.

27. The method according to claim 26 wherein said position signals are digital signals corresponding to angular positions about the respective axes of said arm and said band and the method includes the steps of first converting said digital position signals into corresponding Cartesian coordinate signals, adding predetermined equal increments to the Cartesian coordinate signals of said hand along parallel paths related to said desired direction, to define a new position of said hand and utilizing said new Cartesian coordinates of said hand to generate digital representations corresponding to the angular positions of said arm and said hand in the respective axes when said hand is in said new position.

28. The method of programming a manipulator to perform a pallet loading or unloading operation wherein a group of identical parts are to be loaded on or removed from predetermined areas on a pallet, said manipulator being provided with an arm which is movable in a plurality of axes and having encoder means operative to develop position signals corresponding to the actual position of said arm in said plurality of axes, which comprises the steps of moving said arm to predetermined locations on the pallet and storing said position signals when said arm is at said predetermined locations, means for generating and storing first digital representations corresponding to the spacing of said identical parts on the pallet, means controlled by stored position signals and said stored first digital representations for developing second digital representations corresponding to the positions of other ones of said identical parts on the pallet, storing said second digital representations in a memory, and controlling movement of said arm during playback in accordance with said stored second digital representations.

29. The method of claim 28, wherein said predetermined locations comprise the location of parts at three corners of the pallet.

30. The method of claim 28, wherein each part requires a multiple step program to remove same from the pallet, and said developed second digital representations comprise a group of digital representations corresponding to each of said other parts and defining a path of movement of said arm to remove each part from the pallet.

31. The method of claim 28, wherein said arm has article gripping means on the end thereof, said article gripping means being arranged to grasp one of said identical parts at a point which is offset from the point at which said part contacts the pallet, storing third digital representations corresponding to said offset, and modifying said developed second digital representations in accordance with said stored third digital representations.

32. The method of claim 30, wherein said groups of digital representations are stored at sequential locations in said memory, and storing fourth digital representations in said memory corresponding to the number of program steps in each of said groups of digital representations.

33. The method of claim 28, wherein a plurality of pallets are provided for different groups of identical parts, and different third digital representations are stored in said memory identifying each of said pallets.

34. The method of claim 28, wherein said arm has article gripping means on the end thereof, said article gripping means being arranged to grasp one of said identical parts on the pallet, and said predetermined locations on the pallet are locations at which said article gripping means can grasp a part at one of said predetermined areas on the pallet.

35. The method of claim 28, which includes the steps of generating third digital representations identifying the last part which is to be removed from the pallet, and storing said third digital representations in said memory.

36. In a programmable manipulator provided with a manipulator arm which is movable in a plurality of axes, having means for said axes operative to develop position signals corresponding to the actual position of said arm, the combination of:
means for positioning said arm at different teach positions during an initial teaching operation;
means for calculating new position signals representing positions of said arm which are different from said teach positions and correspond to desired new positions of said arm; and
means for storing said calculated signals for use as command signals in controlling movement of said arm in a playback cycle.

37. The combination of claim 36 further comprising means responsive to said stored command signals for moving said arm to said desired location during a subsequent playback cycle.

38. The combination of claim 36 wherein said calculating means comprises:
means for converting said position signals corresponding to different angular positions of said arm in said plurality of axes for a first teach position to Cartesian coordinates of the free end of said arm;
means for translating said resulting Cartesian coordinates to provide modified Cartesian coordinates corresponding to said desired new positions of said arm; and
means for reconverting said modified Cartesian coordinates into new position signals corresponding to different angular positions of said arm in said plurality of axes.

39. The combination of claim 38 wherein said plurality of axes are interconnected in a predetermined relationship and defined by predetermined interrelationships.

40. The combination of claim 39 wherein said translating means comprises means for modifying the Cartesian coordinates of said manipulator arm in said plurality of axes to represent movement of one end of said manipulator arm in a predetermined direction from a first teach position to said new desired position.

41. The combination of claim 38 wherein said manipulator arm comprises a manipulator hand connected to one end of said arm, said manipulator arm being defined by a first predetermined number of said plurality of axes, said manipulator hand being defined by a second predetermined number of said plurality of axes.

42. The combination of claim 41 wherein said translating means comprises means for modifying the Cartesian coordinates of said second predetermined number of axes by equal increments to effect movement of said hand in a desired direction from a teach position to said desired new position and means for determining the change in Cartesian coordinates of said first predetermined number of axes to represent movement of said arm and said hand in said desired direction.

43. The combination of claim 42 wherein said first predetermined number of axes define a first outer end of said arm, said hand being mounted on said first outer end of said arm.

44. The combination of claim 43 wherein said modifying means comprises means for adding a predetermined increment to the Cartesian coordinate of the teach position of each of said second predetermined number of axes to represent movement of said hand in said desired direction to said desired new position with a fixed orientation of said hand.

45. The combination of claim 44 wherein said determining means comprises means for defining the Cartesian coordinates of said first outer end of said arm to thereby represent movement in said desired direction from said teach position to said desired new position.

46. The combination of claim 36 wherein said calculating means is independent of operation of said programmable manipulator in said playback cycle.

47. The combination of claim 36 wherein said calculating means comprises means for selectively connecting said calculating means to said programmable manipulator, said calculating means being connected to said programmable manipulator during said initial teaching operation and being disconnected from said programmable manipulator during said playback cycle.

48. The combination of claim 36 wherein said calculating means is selectively connectable to a plurality of programmable manipulators and includes means for interfacing said calculating means to a plurality of programmable manipulators.

49. The combination of claim 36 wherein said storing means is selectively connectable to a plurality of programmable manipulators and comprises means for interfacing said storing means to a plurality of programmable manipulators.

50. The combination of claim 36 wherein said position signals correspond to angular positions of said arm in said plurality of axes and said calculating means comprises means for defining the Cartesian coordinates of said end of said arm and said hand in terms of said position signals in said plurality of axes;

means for entering position and direction information representing movement of said manipulator hand in a predetermined direction from a first teach position to a desired new position;

arm axes translation means responsive to said Cartesian coordinate defining means, said entering means and the teach position signals for calculating the Cartesian coordinates of said new desired position of said arm in said first predetermined number of axes;

arm axes transformation means for converting said Cartesian coordinates of said calculated new arm position to angular positions of said arm axes; and hand axes means responsive to said arm axes transformation means for calculating the angular position of said hand in said hand axes.

51. The combination of claim 50 wherein said defnining means comprises means for solving a set of three simultaneous equations defining the x, y and z coordinates respectively of said end of said arm and a predetermined point on said hand.

52. The combination of claim 51 wherein said solving means comprises simplification means for calculating the Cartesian coordinates of said end of said arm when the terms in said simultaneous equation corresponding to said hand are set to zero.

53. In a programmable manipulator the combination of, a manipulator arm movable to different positions in a plurality of axes, said plurality of axes being arranged and interconnected in a predetermined relationship and with a predetermined interaction relationship among said plurality of axes, means for moving said arm to different positions in said plurality of axes, said moving means comprising drive train means for controlling said plurality of axes and arranged to move said axes in said predetermined interaction relationship, encoder means for each of said axes and operative to develop encoder position signals corresponding to the position of said arm in said plurality of axes as measured from the location of said encoder means, and means for calculating new position signal representations which are different from said encoder position signals and correspond to a desired new position of said arm, said calculating means including means responsive to said encoder position signals and said predetermined interaction relationship among said axes for developing axis position signal representations corresponding to the position of said arm in said plurality of axes accounting for said predetermined interaction relationship of said plurality of axes.

54. The combination of claim 53 wherein said calculating means further comprises means for converting said axis position signal representations to Cartesian coodinates of the free end of said arm and means for translating said resulting Cartesian coordinates to provide modified Cartesian coordinates corresponding to said desired new position of said arm.

55. The combination of claim 54 wherein said calculating means further comprises means for reconverting said modified Cartesian coordinates into new axis position signal representations corresponding to the new desired position of said arm in said plurality of axes.

56. The combination of claim 53 wherein said predetermined interaction relationship represents a binary numerical relationship of said drive train control means for said plurality of axes.

57. The combination of claim 53 wherein said predetermined interaction relationship relates said encoder position signals and said axis position signals for said plurality of axes utilizing binary coefficients.

58. The combination of claim 57 wherein said predetermined interaction relationship comprises a separate relationship for each of said axes defining the axis position in terms of said encoder positions and accounting for said interaction of said axes.

59. The combination of claim 55 wherein said moving means is responsive to said new axis position signal representations to move said arm to said desired new position.

60. The combination of claim 55 further comprising means for positioning said arm during an initial teaching operation to different positions and means for storing said calculated new position signal representations for use as command signals in controlling movement of said arm in a playback cycle.

61. The combination of claim 60 further comprising means responsive to said stored command signals for moving said arm to said desired location during a subsequent playback cycle.

62. The combination of claim 54 wherein said translating means comprises means for modifying the Cartesian coordinates of said manipulator arm in said plurality of axes to represent movement of one end of said manipulator arm in a predetermined direction from a first position to said new desired position.

63. The combination of claim 55 wherein said manipulator arm comprises a manipulator hand connected to one end of said arm, said manipulator arm being defined by a first predetermined number of said plurality of axes, said manipulator hand being defined by a second predetermined number of said plurality of axes.

64. The combination of claim 63 wherein said translating means comprises means for modifying the Cartesian, coordinates of said second predetermined number of axes by equal increments to effect movement of said hand in a desired direction from a first arm position to said desired new position and means for determining the change in Cartesian coordinates of said first predetermined number of axes to represent movement of said arm and said hand in said desired direction.

65. The combination of claim 64 wherein said first predetermined number of axes define a first outer end of said arm, said hand being mounted on said first outer end of said arm.

66. The combination of claim 65 wherein said modifying means comprises means for adding a predetermined increment to the Cartesian coordinates corresponding to a first arm position of each of said second predetermined number of axes to represent movement of said hand in said desired direction to said desired new position with a fixed orientation of said hand.

67. The combination of claim 66 wherein said determining means comprises means for defining the Cartesian coordinates of said first outer end of said arm to thereby represent movement in said desired direction from said first position to said desired new position.

68. The combination of claim 60 wherein said calculating means is independent of operation of said programmable manipulator in said playback cycle.

69. The combination of claim 53 wherein said calculating means comprises means for selectively connecting said calculating means to said programmable manipulator, said calculating means being connected to said programmable manipulator during an initial teaching operation and being disconnected from said programmable manipulator during a subsequent playback cycle.

70. The combination of claim 53 wherein said calculating means is selectively connectable to a plurality of programmable manipulators and comprises means for interfacing said calculating means to a plurality of programmable manipulators.

71. The combination of claim 60 wherein said storing means is selectively connectable to a plurality of programmable manipulators and comprises means for interfacing said storing means to a plurality of programmable manipulators.

72. The combination of claim 55 wherein said encoder position signals correspond to angular positions of said arm in said plurality of axes and said calculating means comprises means for defining the Cartesian coordinates of said end of said arm and said hand in terms of said axis position signal representations in said plurality of axes;

means for entering position and direction information representing movement of said manipulator hand in a predetermined direction from a first position to a desired new position;

arm axes translation means responsive to said Cartesian coordinate defining means, said entering means and said axis position signal representations for calculating the Cartesian coordinates of said new desired position of said arm in said first predetermined number of axes;

arm axes transformation means for converting said Cartesian coordinates of said calculated new arm position to angular positions of said arm axes; and hand axes means responsive to said arm axes transformation means for calculating the angular position of said hand in said hand axes.

73. The combination of claim 72 wherein said defining means comprises means for solving a set of three simultaneous equations defining the x, y and z coordinates respectively of said end of said arm and a predetermined point on said hand.

74. The combination of claim 73 wherein said solving means comprises simplification means for calculating the Cartesian coordinates of said end of said arm when the terms in said simultaneous equation corresponding to said hand are set to zero.

75. The combination of claim 53 wherein said encoder position signals are digital signals and said axis position signal developing means comprises binary adder means arranged to modify and combine said encoder position signals in accordance with said predetermined interaction relationship.

76. The combination of claim 75 wherein said interaction relationship of said axes relates said axis position signals as combinations of predetermined encoder position signals.

77. The combination of claim 76 wherein said predetermined encoder position signals in said interaction relationship each include coefficients with a binary denominator.

78. The combination of claim 77 wherein said binary adder means are arranged to shift said encoder position signals to represent said coefficients in said interaction relationship with binary denominators.

* * * * *

UNITED STATES PATENT OFFICE
CERTIFICATE OF CORRECTION

Patent No. 4,163,183  Dated July 31, 1979

Inventor(s) Joseph F. Engelberger et al

It is certified that error appears in the above-identified patent and that said Letters Patent are hereby corrected as shown below:

Column 76, line 3, "55" should read --63--.

Signed and Sealed this

Twenty-first Day of October 1980

[SEAL]

Attest:

SIDNEY A. DIAMOND

Attesting Officer  Commissioner of Patents and Trademarks